(12) United States Patent
Shimura et al.

(10) Patent No.: US 6,226,925 B1
(45) Date of Patent: *May 8, 2001

(54) SYSTEM FOR TEMPORARILY HOLDING AN AUTOMATICALLY DRIVEN OPEN-CLOSE STRUCTURE

(75) Inventors: Ryoji Shimura; Kouichi Shigematsu, both of Yokohama (JP)

(73) Assignee: OHI Seisakusho Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,973

(22) PCT Filed: Oct. 24, 1996

(86) PCT No.: PCT/JP96/03110

§ 371 Date: Apr. 2, 1998

§ 102(e) Date: Apr. 2, 1998

(87) PCT Pub. No.: WO97/15743

PCT Pub. Date: May 1, 1997

(30) Foreign Application Priority Data

Oct. 23, 1995 (JP) .................................................... 8-297915
Oct. 27, 1995 (JP) .................................................... 7-280637

(51) Int. Cl.$^7$ .................................................. E05F 11/00
(52) U.S. Cl. ............................................ 49/360; 49/139
(58) Field of Search ............................... 49/360, 139, 140, 49/280, 25; 192/84.1, 142 R

(56) References Cited

U.S. PATENT DOCUMENTS

| | | | |
|---|---|---|---|
| 3,592,316 | * | 7/1971 | Daab ............................... 192/84.1 X |
| 4,376,476 | * | 3/1983 | Hagiri ................................... 192/84.1 |
| 4,377,223 | * | 3/1983 | Sakakiyama et al. .......... 192/84.1 X |
| 4,462,491 | * | 7/1984 | Kono et al. ......................... 192/84.1 |
| 4,620,261 | * | 10/1986 | Thornton ........................ 192/84.1 X |
| 4,650,052 | * | 3/1987 | Okada .................................. 192/84.1 |
| 5,069,000 | * | 12/1991 | Zuckerman ........................ 49/360 X |
| 5,094,332 | * | 3/1992 | Wall ................................ 192/84.1 X |
| 5,239,779 | * | 8/1993 | DeLand et al. ......................... 49/360 |

FOREIGN PATENT DOCUMENTS 59-195980 11/1984 (JP) .

* cited by examiner

Primary Examiner—Jerry Redman
(74) Attorney, Agent, or Firm—Foley & Lardner

(57) ABSTRACT

A temporarily holding device for temporarily holding an opening/closing body such as a sliding door for a vehicle in such a manner as to allow it to be moved from a halted state with a required operating force, comprising, in order not to fluctuate the moving resistance remarkably in any condition by providing the moving resistance of a required limit in the form of electrical control while the opening/closing body is being halted, an opening/closing body movably supported on a guiding mechanism, a motor-driven clutch for freely connecting and/or disconnecting the guide mechanism to and/or from an opening/closing body holding mechanism and a clutch driving element for regulating the transmission maintaining force of the motor-driven clutch, wherein the clutch driving element is designed to set the transmission maintaining force of the motor-driven clutch when the opening/closing body is halted with a required opening smaller than when it is in motion.

6 Claims, 47 Drawing Sheets

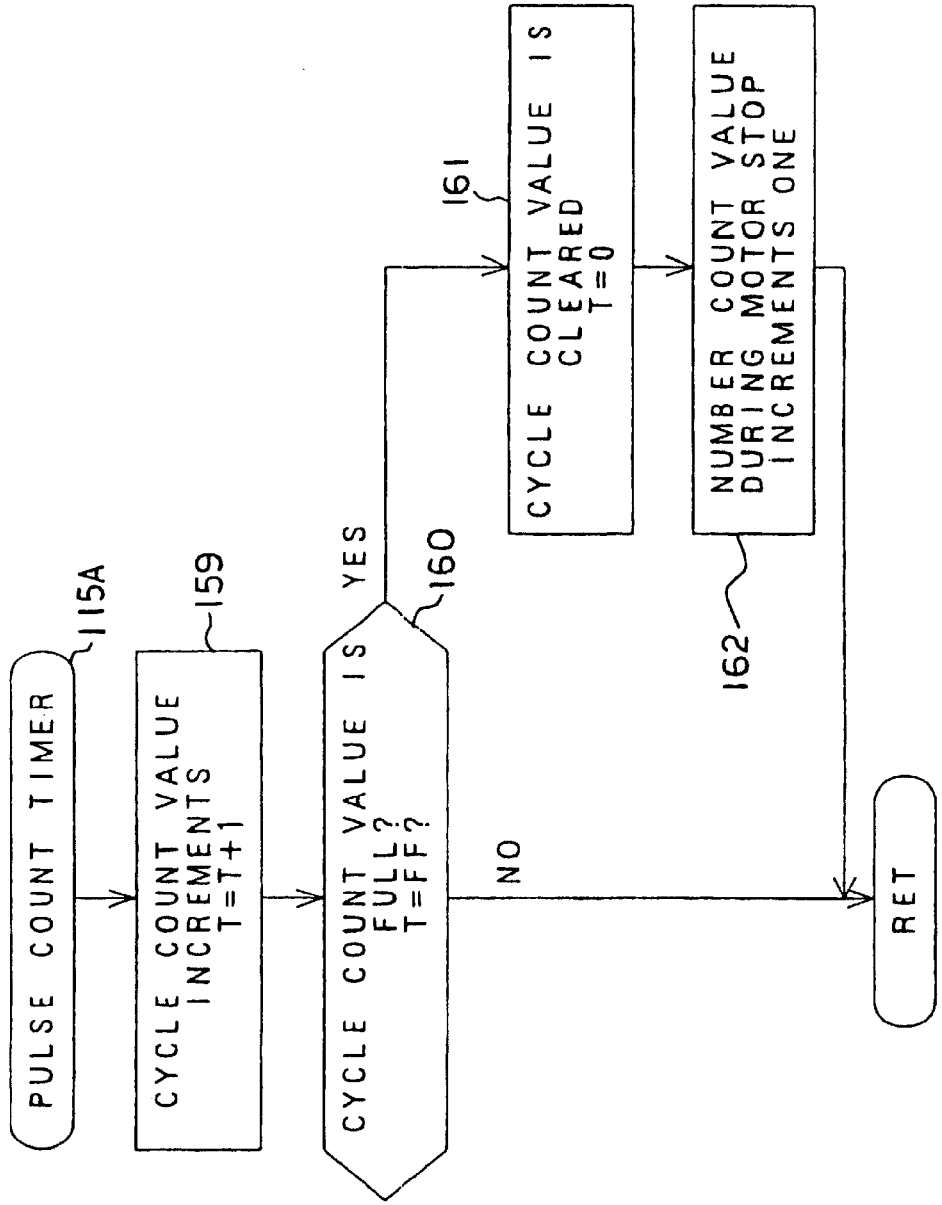

Fig.16

| AREA NAME | CONTROL REGION NAME | DOOR MOVEMENT CONTROL SPEED | STUDY RESOLUTION | ATTENTION DEGREE |
|---|---|---|---|---|
| AREA1 | ORDINAL CONTROL REGION ($E_1$) | T=250mm/s<br>D=259 | B=8 | SMALL |
| AREA2 | SPEED REDUCTION CONTROL REGION ($E_2$) | T=170mm/s<br>D=170 | B=4 | |
| AREA3 | LINK SPEED REDUCTION CONTROL REGION ($E_3$) | T=100mm/s<br>D=100 | B=2 | DANGEROUS REGIONS |
| AREA4 | SHUT-DOWN CONTROL REGION ($E_4$) | T=T×1.2=120mm/s<br>D=120 | B=2 | |
| AREA5 | LINK SPEED REDUCTION CONTROL REGION ($E_5$) | T=200mm/s<br>D=200 | B=8 | SMALL |
| AREA6 | ORDINAL CONTROL REGION ($E_1$) | T=250mm/s<br>D=250 | B=8 | SMALL |
| AREA7 | CHECK CONTROL REGION ($E_6$) | T=250mm/s | | MIDDLE |

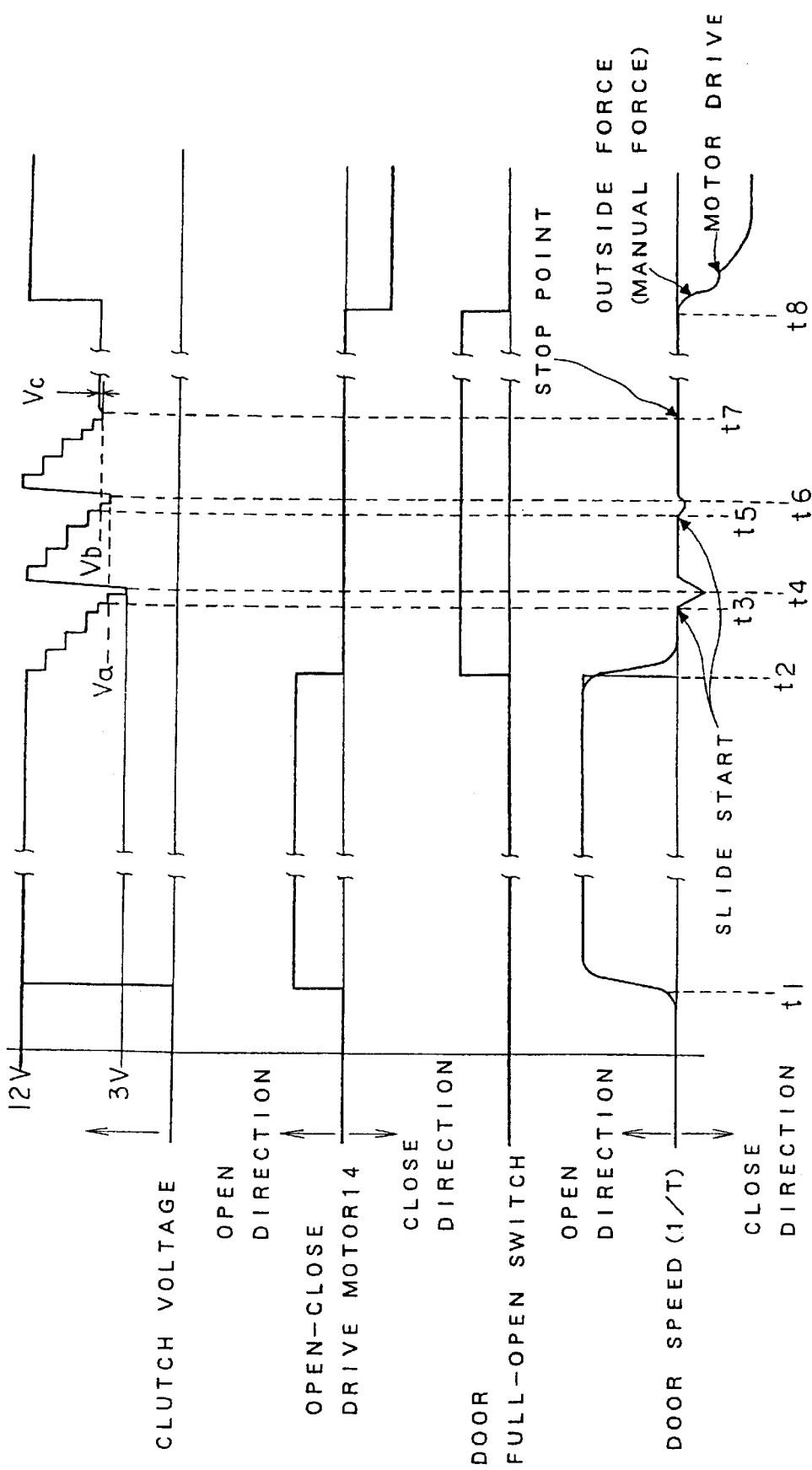

SYSTEM FOR TEMPORARILY HOLDING AN AUTOMATICALLY DRIVEN OPEN-CLOSE STRUCTURE

This application is the national stage of PCT/JP96/03110, filed Oct. 24, 1996.

TECHNICAL FIELD

This invention relates to a temporary holding device for an automatic driven open-close structure for temporary holding the open-close structure, such as entrance doors or vehicular slide doors, in its stopped condition, adapted to be able to move by a predetermined operation force.

BACKGROUND

Open-close structure, such as slide doors installed on moving body of the vehicle and the likes have respectively a check mechanism at a full-open position of the door in order to hold the full-open door condition in any situation of the vehicle stop posture.

The check mechanism employs in general a mechanical motion limiter, such as an elastic chain mechanism in such manner that the door doesn't start to move without an operation force higher than a predetermined level.

Also, according to the apparatus adapted to automatically drive the open-close structure by means of a motor and the like, this apparatus controls the clutch mechanism installed between a motor drive portion and the open-close structure to restrict a door motion along its close direction so as to prevent the clutch mechanism from being released at its door full-open position.

However, concerning a setting of the limit of the operational force in the mechanical check mechanism, it is necessary to firmly keep the door at its full-open condition in every situation of the door even though the door is apt to close, considering a posture of the vehicle and a weight of the door.

In case that this mechanical check mechanism is set under such limit of the operational force, under a situation in which the door is very difficult to close, a very large operational force is necessary to close the door. A very large operational force is used while the door is starting to close, even though the vehicle is parked on a level ground of normal condition. Such operational force becomes very large when the door is going to start moving from its stop condition and then movement resistance of the door suddenly decreases just after the door start moving, resulting in high speed of the moving door along its close direction. It is not good in point of the safety of the door and of the mechanism protection.

Furthermore, according to one of automatic open-close devices adapted to drive the door by an electric motor, the drive of the door by manual operation is detected and it is used as a chance of driving electrically the door. In such automatic open-close device, a wide change range of the operational force which is necessary to start driving the door is not preferable.

According to the automatic open-close device adapted to have a chance of electric driving start for starting a door motion, if the electric clutch is not released when the door fully opens, motion start of the door along its close direction becomes completely impossible. It is also not preferable.

This invention is invented to solve such problem of the above-mentioned conventional device of this kind and the purpose of this invention is to provide a temporary holding device for an automatic driven open-close structure adapted to prevent a moving resistance of the open-close sturcture from changing in a wide range under any situations by applying a moving resistance of a predetermined limit when the open-close sturcture stops, which is electrically controlled.

DISCLOSURE OF THE INVENTION

In order to attain the purpose of this invention, the temporary holding device for an automatic driven open-close structure comprises an open-close structure movably supported on a guide mechanism, an electric clutch for intermittently connecting the guide mechanism with an open-close holding mechanism, and a clutch drive means for adjusting a transfer keeping force of the electric clutch, wherein the clutch drive means sets a transfer keeping force of the electric clutch, when the open-close structure opens at a predetermined open degree and stops, at a level smaller than another transfer keeping force obtained when the open-close structure moves.

Also, a temporary holding device of an automatic driven open-close structure of this invention comprises an open-close structure movably supported on a guide mechanism, an electric clutch intermittently connecting the guide mechanism with an open-close holding mechanism, an open-close structure movement detection means for detecting a movement of the open-close structure, and a clutch drive means for adjusting a transfer keeping force of the electric clutch, wherein the clutch drive means gradually decreases a transfer keeping force of the electric clutch when the open-close structure opens at a predetermined open degree and stops, and gradually increases a transfer keeping force so as to stop a sliding movement of the open-close structure when the open-close structure movement detection means detects a sliding movement of the open-close structure, and adjusts a transfer keeping force of the electric clutch to another transfer keeping force of a level a little larger than that attained when the open-close structure stops by gradually increasing the the transfer keeping force.

Furthermore, a temporary holding device for an automatic driven open-close structure of this invention comprises an open-close structure movably supported on a guide mechanism, an electric clutch intermittently connecting the guide mechanism with an open-close holding mechanism, an open-close structure movement detection means for detecting a movement of the open-close structure, and a clutch drive means for adjusting a transfer keeping force of the electric clutch, wherein the clutch drive means gradually decreases a transfer keeping force of the electric clutch when the open-close structure opens at a predetermined open degree and stops, and gradually decreases, when the open-close structure movement detection means detects the sliding movement of the open-close structure, the transfer keeping force to its level attained when a sliding movement is again detected after the transfer keeping force is once increased, and adjusts a transfer keeping force of the electric clutch to its level similar to or a little larger than the transfer keeping force attained when the last or the most new sliding motion is detected by the open-close structure movement detection means, when the open-close structure movement detection means doesn't detect any sliding movement of the: open-close structure.

Still more, in the temporary holding device of the automatic driven open-close structure of this invention, the open-close holding mechanism consists of an open-close structure drive means for driving the open-close structure along its open-close direction.

Accordingly, this invention is able to keep a holding force of the open-close structure at a fixed degree in any situation, so it is possible to stabilize a start motion of the open-close structure safely. Also, because it is possible to set the holding force of the minimum requirement, it is possible to decrease a consuming electricity for the clutch and to miniatuarize the open-close motor. Further, because it is possible to use a holding force of the minimum requirement and set a changing width range of the holding force on a smll level, it is possible to carry out safely and stably an automatic open-close control with a chance of start of moving the open-close structure.

Furthermore, mechanical holding mechanism, such as levers and springs for holding the open-close structure is not necessary in this invention, so that it is possible to considerably reduce the number of parts and exceedingly decrease the cost of a control system for the open-close structure. Also, comparing to the conventional mechanical holding mechanism, few exclusive parts are used, so that the construction of installing the open-close structure is simplified and a space for supporting members of the structure is made narrow.

BRIEF EXPLANATION OF THE DRAWINGS

FIG. 15 is a flow chart showing in detail the pulse count timer routine.

FIG. 16 is a memory table showing the control data and the like necessary in every area.

FIG. 49 is a time chart showing another embodiment of the door check control carried out when the vehicle is parked on a downward slope.

BEST MODE OF THIS INVENTION FOR EMBODYING IT

The best embodiment of this invention will be described in detail with reference to the drawings enclosed.

Figure 1:
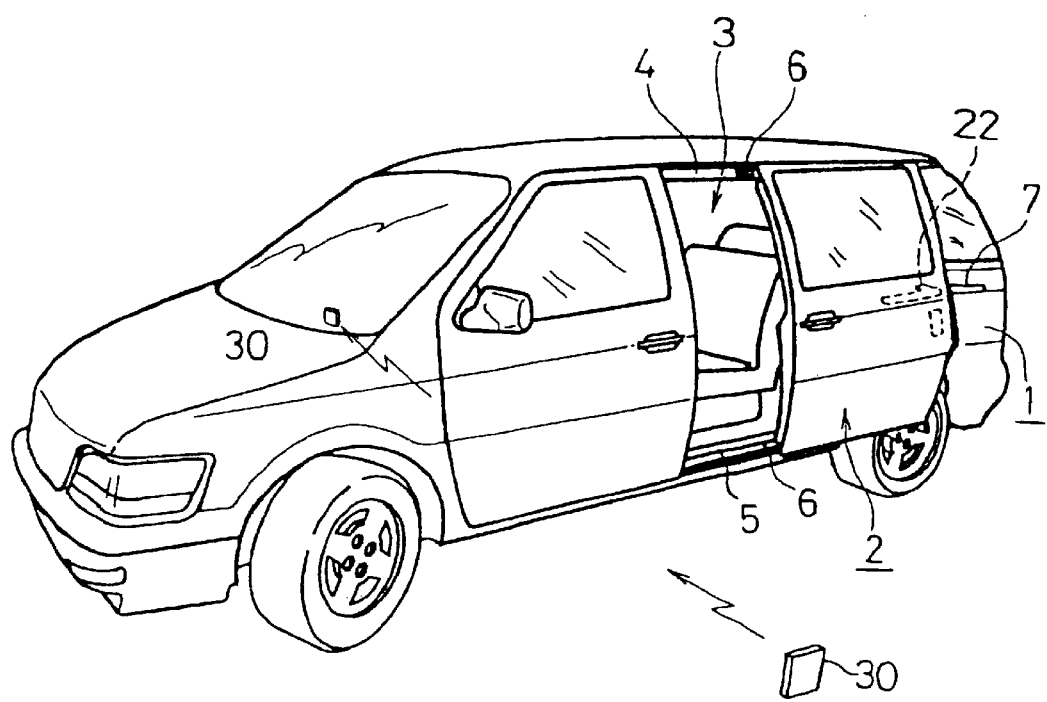
FIG. 1 is an outline perspective view showing one example of automobiles to which this invention is applied.
Figure 2:
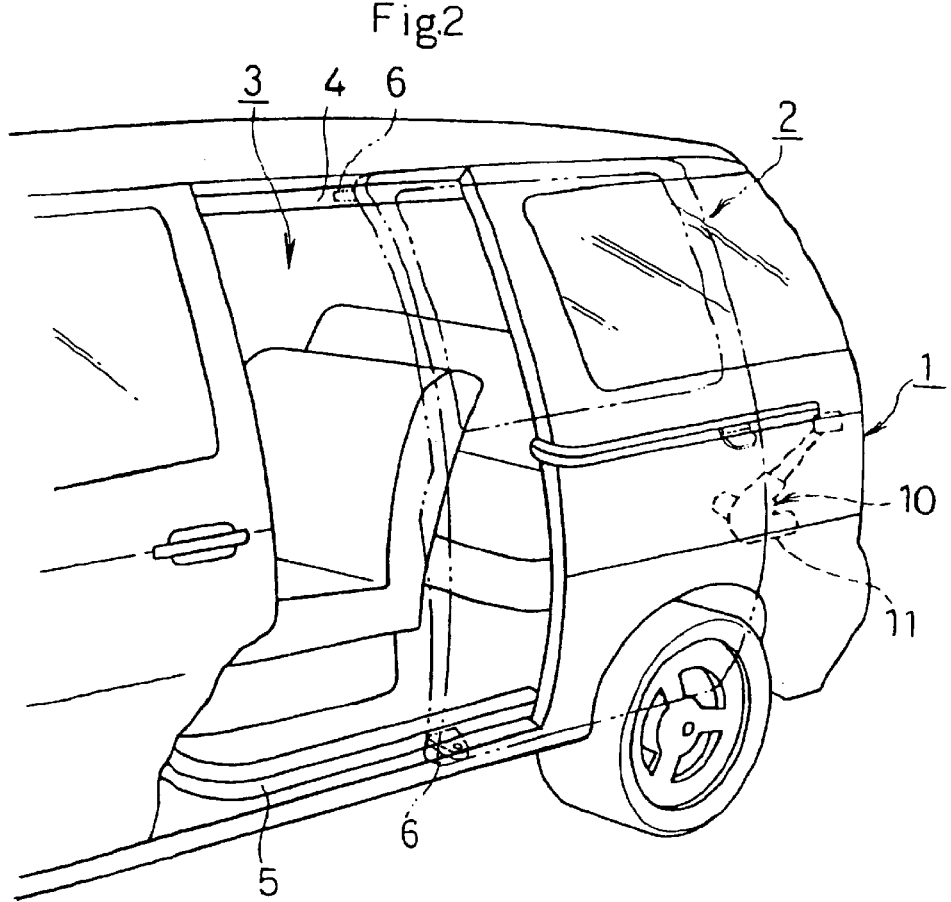
FIG. 2 is an enlarged perspective view of the vehicle body when its slide door is removed.

FIG. 1 is an outline perspective view showing an example of the automobile to which the vehicular slide door automatic open-close control device according to this invention is applied. A slide door 2 is as shown installed at a side of the vehicle body 1 so as to slide along a front-back direction of the vehicle, enabling to open and close the slide door 2. FIG. 2 is an enlarged perspective view showing the vehicle body 1 in which the slide door 2 (shown by chained line) removed and FIG. 3 is a perspective view showing only the slide door 2.

Figure 3:
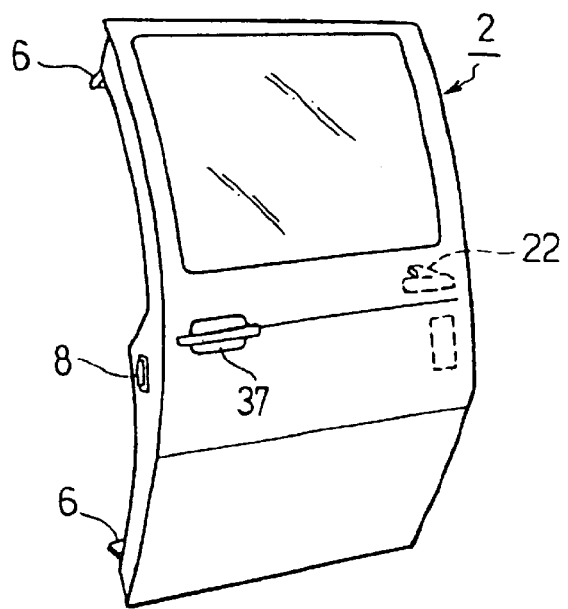
FIG. 3 is a perspective view of the slide door.

As shown in the drawings of FIGS. 1, 2 and 3, the slide door 2 engages with an upper truck 4 mounted on an upper edge of a door opening portion 3 of the vehicle body 1 and a lower track 5 mounted on a lower edge of the door opening portion 3 through a slide connector 6 fixed to upper and lower ends of the slide door 2 so as to slide the slide door 2 along the front-back direction of the vehicle.

Also, the slide door 2 slidably engages with and is guided by a guide track 7 fixed in the proximity of a waist rear portion of the vehicle body 1. The slide door 2 can move reawardly from its full-close position, at which the door opening portion 3 is sealed and shut-down with an exterior side panel of the vehicle body 1 with the face of the slide door 2 protruding a little from the outer panel of the vehicle body 1, to its full-open position.

In addition, a door lock 8 mounted on a front side of the slide door 2 is adapted to engage with a sriker fixed on the vehicle body 1 when the slide door 2 is at its full-close position, so the slide door 2 is firmly held in its full-close situation or condition. A door lever 37 for manually opening and closing the slide door 2 is installed on an outer side of the slide door 2. The door lock 8 may be installed on a back side of the slide door 2.

Figure 4:
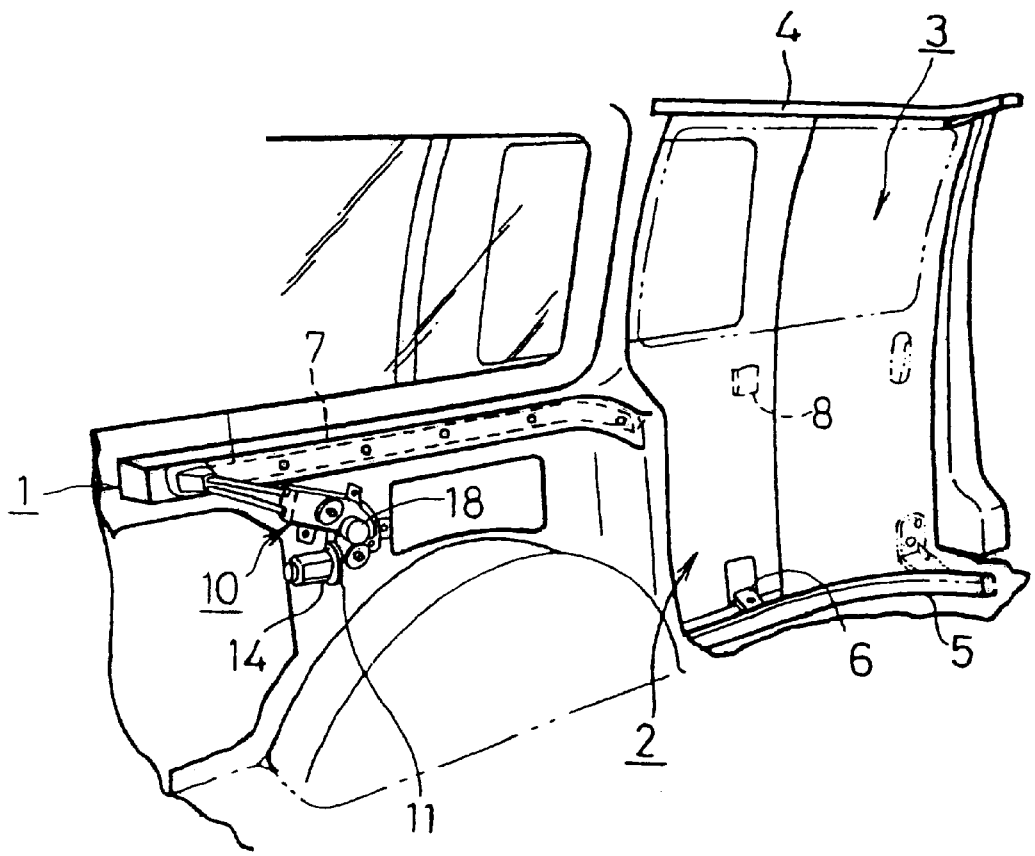
FIG. 4 is a perspective view showing the installation portion of the slide door seeing from inside of the vehicle.

A slide door drive apparatus 10 is installed at back of the door opening portion 3 of the vehicle body 1 between the outer panel and the inner panel of the vehicle body 1 as shown in FIG. 4. The slide door drive apparatus 10 moves a cable member 12 installed in the guide track 7 by means of driving the motor and resultantly moves the slide door 2 connected to the cable member 12.

According to the embodiment of the invention, the indication for opening and closing the slide door 2 is carried out by an open-close switch (not shown) installed in the interior of the vehicle 1 and also by a wireless remote controller 30 from the outside of the vehicle (see FIG. 1). These structures for carrying out such indication will be described in detail.

Figure 5:
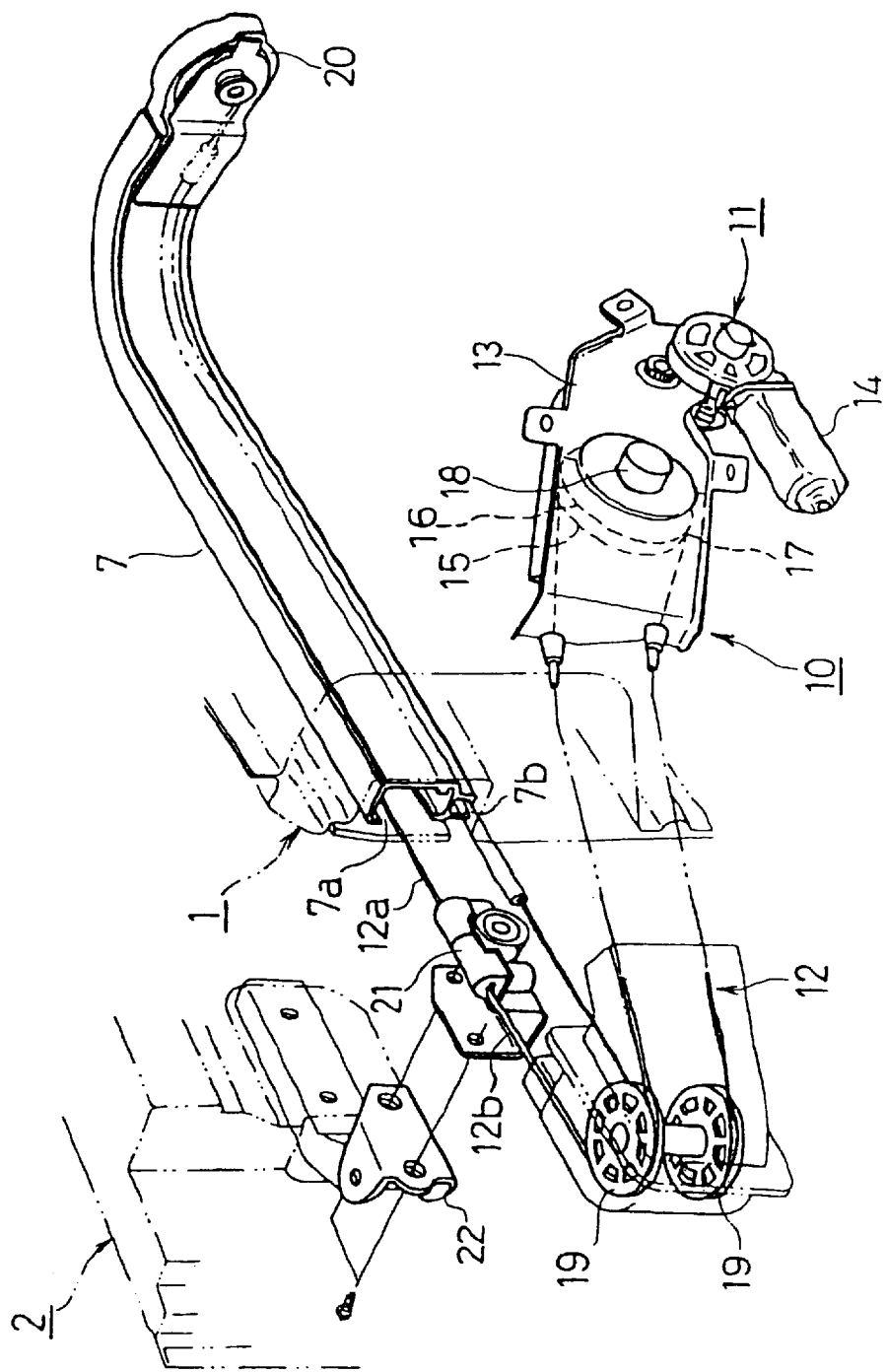
FIG. 5 is a perspective view showing the important portion of the slide door drive apparatus.

FIG. 5 is a perspective view showing an important portions of the slide door drive apparatus 10. As shown the slide door drive apparatus 10 has a motor drive portion 11 including a base plate 13 fixed on the interior side of the vehicle body 1 by means of bolts and the like. The base plate 13 has a reversible open-close drive motor 14 for the slide door 2, a drive pulley 15 on which the cable member 12 winds, and a speed reduction portion 17 provided with an electro-magnetic clutch 16 therein, respectively being fixed thereto.

The drive pulley 15 has a speed reduction mechanism for decreasing a rotation number (RPM) of the open-close drive motor 14 and increasing an output torque and then transferring the rotation transfer force to the the cable member 12. The electromagnetic clutch 16 is adapted to be suitably and independently energized when the open-close drive motor 14 drives, so that the electro-magnetic clutch 16 mechanically connect the open-close drive motor 14 to the drive pulley 15.

The cable member 12 wound on the drive pulley 15 runs around a pair of the guide pulleys 19,19 situated on rear of the guide track 7, upper opening portion 7a and lower opening portion 7b of the guide track 7 open outwardly in a sectional shape of box without a side, and a reversing pulley 20 provided at front end of the guide track 7. Consequently, an endless cable is obtained.

A movable member 21 is fixed on a suitable portion of the cable member 12 which runs into the upper opening portion 7a of the guide track 7, the movable member 21 running into the upper opening portion 7a without resistence. The front side portion of the cable member 12 divided from the movable member 21 is a door closing cable 12a and the rear side portion of the cable member 12 divided from the movable member 21 is a door opening cable 12b.

The movable member 21 is connected to an interior rear end portion of the slide door 2 by means of a hinge arm 22 and moves rearwardly and frontwardly through the opening portion 7a of the guide track 7 by means of a force of pulling the door opening cable 12a or the door closing cable 12b due to the rotation of the open-close drive motor 14. Consequently, the slide door 2 moves along its closing direction or its opening direction.

A rotary encoder 18 engages with a rotary shaft of the drive pulley 15 in order to measure precisely or high resolvability a rotary angle of the rotary shaft. The rotary encoder 18 outputs an output signals of pulse number according to the rotary angle of the drive pulley 15 in order to determine or measure a movement distance of the slide door 2 or the cable member 12 wound around the drive pulley 15.

Consequently, when the pulse number output from the rorary encoder 18 is counted from the initial value of the full-close position of the slide door 2 to that of its full-open position, this count number N obtained by the rotary encoder 18 shows the position of the movable member 21 or the position of the slide door 2.

Figure 6:
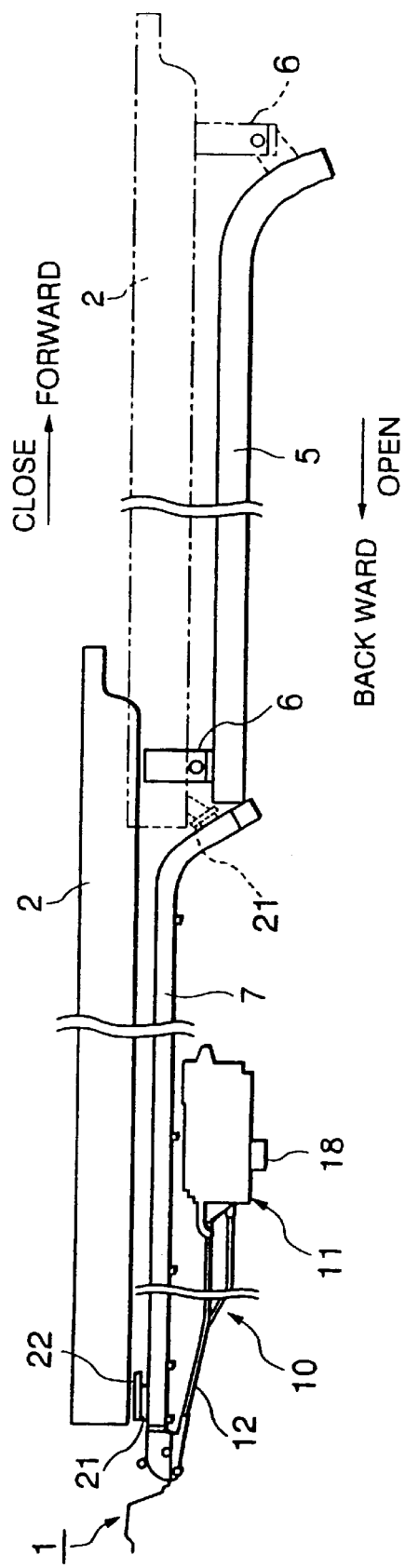
FIG. 6 is an outline plan view showing the situation of moving the slide door.

FIG. 6 is a plan view schematically showing a movement of slide door 2. As described above, the front portion of the slide door 2 is held by engaging with the upper track 4 and the lower track 5 through the sliding connectors fixed at its upper and lower ends and the rear portion of the slide door 2 is held by an engagement of the hinge arm 22 to the guide track 7.

Automatic Slide Door Control Apparatus

Figure 7:
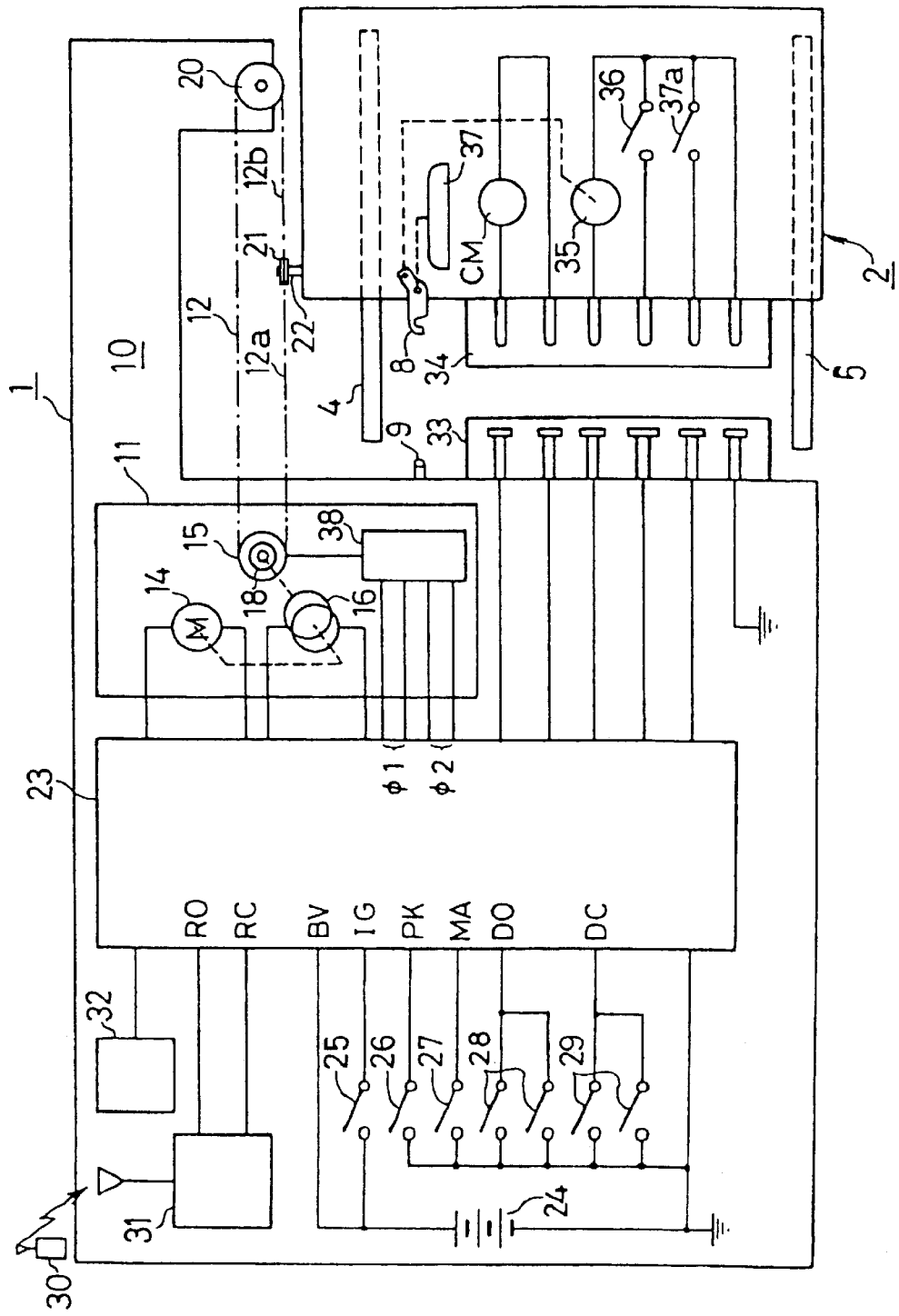
FIG. 7 is a block diagram showing the connection relation of the slide door automatic control apparatus according to this invention and spherical electrical elements.

Next, the circuitry of relationship between the automatic slide door control apparatus 23 and respective electric elements within the vehicle body 1 and the slide door 2 will be explained with reference to the block diagram of FIG. 7. The automatic slide door control apparatus 23 controls the slide door drive apparatus 10 and is positioned, for example, near the motor drive portion 11 within the vehicle body 1.

The automatic slide door control apparatus 23 is connected to various electric components in the vehicle body 1, such as a battery 24 for receiving DC voltage BV, an ignition switch 25 for receiving an ignition signal IG, a parking switch 26 for receiving a parking signal PK, and a main switch 27 for receiving a main switch signal MA.

Furthermore, the automatic slide door control apparatus 23 nay be connected to a door open switch 28 for receiving a door open signal D0, a door close switch 29 for receiving a door close signal DC, a keyless system 31 for receiving a remote control door open signal R0 or a remote control close signal RC from the wireless remote controller 30, and a buzzer for generating a warning sound of warning the user that the slide door 2 is automatically opened or closed.

It is noted that the fact of the door open switch 28 and the door close switch 29 respectively are structured with two operating members shows that these switches are installed at two positions, for example, of the driver's seat and the rear seat in the interior of vehicle body 1.

Next, there is the connection between the automatic slide door control apparatus 23 and the slide door drive apparatus 10, such as a connection for supplying a power to the open-close drive motor 14, a connection for controlling the electromagnetic clutch 16, and a connection with a pulse signal generator 38 for receiving pulse signals from the rotary encoder 18 and outputting pulse signals $\phi 1$, $\phi 2$.

Futhermore, a connection of the automatic slide door control apparatus 23 and various electric elements within the slide door 2 is carried out by the connection of a vehicle boby side connector 33 placed at the door opening portion 3 with a door side connector 34 placed at an opening end of the slide door 2 when the slide door 2 opens less than its full-close condition.

When this connection condition is attained, the automatic slide door control apparatus 23 is connected to various electric elements in the slide door 2 through a connection for supplying a power to a closure motor CM in order to shut-up the slide door 2 from its half-latched condition to its full-latched condition, a connection for supplying a power to an actuator (ACTR)35 in order to drive the door lock 8 and release it from the striker 9, a connection for receiving a half-latch signal HR from a half-latch switch 36 detecting a half-latched condition, and a connection for receiving a door knob signal DH from a door knob switch 37a detecting operation of the door knob 37 connected to the door lock 8.

Figure 8:
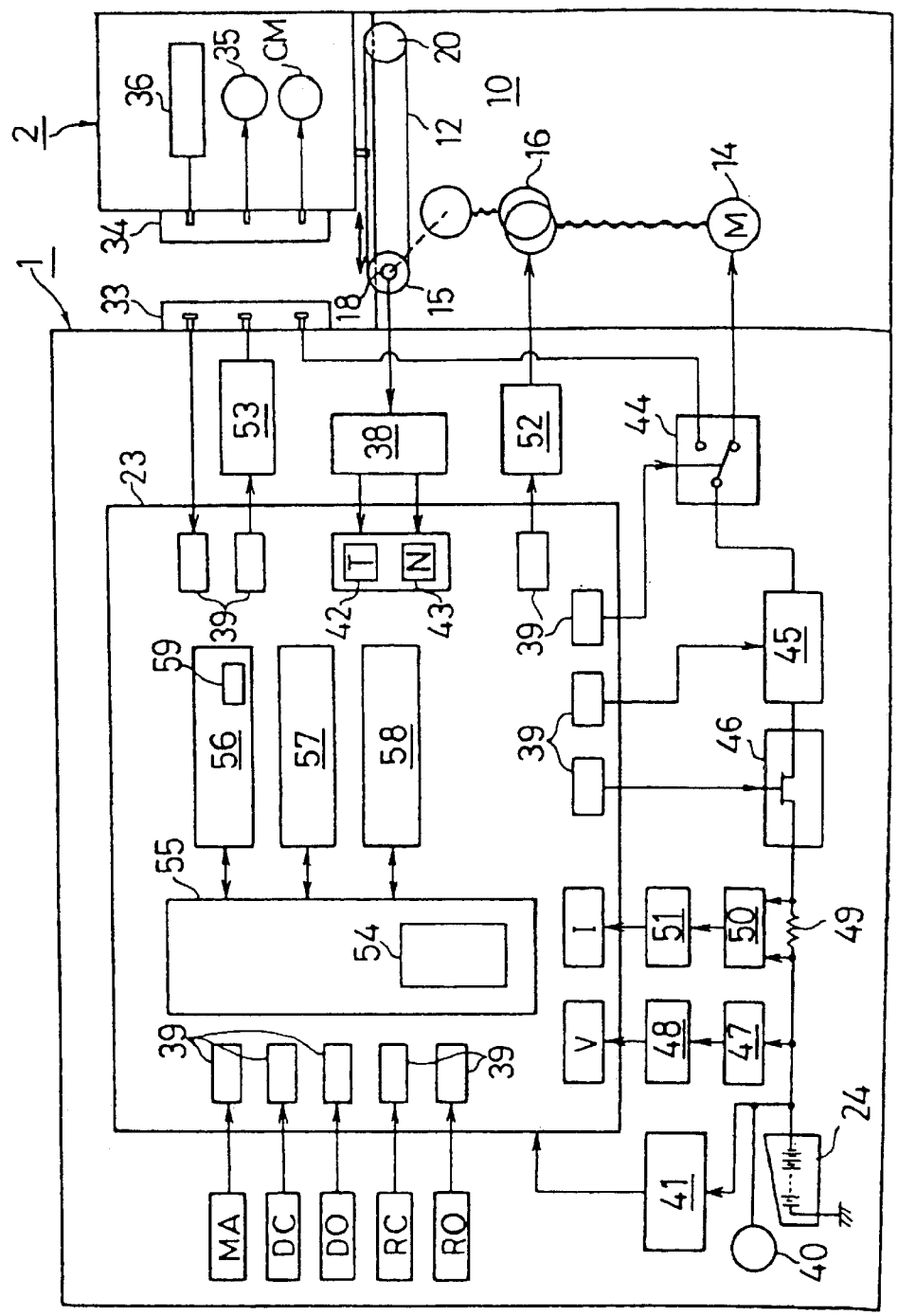
FIG. 8 is a block diagram depicting the important portion of the slide door automatic control apparatus.

Next, construction of the automatic slide door control apparatus 23 will be explained with reference to the block diagram of FIG. 8. The automatic slide door control apparatus 23 has a main control portion 55 for repeatedly carrying out a control operation with a fixed time interval. The main control portion 55 includes a control mode selector 54 for selecting a suitable control mode according to the situations of various input and output peripheral devices.

The control mode selector 54 selects the most suitable exclusive control portion according to the most recent situation of input and output from these peripheral devices. Such exclusive control portion has an auto slide control portion 56 for controlling mainly the open-close operation of the slide door 2, a speed control portion 57 for controlling a moving speed of the slide door 2, and a pinch control portion 58 for detecting any obstruction, if any, impeding or restraining a movement of the slide door 2 along its movement direction while it is being driven. Also, the auto slide control portion 56 includes a slope judgement portion 59 for detecting a posture of the vehicle body 1.

Furthermore, the automatic slide door control apparatus 23 has a plurality of input/output ports 39 and adapted to input and output an on/off signal of various switches mentioned above and an operation/non-operation signal of relays or clutches and the like. Also, a speed calculation portion 42 and a position detector 43 receive two-phase pulse signals $\phi 1$, $\phi 2$ output from the pulse signal generator 38 and then generate a cycle calculation value T and a position calculation value N.

The battery 24 is charged by a generator 40 while the vehicle is running. An output power is made of a constant voltage by a stabilization power source 41 and it is applied to the automatic slide door control apparatus 23. The output voltage of the battery 24 is detected by a voltage detector 47, the voltage value detected by the voltage detector 47 is changed to digital signal through an A/D convertor 48 andit is input to the automatic slide door control apparatus 23.

Furthermore, an output voltage from the battery 24 is supplied to a shunt resistance 49 and a value current I flowing through the shunt resistance 49 is detected by a current detector 50. The current value I detected is changed to a digital signal through the A/D convertor 51. The signal is input to the automatic slide door control apparatus 23.

Also the output voltage from the battery 24 is supplied to an electric switch element 46 through the shunt resistance 49. This electric switch element 46 is on/off controlled by the automatic slide door control apparatus 23 in order to change a DC signal to a pulse signal which is supplied to the open-close drive motor 14 or the closure motor CM. A duty ratio of the pulse signal is adapted to be freely controlled by the power switch element 46.

The pulse signal obtained through the power switch element 46 is supplied to the open-close drive motor 14 or the closure motor CM through an inversion circuit 45 and a motor exchanging circuit 44. The inversion circuit 45 changes the driving direction of the open-close drive motor 14 or the closure motor CM and constructs a power supply circuit for the motor together with the power switch element 46.

The motor exchanging circuit 44 selects either the slide door open-close drive motor 14 and the closure motor CM, respectively operative according to the instruction of the main controller 55. Both motors are adapted to drive the slide door 2 and not driven simultaneously, so it is possible to optionally supply a drive power.

In addition, there are a clutch drive circuit 52 for controlling the electromagnetic clutch 16 according to the instruction of the main controller 55 and an actuator drive circuit 53 for controlling the actuator 35 according to the instruction of the main controller 55.

Main Routine

Figure 9:
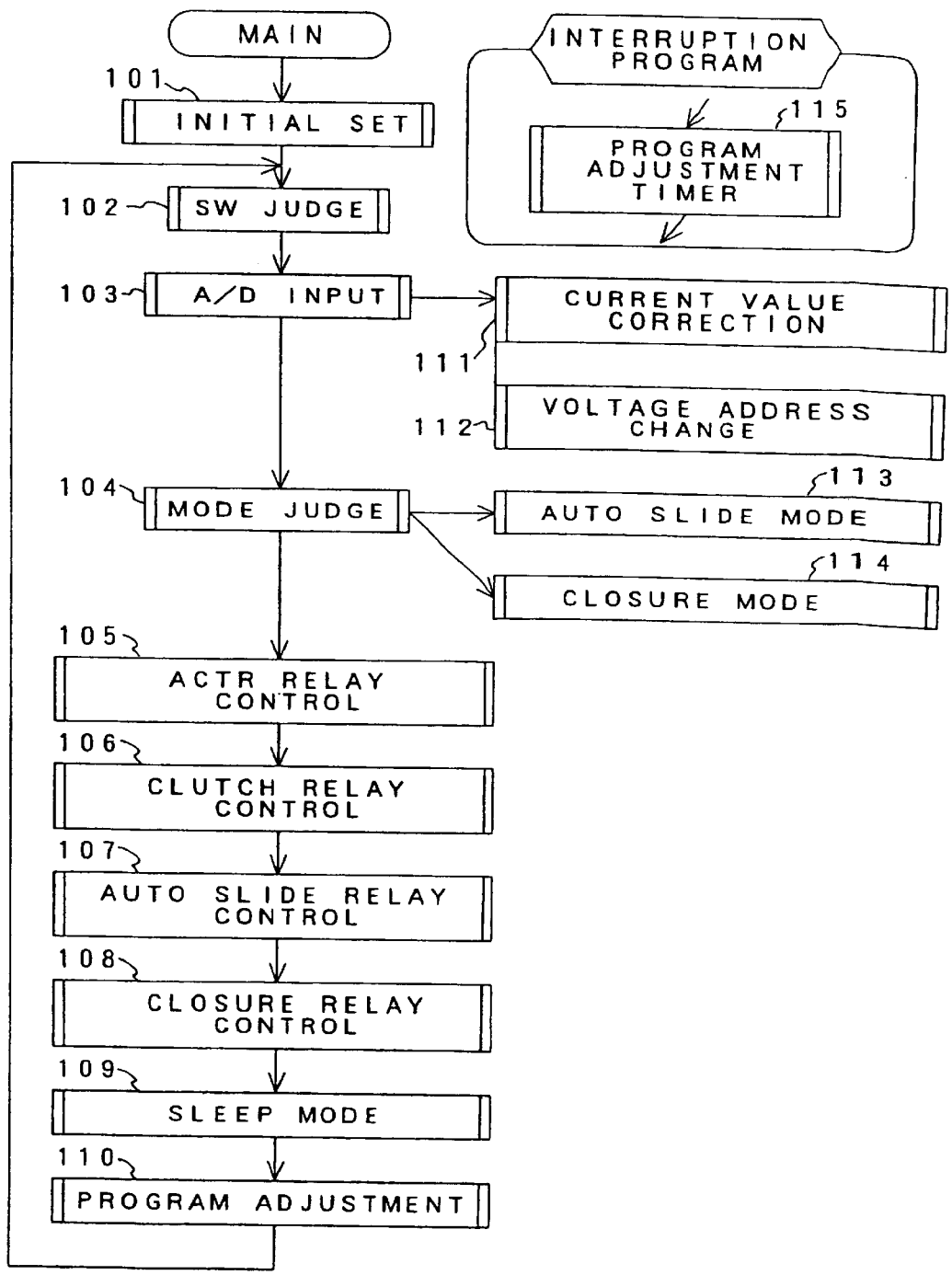
FIG. 9 is a flow chart of the main routine showing the operation of the automatic slide door control apparatus.

Next, operation of the invention having this construction will be described. FIG. 9 is a flow chart of the main routine showing operation of the automatic slide door control apparatus 23. First, an initial set is done (Step 101) in order to initialize parameters and the like in a first period of the operation. SW judgement (Step 102) judges whether these various switches 25–29 connected to the input and output port 39 as described are in its open condition or in its close condition and then sets flags and the like showing the open condition or the close condition of the individual switch according to the judging result.

An A/D input (Step 103) intakes the voltage value V and the current value I from the A/D convertors 48 and 51. This A/D input has a current value correction (Step 111) and a voltage address change (Step 112) of a lower level.

Next, a mode judgement (Step 104) for judging whether it is an automatic slide mode (Step 113) or a closure mode (Step 114) according to the environmental situation of the open or the close condition and the like of various switches mentioned above is done to select either step. The automatic slide mode is a mode to control the open-close movement of the slide door 2 by means of driving the open-close drive motor 14. The closure mode is a mode to shunt the slide door in its full-latched condition or to release it by means of driving the closure motor CM.

Next, an actuator(ACTR) relay control (Step 105), a clutch relay control (Step 106), an automatic slide relay control (Step 107) and a closure relay control (Step 108), respectively are of direct control type, on which the controlled results of respective controls are reflected for supplying a power to the electromagnetic clutch 16 and the open-close drive motor 14 and CM. The function and operation of these controls are well known and detail explanation for them is omitted from this description. Start and stop operations of the open-close drive motor 14 for the slide door 2 are carried out at the step 107 of the automatic slide relay control.

Next, step 109 of a sleep mode is a control mode for decreasing or economizing a power consumption when no change is happened for a long period. A program adjustment (Step 110) controls and determines an interval of main loop to a constant time of, for example, 10 mm second by means of a program adjustment timer (Step 115) in an interruption program provided from a different loop.

Receiving interruptions of the program adjustment timer in the program adjustment keeps the interval always constant, during which interval the control points of individual steps return to an entrance of the main loop and which interval is apt to change due to such control points drop in the deeper level of the nest or such controls are done at upper levels. When the program adjustment is finished, it returns to the SW judgement (Step 102) and the process repeats its following steps as above-described. It is a loop control.

Mode Judgement Routine

Figure 10:
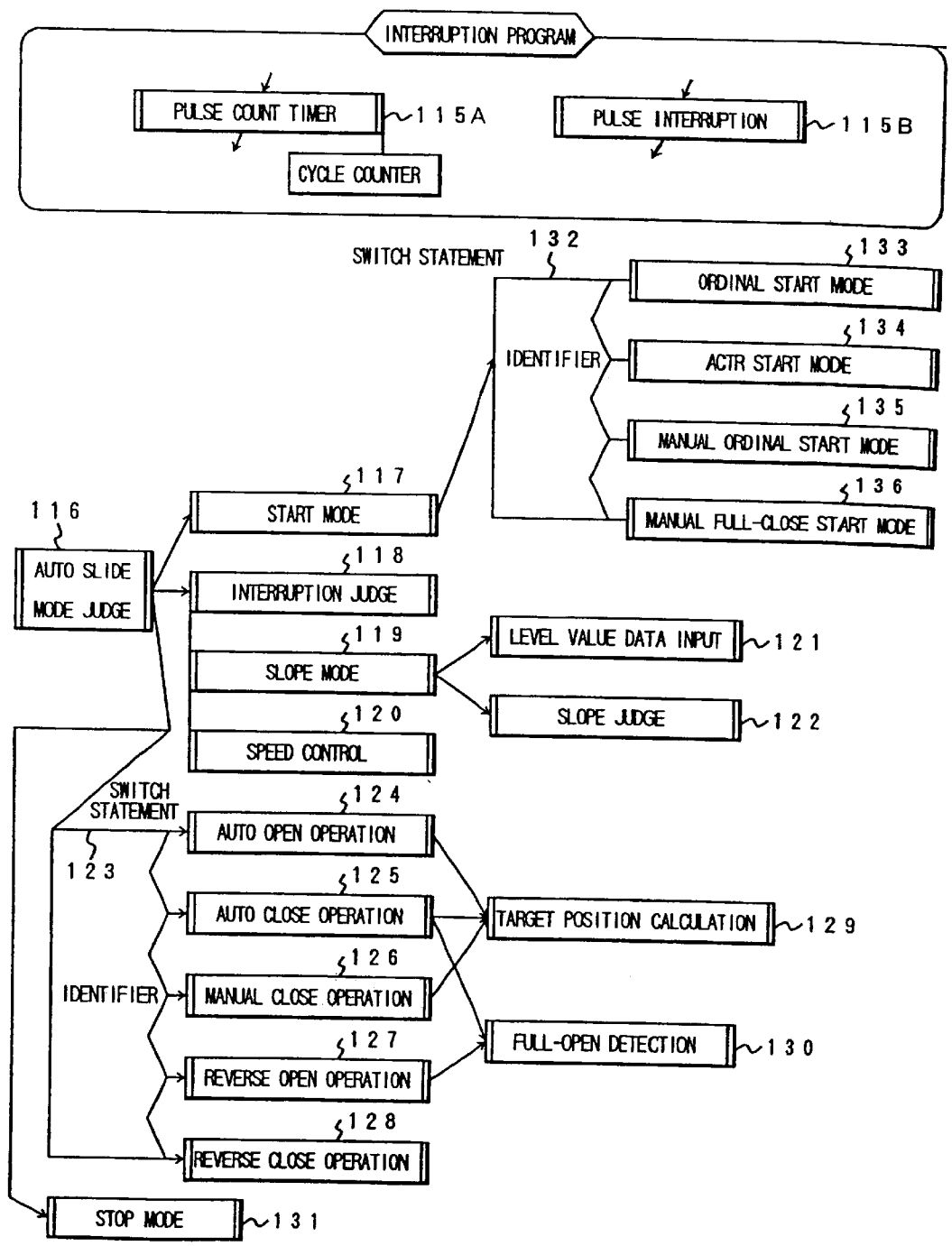
FIG. 10 is an outline view of the mode judgement routine shown in FIG. 9.

FIG. 10 is a flow chart showing an outline of an automatic slide mode judgement in the mode judgement (Step 104). The automatic slide node judgement includes a start mode (Step 117) for dividing a start of the movement of the slide door 2 according to various situations at that moment, a pinch judgement (Step 118) for suitably controlling the movement of the slide door 2 according to the situation at that moment, a slope mode (Step 119) and a speed control (Step 120). The slope mode has routines of a level ground value data input (Step 121), a slope judgement (Step 122) and the like at its lower stages.

The automatic slide mode judgement (Step 116) is branched to anyone of an automatic open operation (Step 124), an automatic close operation (Step 125), a manual close operation (Step 126), a reverse open operation (Step 127) and a reverse close operation (Step 128) by means of identifiers according to the environmental situation at a position of a switch statement (Step 123). These operation controls have routines of a target position calculation (Step 129) and a full-open detection (Step130) at lower stages of these controls. Further, there is a routine of a stop mode (Step 131) at the same level as that of the start mode (Step 117) and the other.

The start mode (Step 117) has routines of an ordinal start mode (Step 133), an ACTR start mode (Step 134), a manual ordinal start mode (Step 135) and a manual full-close start mode (Step 136) at lower stages, which are branched through the switch statement (Step 132).

It is noted that the multi-branching flows of such switch statements (Step 123 and 132) use flags of ordinal 1 bit as an identifier showing the environmental situation of the open condition and the close condition of switches and the continuation or the completion of the necessary control operation.

The flow of the automatic slide mode judgement transfers its control point according to the main routine. Both routines of a pulse counter timer (Step 115A) and a pulse interruption (Step 115B), differently shown in FIG. 10, constitute an interruption program having different control points from the main routine.

Cycle Count Value T/Position Count Value N

Figure 11:
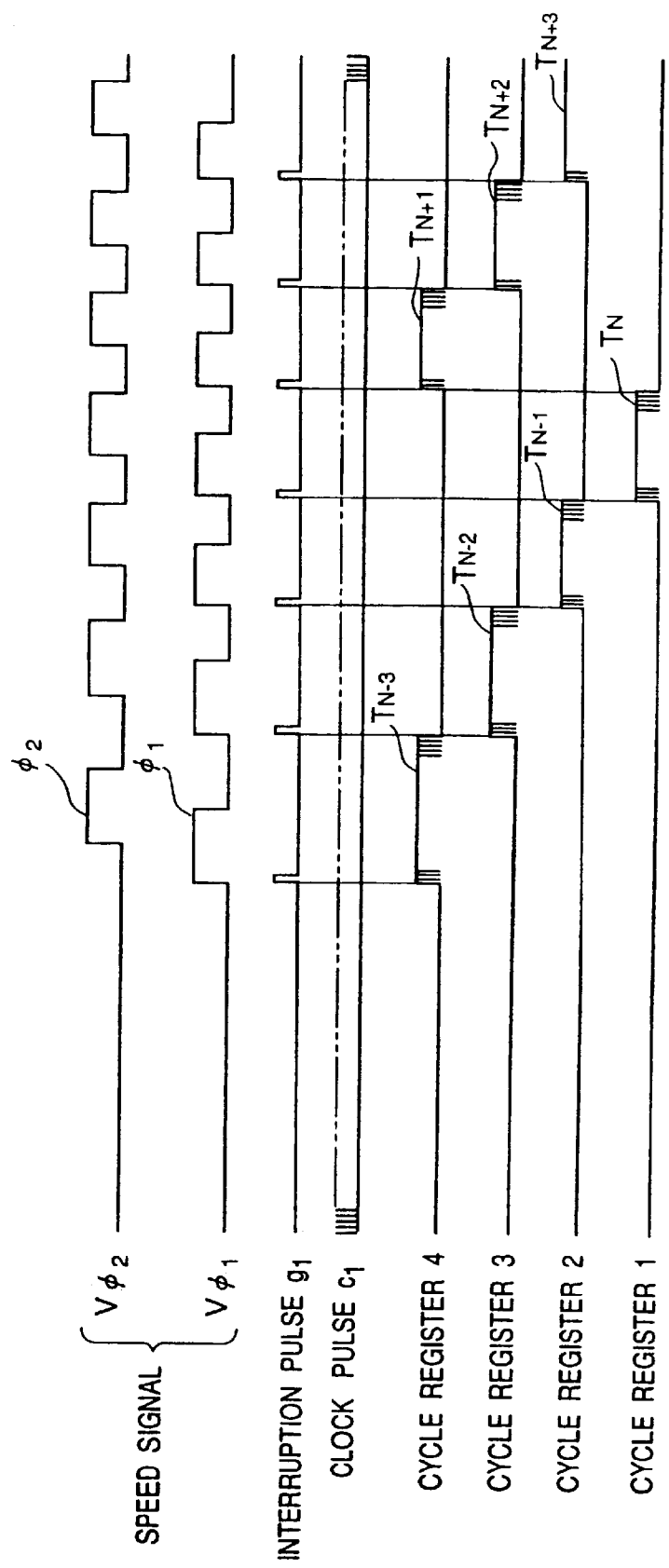
FIG. 11 is a time chart concerning the door movement speed count carried out according to the pulse interruption routine.

FIG. 11 is a time chart for obtaining the cycle count value T and the position count value N, respectively necessary in the routines of the pulse count timer (Step 15A) and the pulse interruption (Step 115B) of the interruption program.

As shown in FIG. 11, speed signals V $\phi1$, $\phi2$ of two phases correspond to two phase pulse signals V $\phi1$, $\phi2$ output from a rorary encoder 18 in order to detect the rotation direction of the rotary encoder 18 or the movement direction of the slide door 2 according to a phase relation of these signals. Concretely, if the pulse signal V$\phi2$ is in L level (as shown) when the pulse signal V$\phi1$ rises, it is determined that, for example, it is the door opening direction. And if the pulse signal V$\phi2$ is in H level, the door closing direction is determined.

Speed calculation portion 42 generates an interruption pulse g1 at the moment of rising of the speed signal V$\phi1$ and counts the pulse number of a clock pulse c1 having a cycle (for example, 400 $\mu$sec) whic his sub-stantially smaller than the interruption pulse g1 during a generation cycle of the interruption pulse g1, obtaining the count value of a cycle count value T. Consequently, the cycle count value T is one obtained by converting a cycle of the pulse signal V$\phi1$ output from the rotary encoder 18 to one of digital value.

For example, presuming that the output pulse of the rotary encoder 18 is one pulse per 1 mm (1 cycle), the movement speed of the slide door 2 becomes 1 mm/(400 $\mu$s×250)=10 mm/sec' when the cycle count value T is 250, and the mevement speed becomes 25 mm/sec when T is 100.

Cycle count values TN−3 to TN+3 shown in FIG. 11, respectively have affixes of the position count value N of the position information of the slide door 2, which information is obtained by counting the position count pulse (substantially, it is an interruption pulse g1) obtained by the output signal $\phi1$ from the rotary encoder 18. Cycle count value TN shows a cycle count value T corresponding to the position of number N noticeable at that moment, so TN−1, TN−2 or TN+1, TN+2 show the cycle count values T concerning the positions before or behind of 1 or 2 from the position count value N.

In addition, according to the prefered embodiment of the invention, a movement speed of the slide door 2 is recognized from the cycle count value of four continuously consecutive cycles of speed signal V$\phi1$, and the invention has four cycle registers 1 to 4 storing the cycle count value of four cycles, so these four cycle registers hold four values of cycle count in this manner that the position of number N is a noticed point and the point becomes the lead output values of these cycle registers 1 to 4.

Conseqently, the routine of the pulse counter timer (Step 115A) and the pulse interruption (Step 115B) gains the cycle count value T and the position count value N at their particular timing different from that of the main routine.

Figure 12:
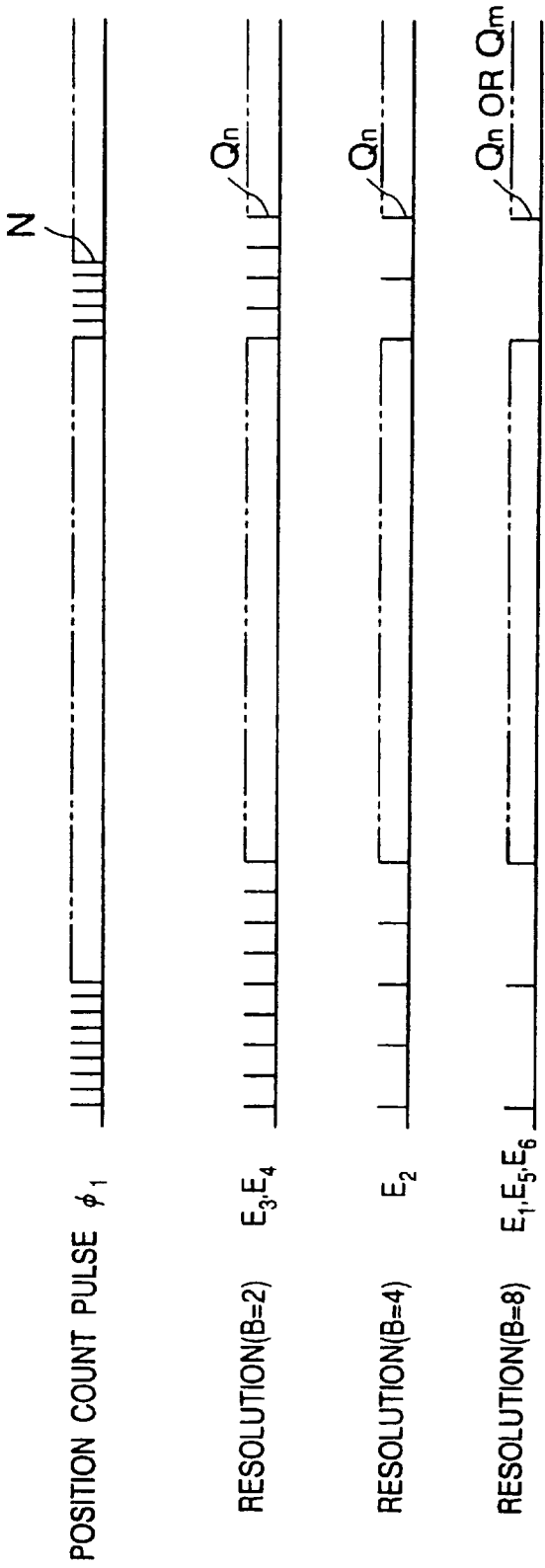
FIG. 12 is a time chart of sampling points of the position count pulse sampled according to resolution in respective areas.

FIG. 12 shows a time chart of sampling points sampled as the position count pulses as the output signal $\phi1$ which the rotary encoder 18 output according to the resolution B at control registers E1 to E6 described below of the slide door 2. That is, the position count pulse $\phi1$ is sampled by a resolution 2 obtained by dividing the positon count pulse $\phi1$ by a half in these control regions E3 and E4, sampled by a resolution 4 obtained by dividing the position count pulse φ1 by a fourth in the control region E2, and sampled by a resolution 8 obtained by dividing the position count pulse φ1 by a eighth in these control regions E1, E5 and E6.

Control Region of Slide Door

Figure 13:
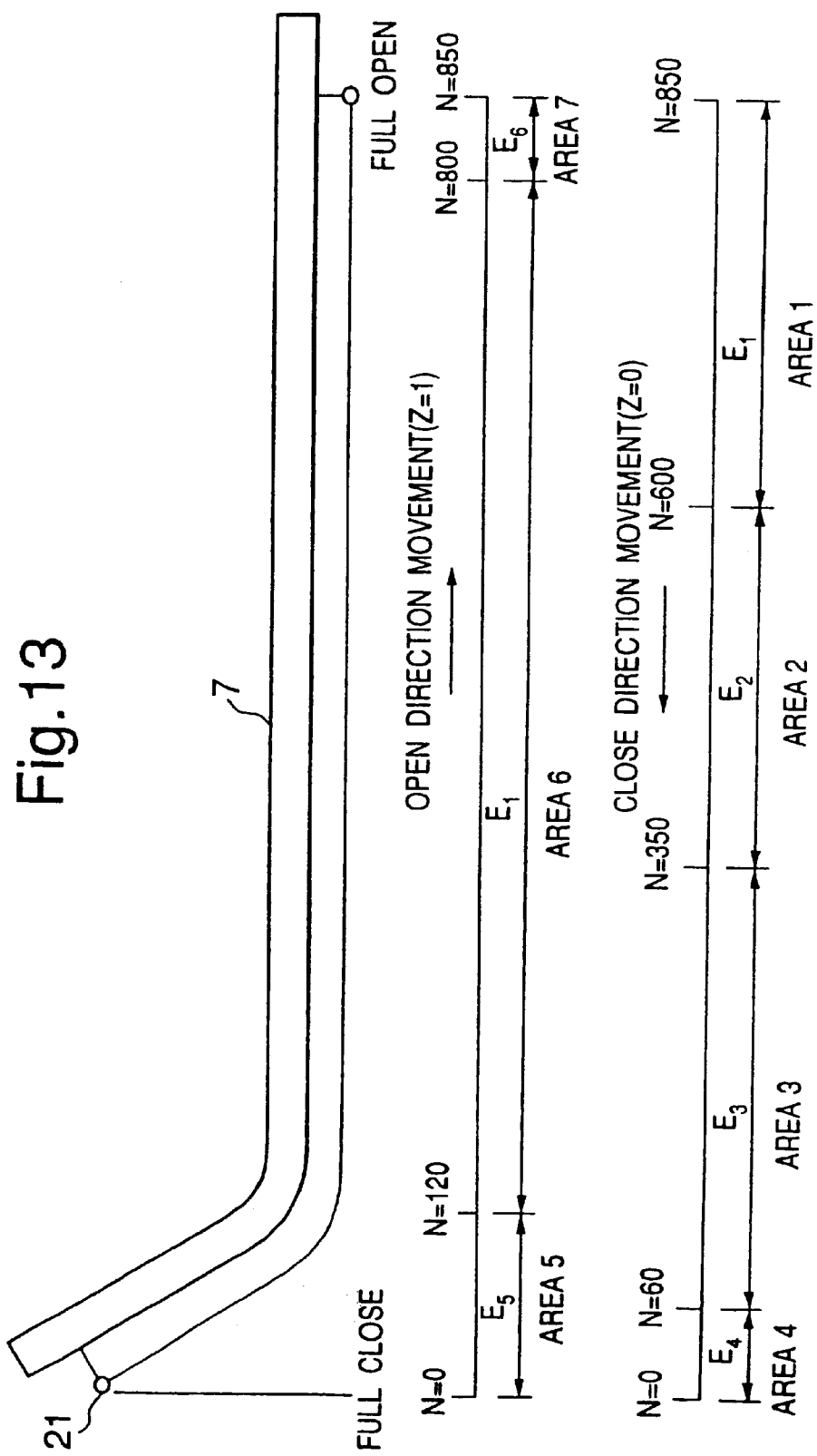
FIG. 13 is a plan view of lower track showing the area according to the resolution between the door open-close position and the position count value and to the open degree of the door.

Here, these control regions E1 to E6 of the slide door 2 will be described. FIG. 13 shows a plan view of the guide track 7. Open and close position of the slide door 2 is shown by a position of the movement member 21. Existence area of the slide door 2 moving along its closing direction is divided into four areas 1 to 4, existence area of the slide door 2 moving along its opening direction is divided into three areas 5 to 7.

It is resumed that the position count value N when the slide door 2 exists at its full-close position is 0(zero) and the position count value N when the slide door 2 exists at its full-open position is 850. In this case, when the slide door 2 moves along its close direction (z=0), N=850 to 600 exists in area 1, N=600 to 350 exists in area 2, N=350 to 60 exists in area 3 and N=60 to 0 exists in area 4. A half at a full-close side within area 4 belongs to an ACTR region. When the slide door 2 moves along its open direction (z=1), N=0 to 120 exists in area 5. N=120 to 800 exists in area 6 and N=800 to 850 exists in area 7.

The areas 1 and 6 are ordinal control region E1, area 2 is a speed reduction control region E2, area 3 is a link speed reduction region E3, area 4 is a pinch control region E4, area 5 is a link speed reduction region E5 and area 7 is a check control region E6. The slide door 2 is controlled by the movement speed etc. suitable to various control region.

Pulse Interruption Routine

Figure 14:
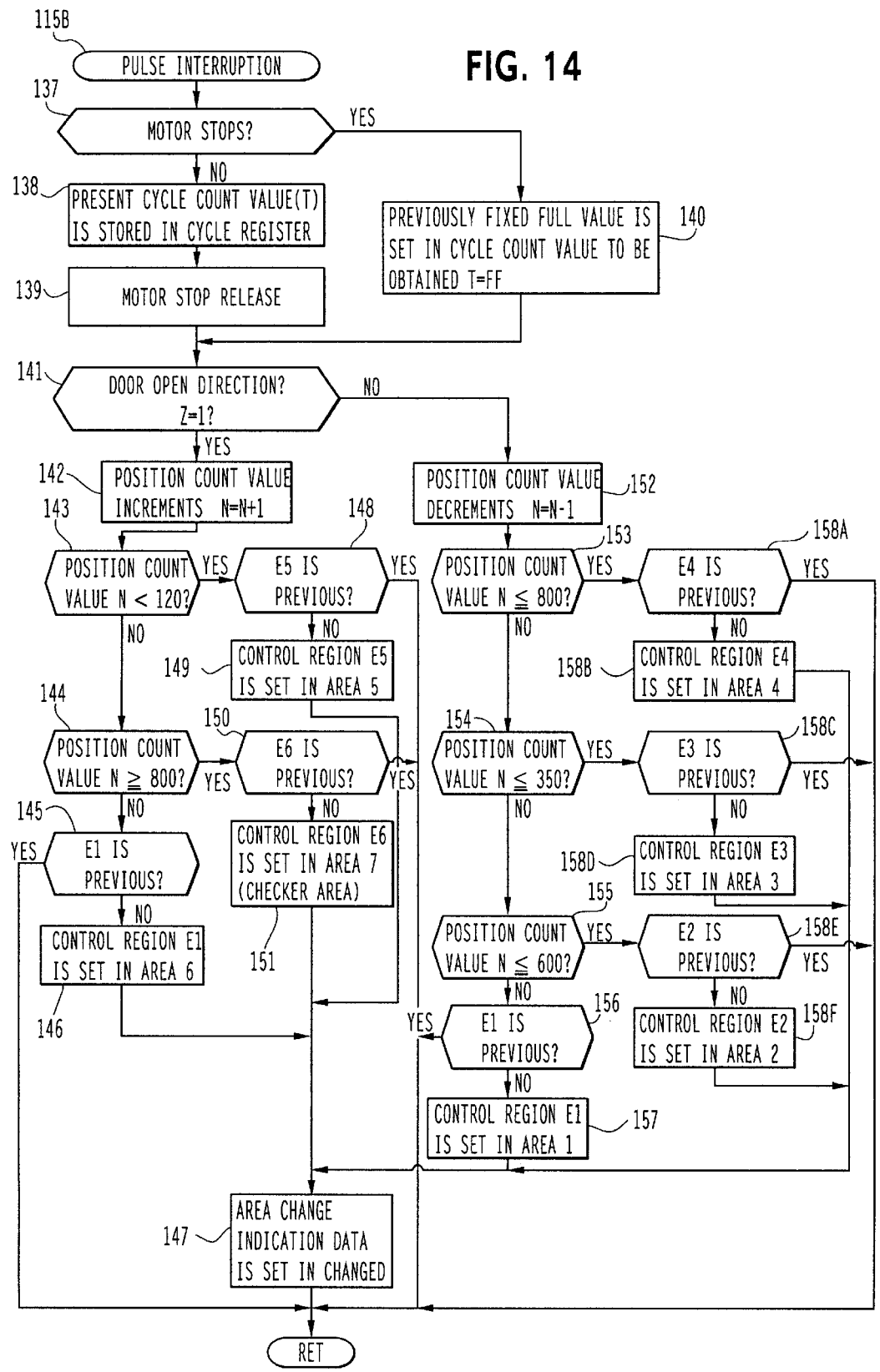
FIG. 14 is a flow chart showing in detail the pulse interruption routine.

FIG. 14 is a flow chart showing the pulse interruption routine (Step 115B). This routine discriminates at every time of generation of the interruption pulse g1 among the areas 1 to 7 and these control regions E1 to E6 (see FIG. 13) in which the slide door 2 exists at that moment according to the position count value N and the door movement direction Z. These areas 1 to 7 and these control regions E1 to E6 will be described below in detail.

First, the routine checks whether the open-close drive motor 14 has been stopped or not (Step 137), and when it is driven, the present cycle count value T is stored in the cycle register (Step 138) in order to release the stop condition of the open-close drive motor 14 (Step 139). When the open-close drive motor 14 has been stopped, a full load value FF (16 digit number) is set on the cycle count value T (Step 140).

Next, the movement direction Z of the slide door 2 is checked (Step 141). When the slide door 2 is moving along its open direction (Z=1), the position count value N is incrementally counted (Step 142). When this position count value N resultantly becomes more than 120 and less than 800 (Steps 143 and 144), the previous region is the control region E1 or not (Step 145). When it is control region E1, the routine judges that the present region is the control region E1, so the process is stopped. When the previous region is not the control region E1, it is set in the control region E1 and the area 6 (Step 146) and an area change indication data is set in "changed"(Step 147), ending the process.

When the position count value N is less than 120 (Step 143), the routine checks whether the previous region is the control region E5 or not (Step 148). If it is the control region E5, the routine judges that it exists at present in the control region E5, ending the process. If the previous region is not the control region E5, it is set on the cotrol region E5 and the area 5 (Step 149) and the area change indication data is set in "changed"(Step 147), ending the process.

When the slide door 2 is moving along its close direction (z=0) (Step 141), the position count value N is decrementlly counted (Step 152). When this position count value N resultantly becomes over 600 (Steps 153 to 155), the routine checks whether the previous region is the control region E1 or not (Step 156). When it is the control region E1, the routine judges that it presently exists in the control region E1, ending the process. When the previous region is not the control region E1, the control region E1 and the area 1 are set(Step 157) and the area change indication data is set in "changed"(Step 147), ending the process.

When a position count value N is less than 60 (Step 153), the routine checks whether the previous region is the cotrol region E4 or not (Step 158A). If it is the cotrol region E4, the routine judges that it is the control region E4 at present and so the process is finished. When the previous region is not the control area E4, the control region E4 and the area 4 are set (Step 158B) and the area change indication data are set in "changed"(Step 147), ending the process.

Pulse Count Timer

FIG. 15 is a flow chart showing a pulse count timer (Step 115A). As shown, the number of a clock pulse C1 is counted by the predetermined pulse counter obtaining the cycle count value T (Step 159) and checking whether the cycle count value T becomes its top number (T=FF) or not (Step 160). When it is not full or topped, it returns to the return step. When it rises to its top number, the cycle count value T is cleared to zero (T=0) (Step 161), the count value of the predetermined counter is increased to make a carrier up (Step 162), returning the process.

Control in Area 1 to 7

FIG. 16 is a memory table for memorizing various data necessary to control the slide door 2 in the areas 1 to 7 described above with reference to FIG. 13. Areas 1 and 6 are called the ordinal control region E1, in which the suitable movement speed T1 of the slide door 2 is 250 mm/sec, a standard duty value D is 250, a resolution B of sampling region is 8 and attention degree is small.

Duty value D shows the duty cycle of the voltage wave shape (square wave) impressed to the motor. According to the embodiment of the invention, 'D=250' means a DC signal of the duty cycle 100% or H level and 'D=0' means a DC signal of the duty cycle 0% or L level. Changing the duty cycle of square wave in 250 steps among these levels (0 to 100%) controls the output torque of the motor.

The area 2 is called the speed reduction control region E2, in which the suitable movement speed T2 of the slide door 2 is 170 mm/sec, the duty value D is 170, the resolution B is 4 and the attention degree is dangerous. The area 3 is the link speed reduction control region E3, in which the suitable movement speed T3 of the slide door 2 is 100 mm/sec, the duty value D is 100, the resolution B is 2 and the attention degree is also dangerous. Furthermore, the area 4 is the pinch control region E4, in which the suitable movement speed T4 is 120 mm/sec, the duty value D is 120, the resolution B is 2 and the attention degree is dangerous.

The area 5 is the link speed reduction control region E5, in which the suitable movement speed T5 is 200 mm/sec, the duty value D is 200, the resolution B is 8 and the attention degree is small. The area 7 is the check control region E6, in which the suitable movement speed T6 is 250 mm/sec and the attention degree is middle.

The resolution B is set at 8 in the areas 1, 6 of the ordinal region E1 having low attention degree and the area 5 of the link speed reduction control region E5. The area 2 of the speed reduction region E2 is dangerous, in which the pinch is apt to happen. However, the area 2 has sufficient openness of the slide door 2, so the resolution B is set in 4. Also, in the area 3 of the link speed reduction control region E3 and the pinch control region E4, the slide door 2 moves along a curved line, and they have most dangerous areas resulting in setting of the finest resolution 2. FIG. 12 shows a sampling region Q fixed on the basis of these resolutions B, in which 'n' shows a closing direction and 'm' shows open direction.

Auto Slide Mode Judgement

Figure 17:
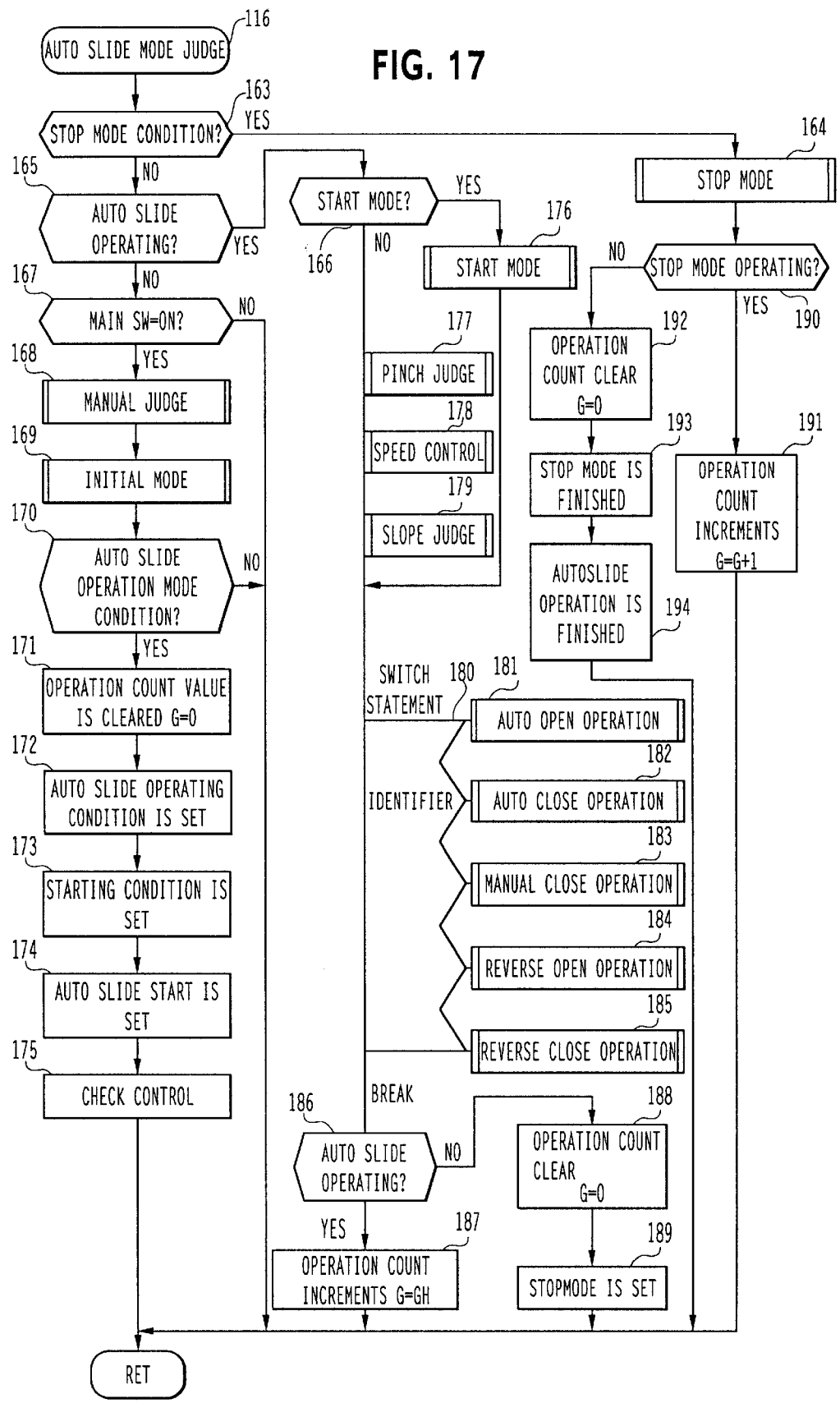
FIG. 17 is a flow chart showing in detail the automatic slide mode judgement routine.

FIG. 17 is a flow chart showing the details of the automatic slide mode judgement routine (Step 116). This routine judges whether it is the automatic slide mode for driving the open-close operation of the slide door 2 or not. When it is not the automatic slide mode, a start of the slide door 2 is judged or determined in order to carry out a process of the automatic slide operation. When an end of the automatic slide operation is found, the stop process of the automatic slide operation is carried out, ending the automatic slide operation.

When the automatic slide operation is stop, it is not in a stop mode condition (Step 163) and not in the automatic slide operation (Step 165), so this routine checks whether the main switch is in ON condition or in OFF condition (Step 167). If the main switch is in OFF condition, the process returns.

When the main switch is in ON condition, manual/start judgement (Steps 168,169) are done. This manual judgement (Step 168), which will be described in detail (FIG. 18), sets a manual open condition or a manual close condition when the slide door 2 has moved at a speed higher than the predetermined one, and prepares the transfer to the automatic slide operation mode.

After the manual judgement is finished, a start mode judgement (Step 169) is done in order to determine the automatic slide operation mode. When the switch judgement (Step 102) detects the door opening of the remote switch 30 or the ON condition of the door open switch 28, or the manual judgement (Step 168) confirms the manual open condition, the automatic open operation mode (Step 181) is set. Also when the ON condition of the door close switch 29 is detected or the manual close condition is confirmed, it is set on the automatic close operation mode (Step 182). When the ON status of the door close switch 29 is detected in the dangerous regions, the manual close operation mode (Step 193) is set.

When the start mode judgement (Step 169) is finished as described above, this routine judges whether it is on the automatic slide operation mode or not (Step 170). When it is not the automatic slide operation mode, it returns. When it is the automatic slide operation mode, it means that the automatic slide operation mode starts, so the operation count value G is cleared (Step 171), the condition of the automatic slide operation carrying out is set (Step 172), the condition of starting is set (Step 173) and the automatic slide start is set (Step 174). Thus, the automatic slide operation has been set.

A check control (Step 175) is for controlling the temporary hold of the slide door 2, or the stop and hold of the slide door 2 with making the electromagnetic clutch 16 in its half-clutched condition. When the automatic slide operation is carrying out, the step 175 functions after the stop mode is finished. While the manual operation is carrying out, it functions after the confirmation of the stop condition of the slide door 2.

When the automatic slide start is set in the steps 168 to 174, the automatic slide mode judgement routine is carried out, in which the automatic slide operation and the start mode (Steps 165,166) are judged, carrying out a process of the start mode (Step 176).

This start mode discriminates the mode for starting the automatic slide operation driving the slide door 2 according to the ON/OFF condition of various switches and the environmental situations, and the control is done with the mode discriminated by the start mode. The detailed explanation of the control will be described later. When next the automatic slide mode judgement routine is done after the start mode is finished, this process enters in ordinal mode, being carried out a pinch judgement (Step 177), a speed control (Step 178) and a slope judgement (Step 179). These steps will be explained later in detail.

According to the open/close condition of various switches obtained in the start mode judgement (Step 169), process is branched to, through the switch statement 180, an automatic open operation (Step 181), an automatic close operation (Step 182), and a manual close operation (Step 183). When a pinch is detected in these operations, it is branched to a reverse open operation (Step 184) and a reverse close operation (Step 185).

It is noted that, while the automatic slide is operating (Step 186), the operation count value G is incremently counted (Step 187), returning to the return step (RET). When the routine judges that the automatic slide operation has been finished (Step 186), the operation count value G is cleared (Step 188) and the stop mode is set (Step 189), returning to the return step.

When the stop mode is set (Step 189), the stop mode condition is judged in next the automatic slide mode judgement routine (Step 163), carrying out the stop mode (Step 164). This stop mode controls the timing of the OFF of the electromagnetic clutch 16 and the OFF of the open-close drive motor 14 in order to obtain a safety control in stopping the drive of the slide door 2 when the open/close of the slide door 2 is controlled in the automatic slide mode.

That is, when the slide door 2 stops at the mid position between its full-open position and its full-close position, the open-close drive motor 14 is first stopped, then the electromagnetic clutch 16 is turned OFF after a predetermined waiting time. When the slide door 2 is in full-close condition, the open-close drive motor 14 and the electromagnetic clutch 16 are immediately and simultaneously turned OFF. While the stop mode is operating, the operation count value G is incremently counted (Step 191), returning to the return step. After the stop mode is finished, the operation count value G is cleared (Step 192), the stop mode is released (Step 193), the automatic slide operation is stopped (Step 194), returning to the return step.

Manual Judgement Routine

Figure 18:
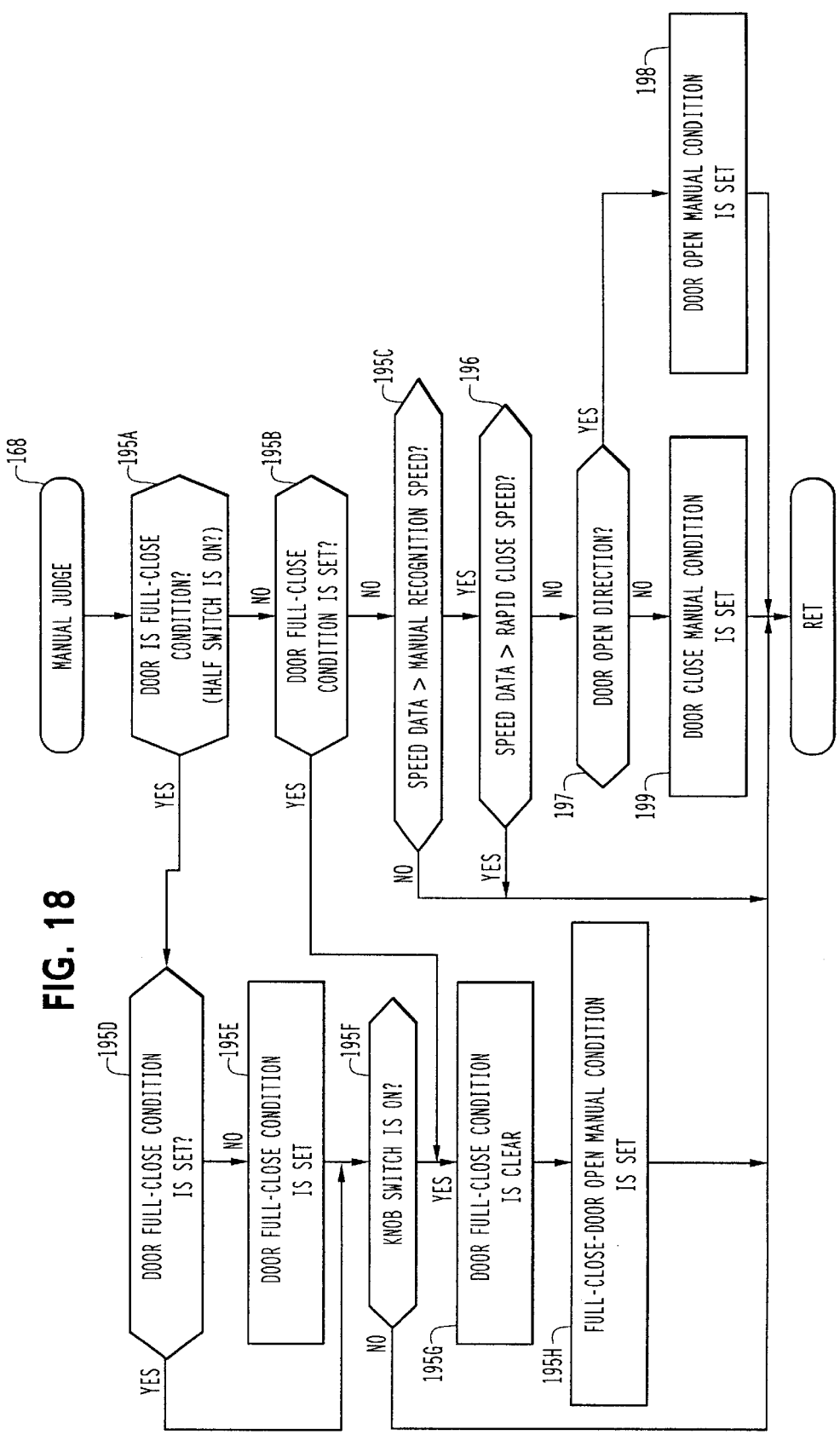
FIG. 18 is a flow chart showing in detail the manual judgement routine.

FIG. 18 is a flow chart showing in detail a manual judgement routine (Step 168). This routine detects a door speed measured differently from the main routine controlling the slide door 2, so that this routine recognizes that the slide door 2 is manually operated and obtains a start timing of the power drive.

First, the routine judges whether the slide door 2 is in full-close condition (half switch is ON) or not (Step 195A). then the slide door 2 is in full-close condition, this routine judges whether it is set in the door full-close condition or not (Step 195D). If it is not set in such condition, it is set in the door full-close condition (Step 195E). Next, it is judged whether the door knob 37 has been operated and the knob switch 37a has been turned ON or not (Step 195F). If it doesn't turn ON yet, it returns. When the knob switch 37a turns ON (Step 195F), the door full-close condition is cleared (Step 195G), the full-close door manual open condition is set (Step 195H), returning to the return step.

When the slide door 2 is not in its full-close condition (Step 195A), it is judged whether the door full-close condition is set or not (Step 195B). If it is set, the door full-close condition is cleared (Step 195G), setting the full-close door manual open condition (Step 195H). In detail, the slide door 2 is opened by pulling the door knob 37 in ordinal cases, resulting in a clear of the full-close condition of the slide door 2 (Steps 195F, 195G). In case that the knob switch 37a is not functioning or such knob switch 37a is not employed, the OFF condition of a half switch is detected clearing the door full-close condition (Steps 195A,195B,195G), and the full-close door manual open condition is set (Step 195H).

When the door full-close condition is not set (Step 195B), the speed data (a/T:a is resolution of rotary encorder) indicating a door movement speed is higher than the predetermined manual recognition speed (Step 195C). Furthermore, when it is less than a rapid close speed (Step 196), either Rode of the door open manual condition (Step 198) and the door close manual condition (Step 199) is set according to the open and close direction. When the door speed is lower than the manual recognition speed (Step 195C), the stop condition of the slide door 2 is recognized, returning to the return step. When the door speed is more than the rapid close speed (Step 196), it returning to the return step in order to protect the mechanism and keep the manual close operation.

However, after the electromagnetic clutch 16 is turned OFF, movement due to tension of wire is disregarded, so that any transfer of the door condition to anyone of close and open ones is not accepted during a predetermined time lag. In addition, when this routine detects the OFF condition of the half switch or the operation signal of the door knob switch 37a while the slide door 2 is almost full closed, a manual open detection signal is specially set.

Furthermore, the manual recognition speed is of a value generating a start of power drive for the slide door 2. This value can be set relatively and willingly within a wide range. The movement speed of the slide door 2, that is to say, the cycle count value T is measurable by the rotary encorder 18 using its one cycle of the smallest resolution, so that it is possible to generate a chance or start of power drive for the slide door 2 by a movement of the slide door 2 of even 1 mm. Consequently, response of the automatic open and close operation becomes of high sensibility and detection of mevement change of the slide door 2 becomes of high resolution and high sensibility, resulting in high safety.

Auto Open Operation Routine

Figure 19:
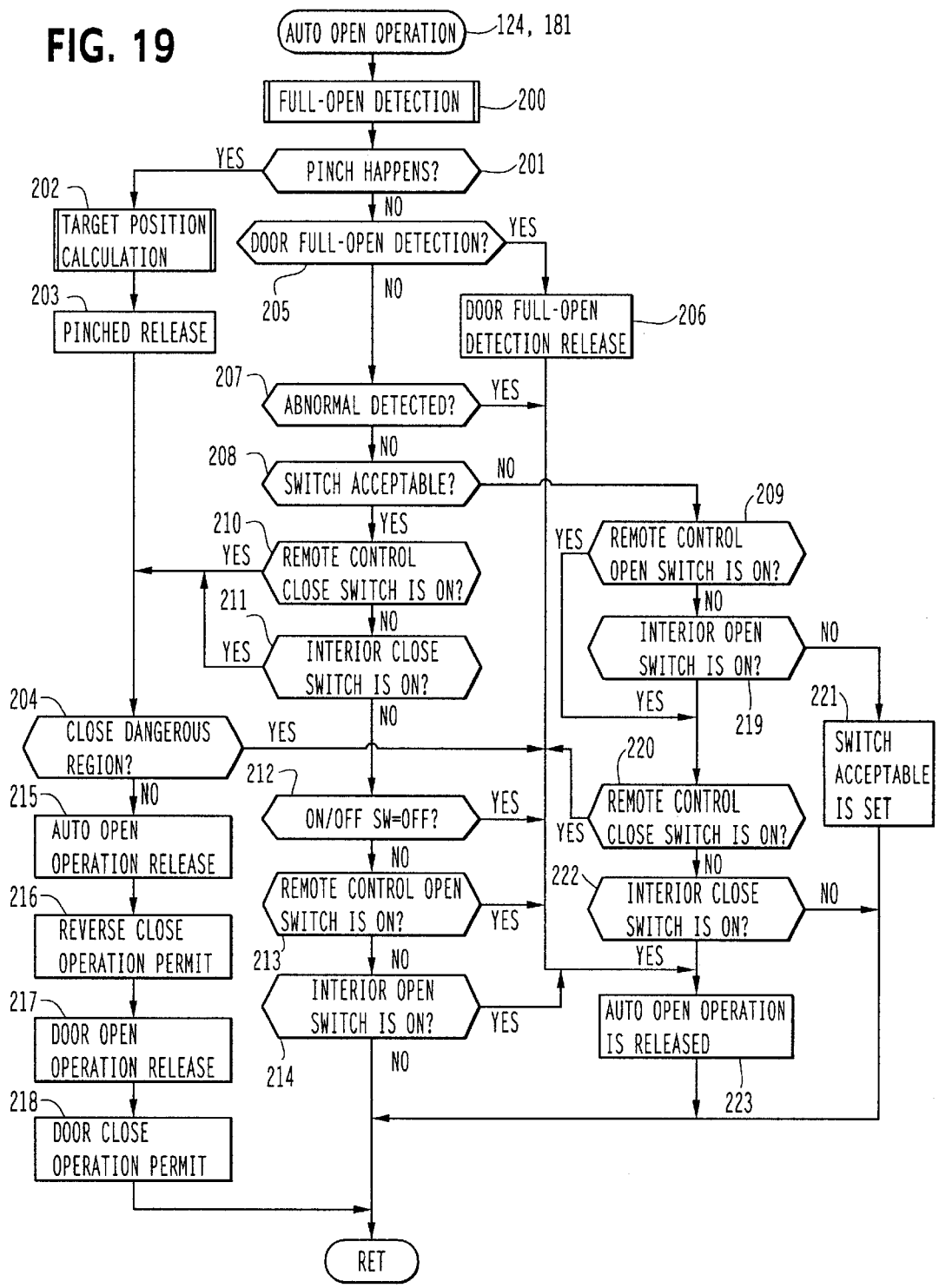
FIG. 19 is a flow chart showing in detail the automatic open operation routine.

FIG. 19 is a flow chart showing the detail of the automatic open operation routine (Steps 122 and 181). This routine selects through switch statement 180 when the remote controller 30 operates to the door open, or the door open switch 28 is turned ON, or the manual door open condition is recognized, and controls the stop operation of driving the slide door 2 or the reverse operation in the automatic open operation in order to drive on safty the slide door 2 in the open direction.

First, the full-open detection (Step 200) detects as described later in detail whether the slide door 2 is in the full-open condition or not. After this Step 200 is finished, a pinch judgement (Step 201) is carried out (Step 201). If a pinch is not existed, it is judged that the full-open detection detects a full-open condition or not (Step 205). In case that the slide door 2 is not in the full-open condition and not in the abnormal condition (Step 207), a switching operation can be acceptable (Step 208), close switch of the remote controller 30 and the door close switch 29 are in OFF condition (Step 210,211), main switch is in ON condition (Step 212) and open switch of the remote controller 30 and the door open switch 28, respectively are in OFF condition (Steps 213 and 214), it is returned to the returning step and the automatic open operation is continued.

When a pinch is detected (Step 201), a target position count for transferring a control toward the reverse direction is computed (Step 202) and a pinched condition is released (Step 203). If it is not in the close dangerous region (areas 2 to 4) (Step 204), the automatic open operation is released, the reverse close operation is permitted, the door open operation is released, the door close operation is permitted (Steps 215 to 218), returning to the return step. If it is in the close dangerous region, the automatic open operation is allowed (step 223), returning to the return step.

When the slide door 2 reaches its full-open position (Step 205), the door full-open detection is released (Step 206), the automatic open operation is released (Step 223), returning to the return step. Also, in case that the abnormal conditions such as the motor being locked are detected (Step 207), the automatic open operation is released (Step 223), returning to the return step. Consequently, the electro-magnetic clutch 16 and the open-close drive motor 14 are controlled by releasing the automatic open operation (Step 223), stopping the slide door 2 (Steps 106, 107).

According to the embodiment of the invention, the open and close switches are all of a push ON/push OFF type. When any switch is kept in pressed condition, a condition in which switch is not acceptable is judged (Step 208), and ON/OFF condition of respective open and close switches are confirmed.

That is, when at least anyone of the open switch of the remote controller 30 or the door open switch 28 is in the ON condition (Steps 209,219) and both of the close switch of the remote controller 30 and the door close switch 29 are in the OFF condition (Steps 220, 222), it is returned to continue the automatic open operation. If at least anyone of the open switch of the remote controller 30 or the door open switch 28 is in the ON condition (Steps 209, 219) and at least anyone of the close switch of the remote controller 30 or the door close switch 29 is in the ON condition (Steps 220, 222), it is said that both of the open switch and the door open switch are in the ON condition, so that the automatic open operation is released (Step 223), returning to the return step. If both of the open switch of the remote controller 30 and the door open switch 28 are in the OFF condition (Steps 209, 219), a switch acceptable condition is set (Step 221), returning to the return step.

When it is possible to accept a switch function (Step 208), that is, all open switch and close switch are in the OFF condition, at least either the close switch of the remote controller 30 or the door close switch 29 (Steps 210, 211), it is judged that an interruption of the door close operation has been output and it is transferred to the process after the step 204 mentioned above.

After the main switch is turned OFF (Step 212), the automatic open operation is released (Step 223) to stop the open-close drive Rotor 14, returning to the return step. When either the open switch of the remote controller 30 or the door open switch 28 is turned ON (Steps 213, 214), it is said that the open switch of the push ON/push OFF type is again turned ON, and the automatic open operation is released in order to stop the slide door 2 at this position (Step 223), returning to the return step.

Auto Close Operation Routine

Figure 20:
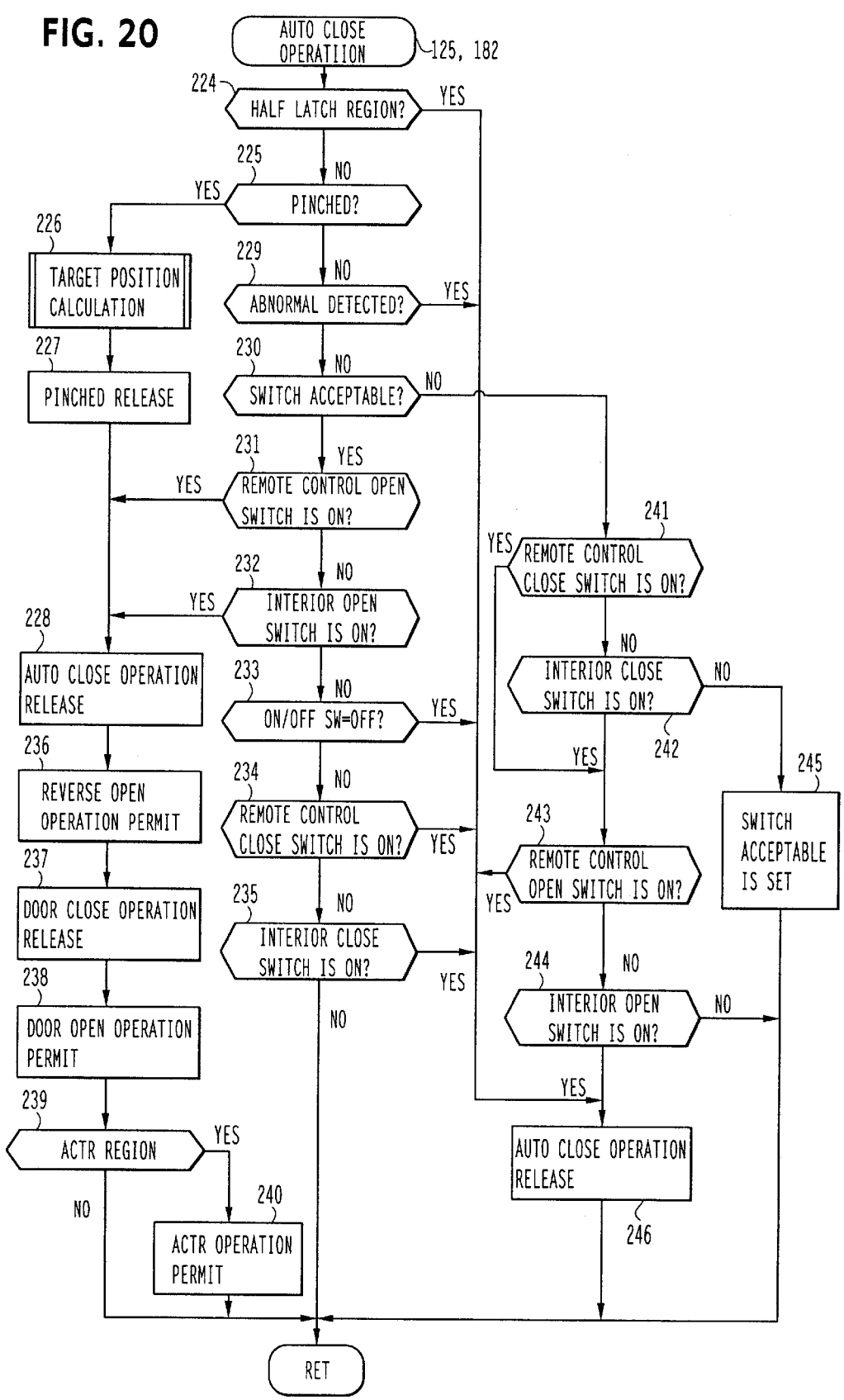
FIG. 20 is a flow chart depicting in detail the automatic close operation routine.

FIG. 20 is a flow chart showing the detail of an automatic close operation routine (Steps 123, 182). This automatic close operation routine makes the remote controller 30 a codition of the close door or the door close switch 29 the ON condition, or it is selected through the switch statement 180 when the door close manual condition is recognized. And this routine controls the stop operation of driving the slide door 2 or the reverse operation in the automatic close operation in order to drive on safety the slide door 2 in the close direction.

When the slide door 2 reaches its half-latched region (Step 224), the automatic close operation is released (Step 246), returning to the return step. When the slide door 2 exists out of the half-latched region, a pinch judgement is carried out (Step 225). When no pinch is existed, in normal condition, switching is acceptable, both the open switch of the remote controller 30 and the door open switch 28 are in the OFF condition, the main switch is ON, and both the close switch of the remote controller and the door close switch 29 are in the OFF condition (Steps 229 to 235), the condition is in the automatic close operation, so it returns to the return step.

When a pinch is detected (Step 225), the target position count is carried out in order to move the slide door 2 along the opposite direction (Step 226), releasing a pinched condition (Step 227), the automatic close operation is released (Step 228), the reverse open operation is permitted, the door close operation is released, and the door open operation is permitted (Steps 236 to 238). When the slide door 2 is not in the ACTR region, the step is returned to the return step. When it is in the ACTR region (Step 239), the ACTR operation is permitted (Step 240), returning to the return step.

When an abnormal current is flown by the motor lock and the like and it is detected (Step 229), the automatic close operation is released (Step 246), returning to the return step. Then, the electromagnetic clutch 16 and the open-close drive motor 14 are controlled in order to stop the slide door 2 (Steps 106, 107).

When any open and close switch is kept in compressed condition and it is judged that it is not a switching acceptable condition (Step 230), ON/OFF condition of respective open and close switch is confirmed. That is, when at least either the close switch of the remote controller 30 and the door close switch 29 is in the ON condition (Steps 241, 242) and both the open switch of the remote controller 30 or the door open switch 28 are in the OFF condition (Steps 243, 244), then it returns to continue the automatic close operation.

When the open switch of the remote controller 30 or the door open switch 28 is in the ON condition (Steps 243, 244), it is said that both these open switches are in the ON condition, so that the automatic close operation is released (Step 246) and it returns to the return step. On the contrary, when both the close switch of the remote controller 30 and the door close switch 29 are in the OFF condition (Steps 241, 242), the switching acceptable condition is set (Step 245), returning to the return step.

When either the open switch of the remote controller 30 or the door open switch 28 is turned ON (Steps 231, 232) during being in the switching acceptable condition (Step 230), it is judged that the door open operation is instructed, so a process is transferred to another process after the step 228 mentioned above.

When the main switch turns OFF (Step 233), the automatic close operation is released (Step 246), returning to the return step. When either the close switch of the remote controller 30 or the door close switch 29 is turned ON (Steps 234, 235), it is said that the close switch of push ON/push OFF type is again turned ON, so in order to stop the slide door 2 at this position, the automatic close operation is released (Step 246), returning to the return step.

Manual Close Operation Routine

Figure 21:
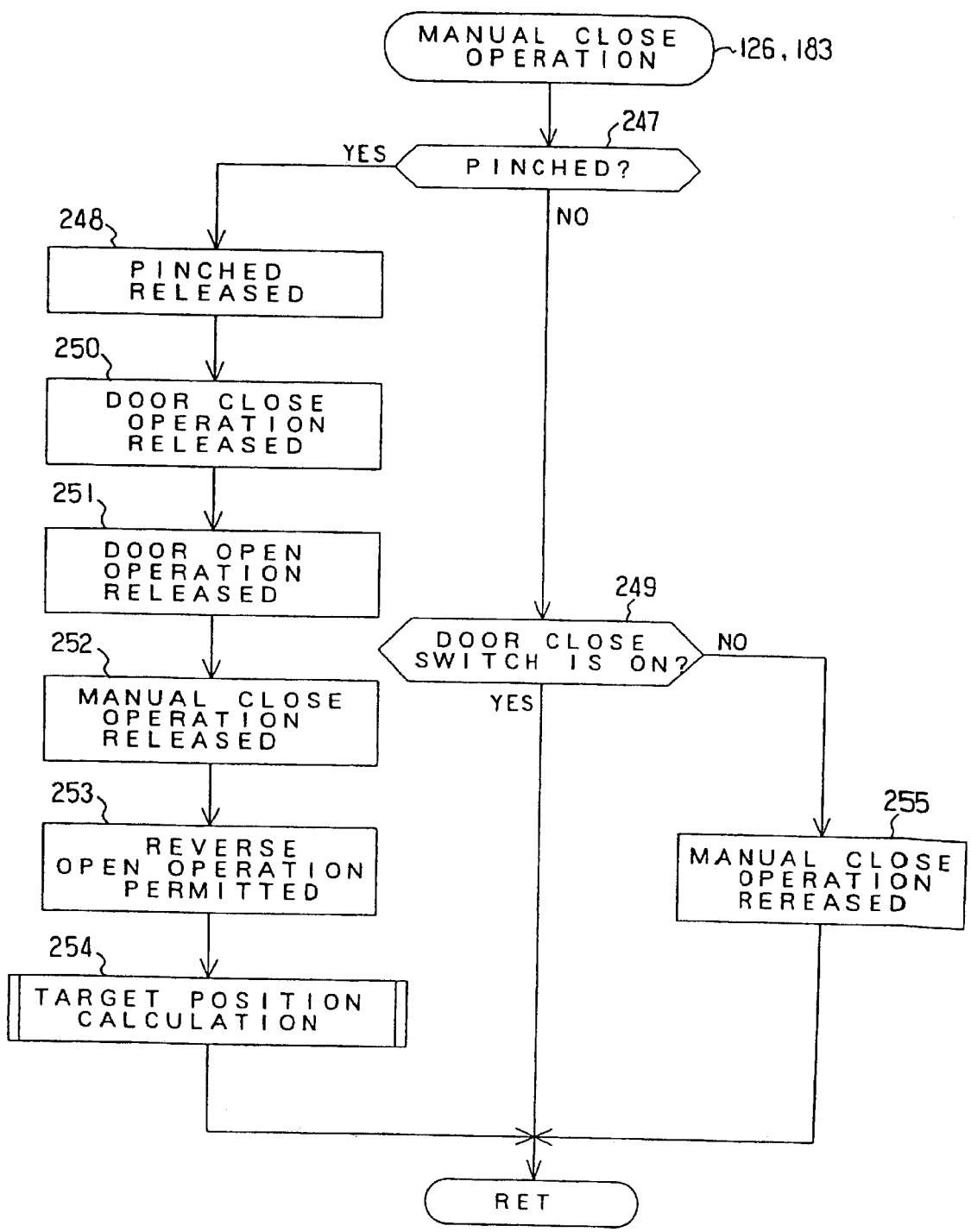
FIG. 21 is a flow chart depicting in detail the manual close operation routine.

FIG. 21 is a flow chart showing a manual close operation routine (Steps 126, 183) in detail. This routine recognizes that the door close switch 29 is turned ON in the dangerous region, then it is selected in the switch statement 180, generating a close operation only while an operator is pressing the door close switch 29 and a stop mode for the slide door 2 when the door close switch 29 pressed by the operator is released.

This routine first carries out a pinch judgement (Step 247). When no pinch is occurred, it judges whether the door close switch 29 is in the ON condition or not (Step 249). When the door close stitch 29 is in the ON condition, this routine returns to the return step. When the door close switch 29 is not in the ON condition, the manual close operation is released (Step 255), returning to the return step. The electromagnetic clutch 16 and the open-close drive motor are controlled by releasing the manual close operation (Step 255), so the slide door 2 is stopped (Step 106,107).

If the pinch is detected (Step 247), a pinched condition is released (Step 248) and the door close operation is released in order to transfer the control in the reverse direction, the door open operation is permitted, the manual close operation is released, the reverse open operation is allowed, the target position calculation is carried out (Steps 250 to 254), returning to the return step.

Reverse Open Operation Routine

Figure 22:
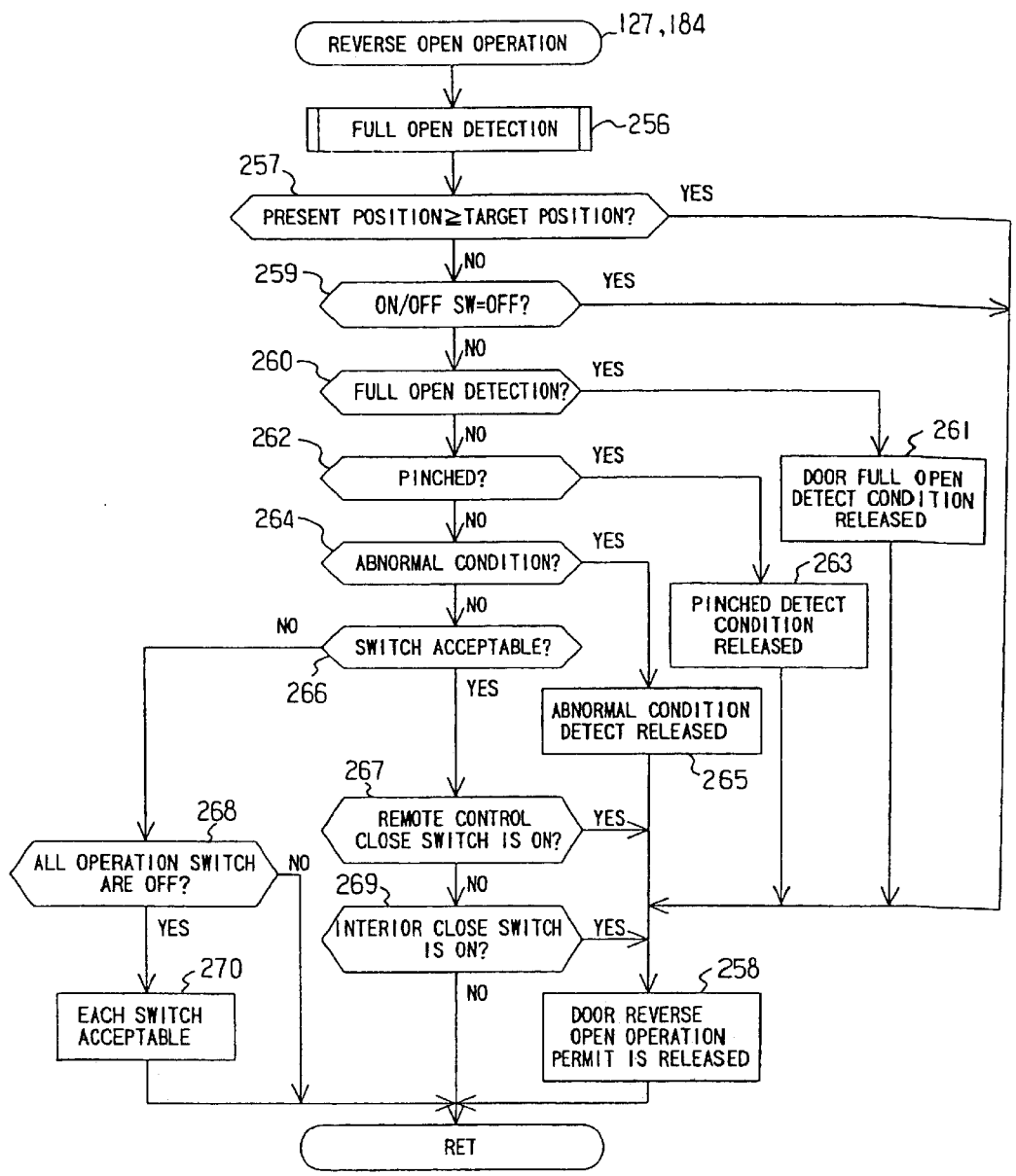
FIG. 22 is a flow chart showing in detail the reverse open operation routine.

FIG. 22 is a flow chart showing in detail the reverse open operation routine (Steps 127, 184). This routine reverses the movement of the slide door 2, moves it to the calculated target position and stops the slide door 2 at that position when a pinched is judged during the automatic close operation (FIG. 20), or the manual close operation (FIG. 21). This routine is a mode for safely controlling the stop of the slide door 2 or the reverse operation of the slide door 2.

This routine first functions the full-open detection (Step 256) to judge a full-open condition of the slide door 2. After such full-open detection is completed, the routine judges whether the slide door 2 is at the calculated target position or not by using the present position count value N (Step 257). In case that the door 2 is not at the target position, the main switch is in the ON condition (Step 259), the slide door 2 is not at full-open position (Step 260), there is no pinch (Step 262), it is not abnormal condition (Step 264), it is in the switch acceptable condition (Step 266), and both the close switch of the remote controller 30 and the door close switch 29 are in the OFF condition (Steps 267, 269), it is said that the reverse open operation is functioning, so it returns to the return step.

When the slide door 2 reaches the target position (Step 257), or the main switch is in the OFF condition (Step 259), the reverse open operation is released (Step 258), returning to the return step. If the slide door 2 is at its full-open position, a door full-open detection is released (Steps 260, 261). Detecting a pinch, a pinched condition is released (Steps 262, 263). Detecting an abnormal condition such as the motor lock and the like, the abnormal condition detection is released (Steps 264, 265) and respective the reverse open operation is released (Step 258), returning to the return step. The electromagnetic clutch 16 and the open-close drive motor 14 is controlled by releasing Such the reverse open operation (Step 258) and the main routine stops the slide door 2 (Steps 106, 107).

When the close switch of the remote controller 30 or the door close switch 29 is in the ON condition during the switch acceptable condition (respective open and close switches are in the OFF condition) (Steps 267. 269), the reverse open operation is released (Step 258) and the open-close drive motor 14 is stopped, returning to the return step.

When it is not in-the switch acceptable condition (Step 266), ON/OFF condition of respective open and close switches are confirmed. If all open and close switches are not in the OFF condition (Step 268), it returns to the return step. If all switches are in the OFF condition, a switching acceptable condition is set (Step 270), returing to the return step. It is said that, when a pinch is occurred and the reverse rotation is occurred during, for example, a manual close operation, the door close switch 29 may be pressing. In order to continue this mode even the case mentioned above is occurred, the steps above are functioned.

Reverse Close Operation Routine

Figure 23:
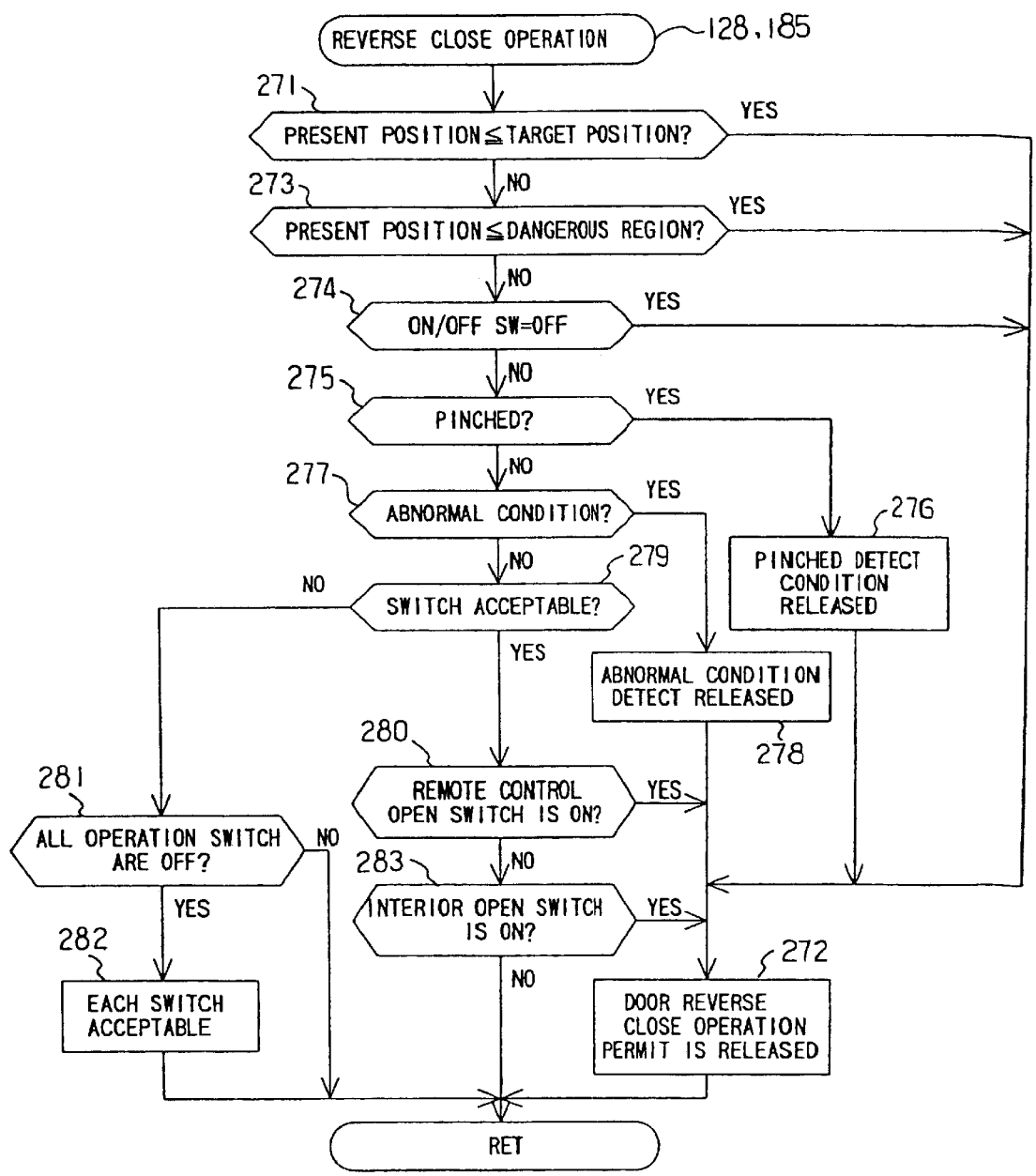
FIG. 23 is a flow chart showing in detail the reverse close operation routine.

FIG. 23 shows a flow chart showing in detail a reverse close operation routine (Steps 128, 185). The mode of this routine reverses the slide door 2, moves it to the target position calculated after a pinch is detected during the automatic open operation (FIG. 19) and stops the slide door 2 at that position in order to safely control such the stop operation or the reverse operation of the slide door 2.

The routine first judges by means of the present position count value N whether the slide door 2 is at the target position or in the dangerous region (areas 2 to 4) (Steps 271, 273). When the present position of the slide door 2 is at neither the target position and the dangerous region, the main switch is in the ON condition (Step 274), there is no pinch (Step 275), no abnormal situation (Step 277), it is in the switch acceptable condition (Step 279) and both the open switch of the remote controller 30 and the door open switch 28 are in the OFF condition (Steps 280, 283), it is in the reverse close operation, so that it returns to the return step.

When the slide door 2 is at the target position or in the dangerous region (Steps 271, 273), or the main switch is in the OFF condition (Step 274), the reverse close operation is released (Step 272), returning to the return step. The electromagnetic clutch 16 and the open-close motor 14 are controlled by releasing the reverse close operation (Step 272), and so the main routine stops the slide door 2 (Steps 106, 107).

In addition, when the pinch is detected, a pinched condition is released (Steps 275, 276). When the abnormal situation such as the motor lock is detected, the abnormal condition is released (Steps 277, 278) and respective the reverse close operation is released (Step 272), returning to the return step.

When the open switch of the remote controller 30 or the door open switch 28 is turned ON (Steps 280, 283) during the switching acceptable condition (respective open and close switches are in the OFF condition), the reverse close operation is released (Step 272), returning to the return step.

When it is not a switching acceptable condition (Step 279) and all open and close switches are not in the OFF condition (Step 281), it returns to the return step. When all switches are in the OFF condition, the switching acceptable condition is set (Step 282), returning to the return step. This is done because, when a pinch is happened during the automatic open operation and it is reversely rotated, the door open switch 28 may be pressing-down and it is neccesary to continue this mode even though the door open switch 28 is pressing.

Target Position Calculation Routine

Figure 24:
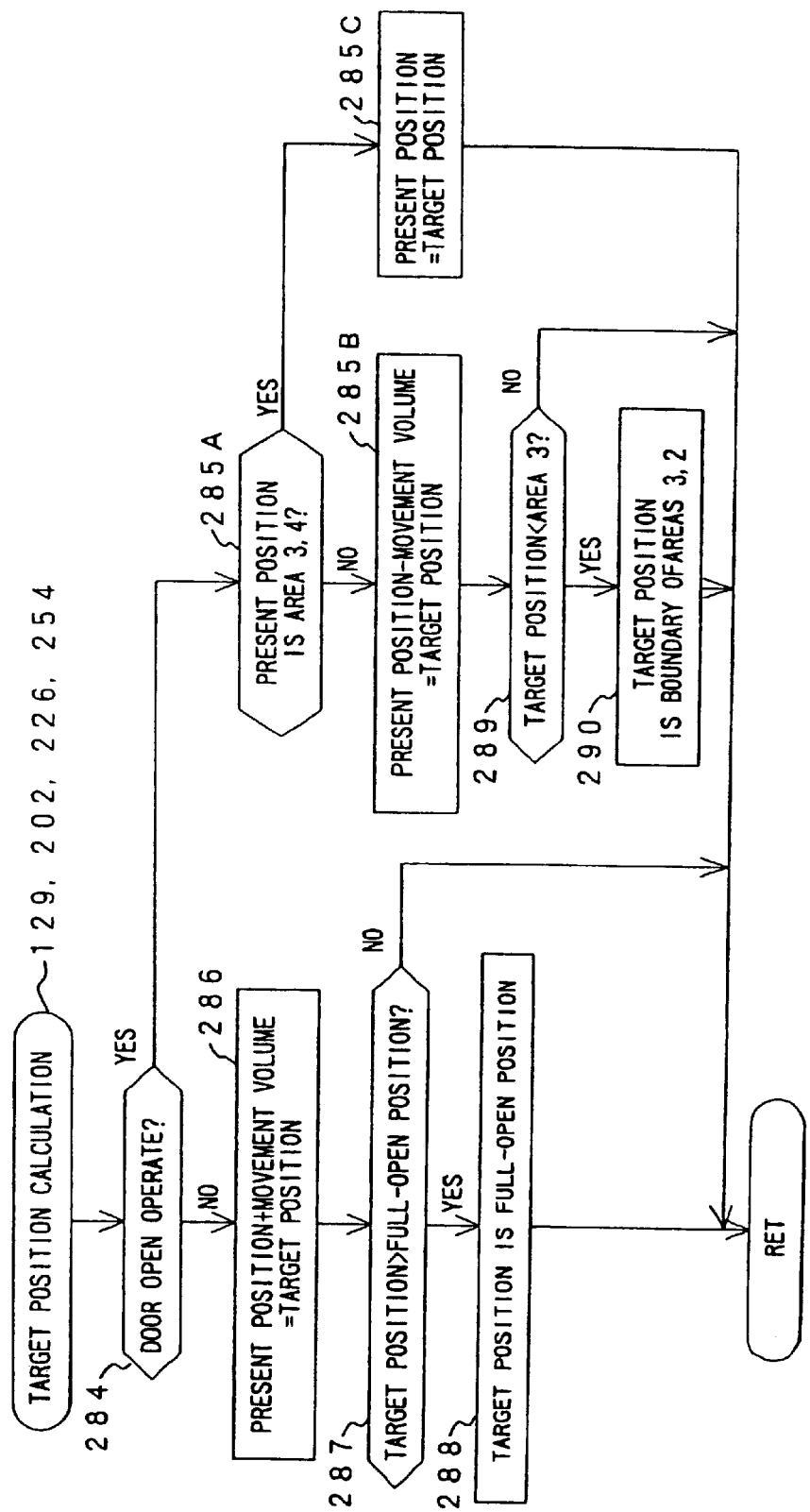
FIG. 24 is a flow chart showing in detail the target position calculation routine.

FIG. 24 is a flow chart depicting a target position calculation routine (Steps 202, 226, 254) in detail. This routine calculates the target position used to reverse the movement direction of the slide door 2 at the moment of detecting a pinch during the automatic open operation (FIG. 19), the automatic close operation (FIG. 20) or the manual close operation (FIG. 21) and move the slide door 2 to the safe position.

First this routine discriminates a movement direction of the slide door 2 (Step 284). If it discriminates that the slide door 2 is moving in the open direction, this routine judges whether its present position of the slide door 2 is in area 3 or 4 (Step 285A). When its present position is in the area 3 or 4, its present position is used as the target position (Step 285C). According to this step 285C, it nay be dangerous at generating again a pinch in the reverse close operation of generating a pinch during the open operation. Therefore, the reverse close operation is prohibited in the areas 3 and 4. This is the reason of supporting that the present position is used as the target position of the slide door 2.

When the slide door 2 is positioned in neither areas 3 and 4, a previously determined movement distance (movement volume) is subtracted from the present position value shown by a position count value N and this resultant of calculation is the target position value (Step 285B). However, when the target position value is in the dangerous region of less than the area 3 (Step 289), a boundary value (N=350) between areas 2 and 3 is used as the target position (Step 290).

When this routine judges that the slide door 2 is moving in the close direction, a previously determined movement distance (movement volumeis added to the present position value shown by the position count value N and this resultant of calculation is used as the target position value (Step 286). When the target position value increases more than the full-open position (N=850) (Step 287), the full-open position value is used as thetarget position (Step 288).

Full-Open Detection Routine

Figure 25:
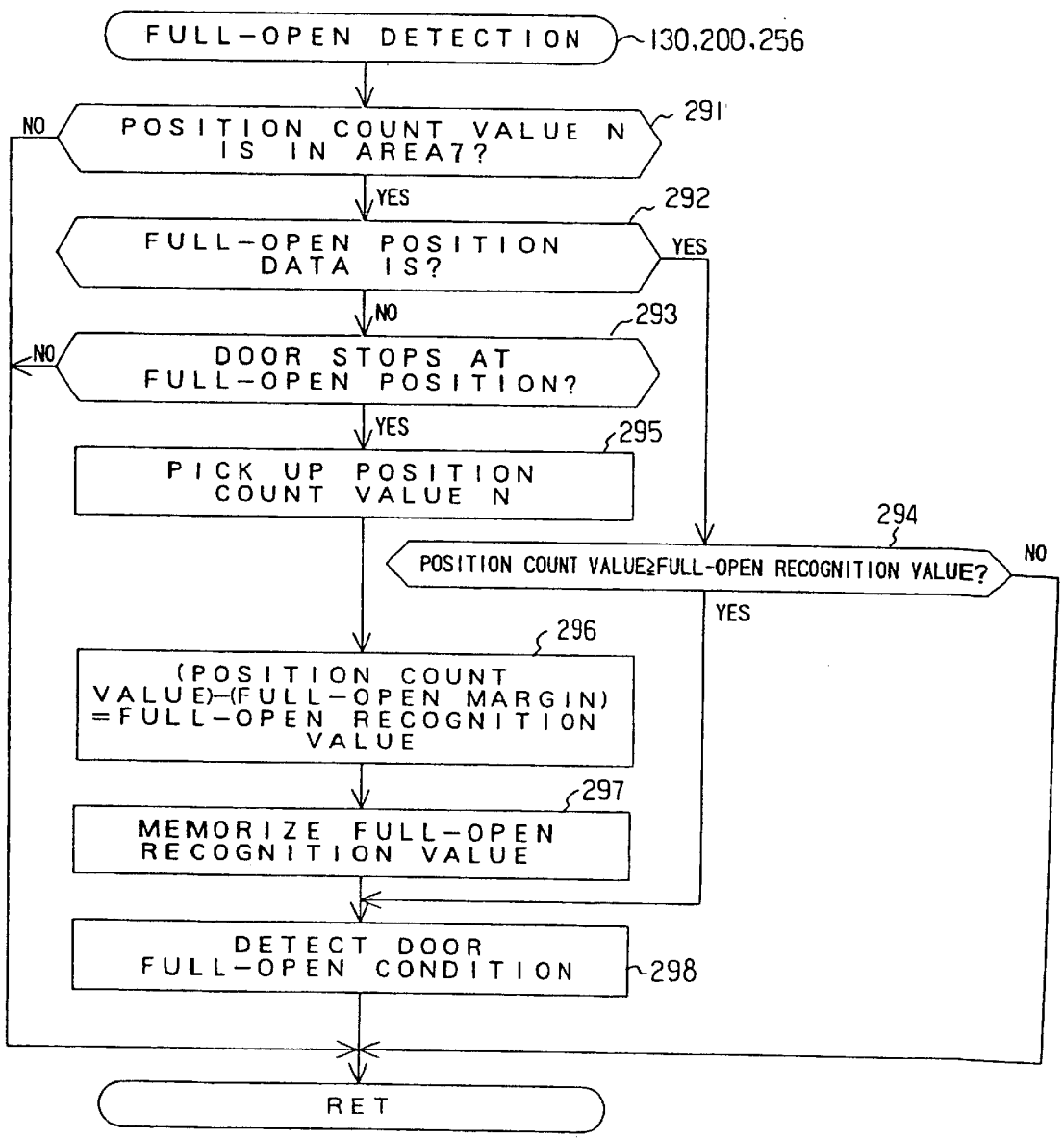
FIG. 25 is a flow chart showing in detail the door full-open control routine.

FIG. 25 is a flow chart showing in detail the full-open detection routine (Steps 130, 200, 256). This routine recognizes the position count value N of the full-open position of the slide door 2 in the initial operation and memorizes the recognized position count value N and then detects a full-open condition of the slide door 2 during the automatic open operation (FIG. 19) or the reverse open operation (FIG. 22)

First, the slide door 2 is moved from its full-close position (N=0) during the initial operation. When a value of the position count value N reaches within the area 7 (Step 291). this routine judges whether the full-open position data is already recognized or not (Step 292). Because that it is not recognized during the initial operation, it judges whether the slide door 2 has stopped or not at its full-open position (Step 293). If the slide door 2 is not stopped at its full-open position, the routine returns to the return step. When the slide door 2 has stopped, the position count value N of this time is taken out (Step 295).

Next, a full-open margin (optional value) is subtracted from the position count value N then and the resultant value is memorized in the predetermined memory as a full-open recognition value (Steps 296, 297). Such full-open margin is determined so as to stop the slide door 2 at a position before the full-open position in consideration of some movement distance because that, if the slide door 2 is stopped with some movement by recognizing its full-open position during the open operation, the moving door cannot stop instantly. A full-open recognition value is set as described above and, then the door full-open condition is detected (Step 298), returning to the return step.

When the position count value N reaches the area 7 (Step 291) after the setting of the full-open recognition value and the position count value N reaches the full-open recongnition value, the door full-open condition is detected (Step 298) because the full-open position data are already recognized (Step 292), and the routine returns to the return step.

Start Mode Routine

Figure 26:
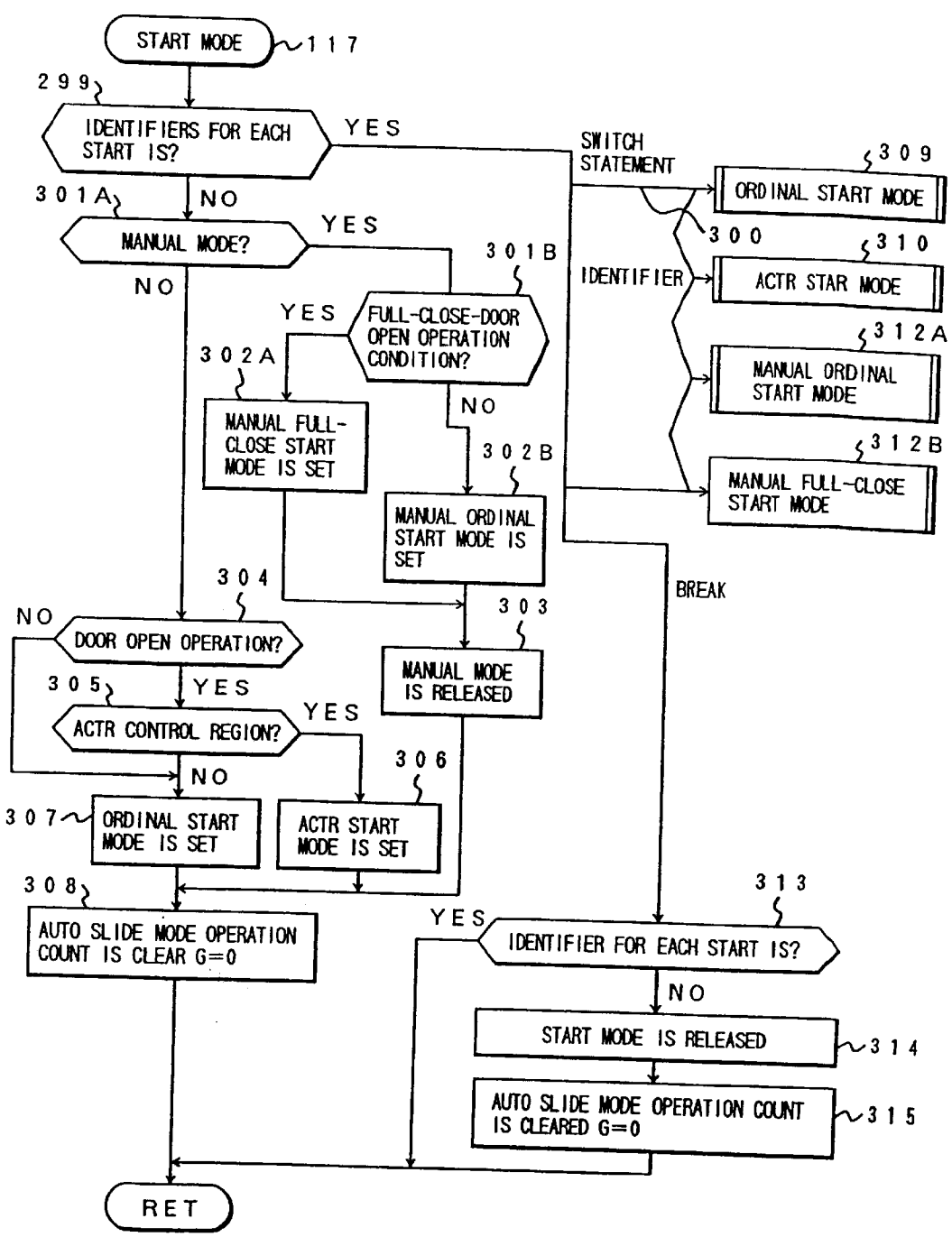
FIG. 26 is a flow chart showing in detail the start mode routine.

FIG. 26 is a flow chart showing in detail a start node routine (Steps 117, 176). This mode selects a Rode for starting the slide door 2 according to the ON/OFF condition of various switches and environmental situation and starts a movement of the slide door 2.

First, it is judged whether a start identifier has been set not (Step 299). Initially it is not set, so this routine judges whether it is the manual mode is or not (Step 301A). When it is the manual mode, this routine judges whether it is the full-open—door open manual condition or not (Step 301B). If it is so, the manual full-open close start mode is set (Step 302A). If it is not so, the manual ordinal start mode is set (Step 302B), then the manual modes are released (Step 303).

When it is not the manual mode, this routine judges whether it is the door open operation or not (Step 304). When it is the door open operation, this routine judges whether it is in the ACTR control region or not (Step 305). When it is in the ACTR control region, the ACTR start mode is set (Step 306). When it is not the door open operation, or when it is the door open operation and not in the ACTR control region, the ordinal start mode is set (Step 307). Setting the identifiers of different starts as described above, the automatic slide mode operation count value G is cleared (Step 308), returning to the return step. The setting condition of each start mode is shown below.

Ordinal start mode :starts by the switching operation at anytime except the full close
ACTR start mode :starts by the switching operation at the full close
Manual ordinal start mode:starts by the manual operation at anytime except the full close
Manual full-close start mode :starts by the manual operation at at the full close After the various identifiers according to each of these above start mode are set (Step 299) and the start mode is selected in next routine, the ordinal start mode (Step 309), the ACTR start mode (Step 310), the manual ordinal start mode (Step 312A), the manual full-close start mode (Step 312B) according to each of these identifiers (Step 300) are carried out.

The ordinal start mode controls the start operation out of the door full-close regions. First, the electro-magnetic clutch 16 is turned ON (Step 106), connecting the open-close drive motor 14 with the drive pulley 15. After On-time-lag of the electromagnetic clutch 16, it is set in the automatic slide operable and the open-close drive motor 14 is turned ON (Step 107). Then, when the open-close drive motor 14 is turned ON, the operationally classified start identifier is reset and a finish of the operationally classified start control is told to other routine.

The ACTR start mode controls, after the engagement between the latch 8 of the door lock and the striker 9 is disengaged through the ACTR 35, the start mode for automatically drive the slide door 2. After confirmation of the OFF condition of the half-latch switch 36 for a predetermined time length, the electromagnetic clutch 16 is turned ON (Step 106). After passing the on-time-lag of the electromagnetic clutch 16, it is turned to the automatic slide operation condition. Then, when the open-close drive motor 14 is in the ON condition (Step 107), the operational classified identifier is reset and a finish of the operational classified start control is told to other routine.

The manual ordinal start mode and the manual full-close start mode will be described later. When an identifier is reset and again the start mode is selected in the next routine, the start mode is released (Steps 313, 314) and the operation count value G is cleared (Step 315), returning to the return step.

Manual Ordinal Start Mode

Figure 27:
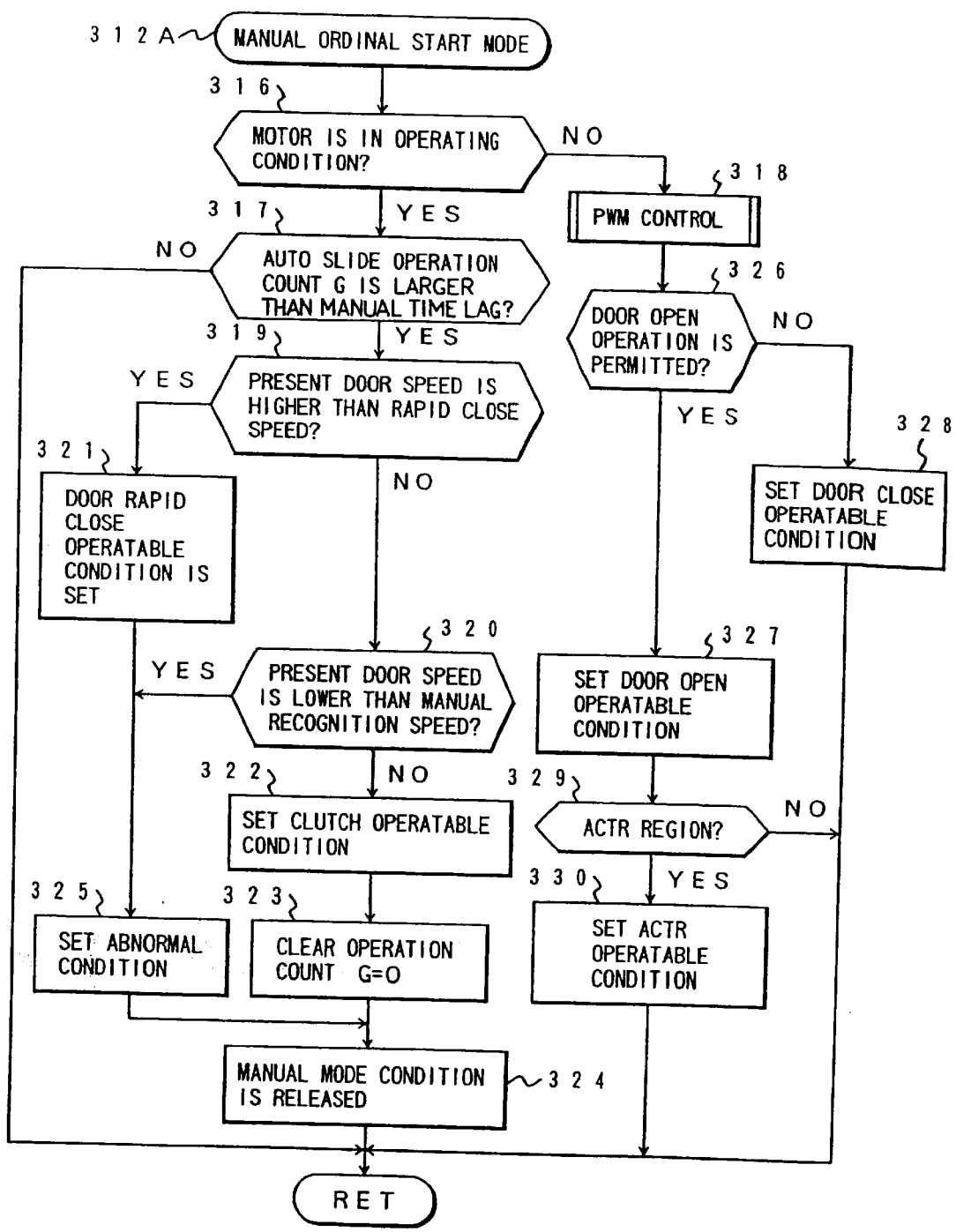
FIG. 27 is a flow chart showing in detail the manual normal start mode routine.

FIG. 27 is a flow chart showing a manual ordinal start mode (Step 312A). This start mode detects a manual operation-when the slide door 2 is not in full-close condition, and drives the slide door 2 along its opening or closing directions in the automatic mode,, First, the mode judges whether the open-close drive motor 14 forthe automatic sliding is under its operating condition or not (Step 316). It is not under the operating condition initially, so that the motor drive voltage determined by PWM control described later is set (Step 318). Next, this mode discriminates the operating direction of the slide door 2 (Step 326). When it is in the open operation, a door open operable condition is set to prepare for driving the open-close drive motor 14 along its open direction of the slide door 2 (Step 327). When it is in the close operation, a door close operable condition is set to prepare for driving the open-close drive motor 14 along its close direction (Step 328). In case of the opening direction (Step 327), this mode judges whether it isin the ACTR region or not (Step 329). In case of not the ACTR region, the mode returns to the return step. In case of the ACTR region, the ACTR operable condition is set (Step 330).

When the open-close drive motor 14 is under operation condition (S tep 316), this mode judges whether the manual time lag is over or not by the operation count G. If it is not over, it returns to the return step. When the manual time lag is over, this mode judges whether the movement speed of the slide door 2 by the manual operation is higher than the door rapid closing speed of the slide door 2 or not (Step 319). Next, if it is lower than the door rapid closing speed of the slide door 2, the door movement speed is lower than the manual recognition speed (Step 320). If it is not lower than the manual recognition speed, the clutch operable condition is set (Step 322), the operation count G is cleared in order to count the door operation time after an operation of the the electromagnetic clutch 16 (Step 323), and the manual ordinal start mode is released (Step 324), returning to the return step.

When the movement speed of the slide door 2 by the manual operation is higher than the door rapid close speed (Step 319), the door rapid close operable condition is set (Step 321) in order to give priority to the manual door rapid close operation, an abnormal condition is set in order to stop the motor (Step 325) and the manual ordinal start mode is released (Step 324), returning to the return step.

In addition, when the door movement speed is lower than the manual recognition speed (Step 320), it is not transferred to the automatic mode, so that the abnormal condition is set (Step 325), the manual ordinal start mode is released (Step 324), returning to the return step. When the abnormal condition is set, the abnormal conditions are detected in various routine of the automatic open operation and the automatic close operation, this operation is released becoming or obtaining a stop mode, and the motor stops.

Manual Full-Close Start Mode

Figure 28:
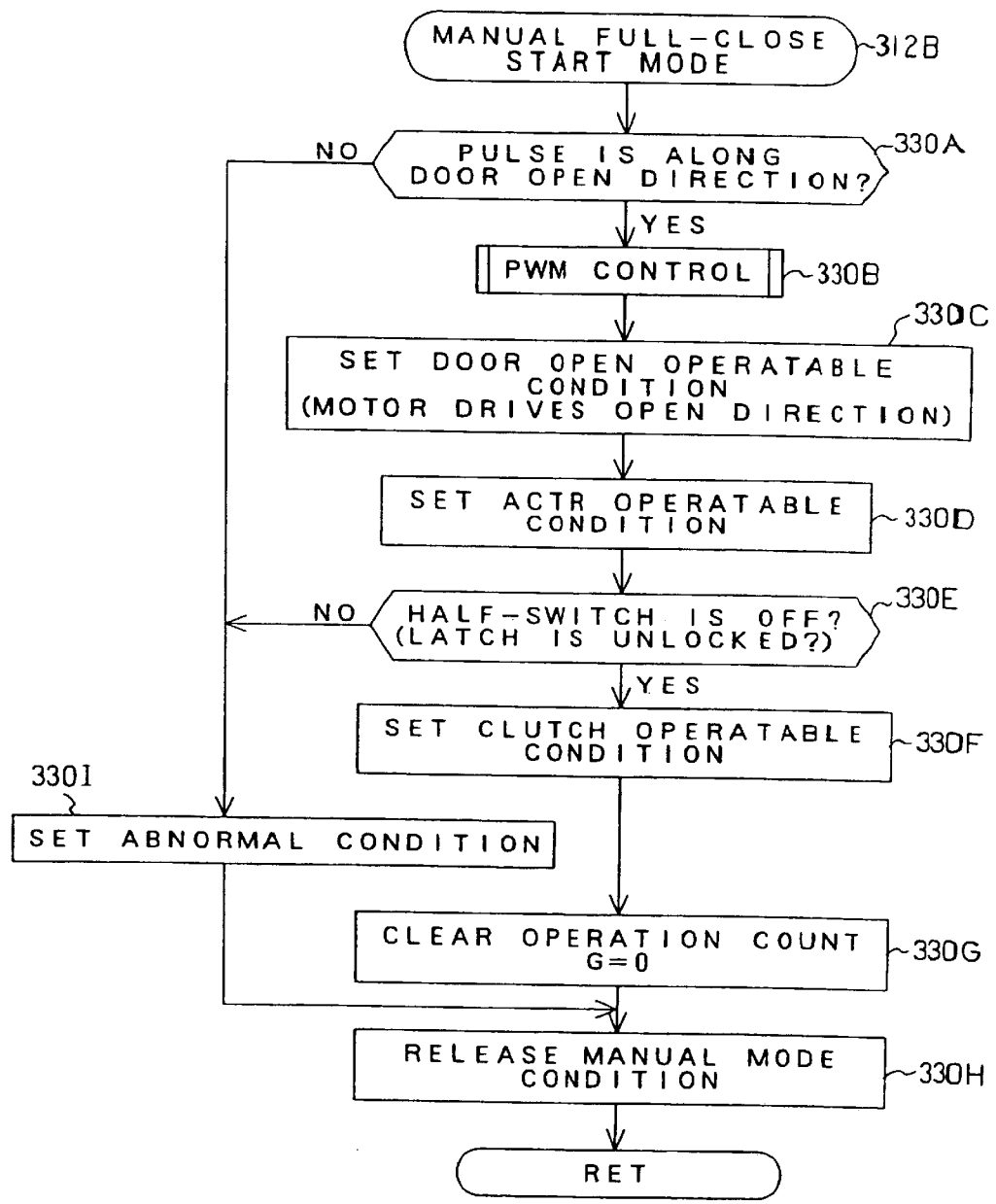
FIG. 28 is a flow chart showing in detail the manual full-close start mode routine.

FIG. 28 is a flow chart showing a manual full-close start %ode (Step 312B). This manual full-close start mode detects the manual operation when the slide door 2 is in the full-close condition and drives the slide door 2 along its open direction in the automatic mode.

First, this mode judges by means of a phase relation of the pulse signal φ1, φ2 whether the slide door 2 moves along its open direction or not (Step 330A). When it moves along its open direction, the motor drive voltage determined by the PWM control described later is set (Step 330B), next the door open operable condition is set in order to prepare for driving the open-close drive motor 14 along its open direction (Step 330C), and still the ACTR operable condition is set (Step 330D).

Next, the OFF condition of the half-switch is confirmed (Step 330E). When it is in the OFF condition, the clutch operable condition is set in order to prepare for driving the electromagnetic clutch 16 (Step 330F), the operation count G is cleared in order to measure the door operation time after operating the clutch operation (Step 330G), the manual full-close start mode is released (Step 330H), returning to the return step.

When the slide door 2 has not moved along its open direction (Step 330A), the manual full-close start mode is not necessary, so that the abnormal condition is set so as to stop the motor (Step 330I), the manual full-close start mode is released (Step 330H), it returns to the return step. It is afraid that the door lock has been again engaged while a half-switch being in the OFF condition, so abnormal condition is set (Step 330I), the manual full-close start mode is released (Step 330H), returning to the return step.

Additionally, it is possible to imagine another system to start an ACTR operation at first. According to this system, first the ACTR operates immediately after the door knob switch 37a turns OFF resulting in releasing the ACTR and so in releasing the lock with a small force.

Speed Control Routine

Figure 29:
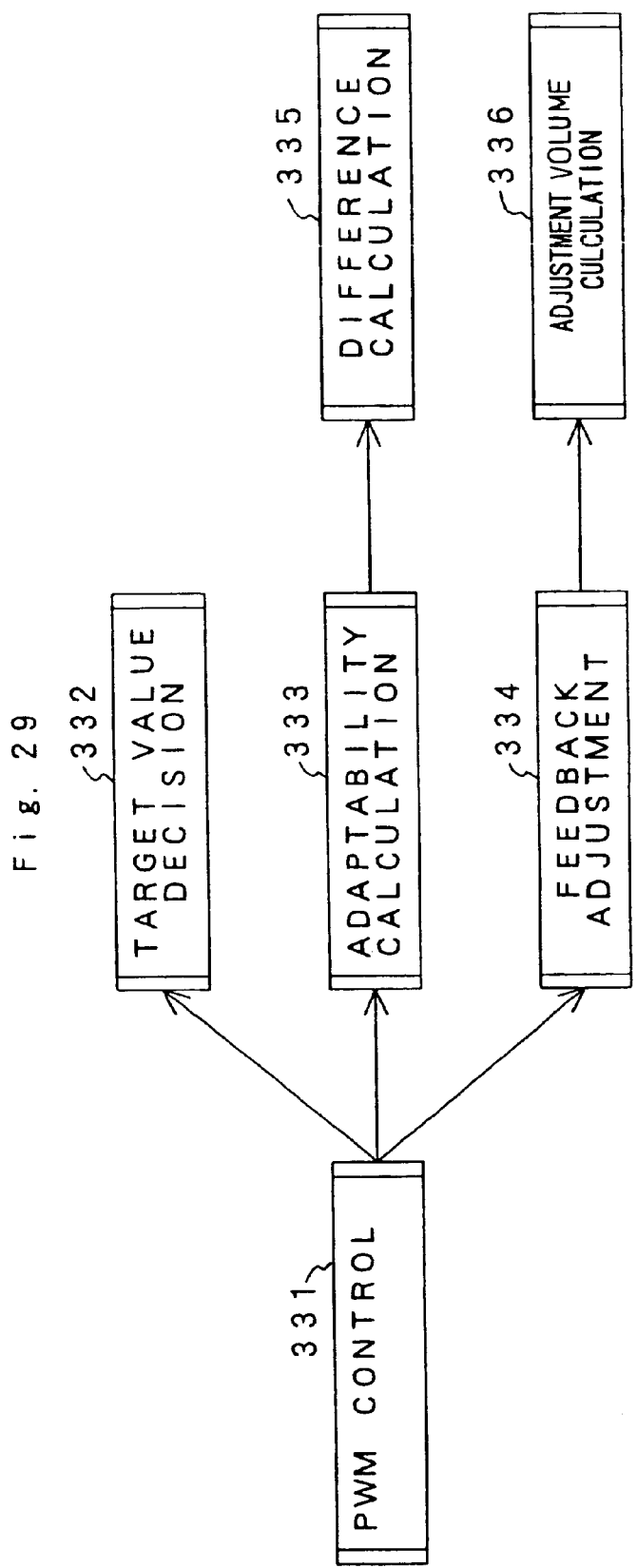
FIG. 29 is an outline view of the speed control routine.

FIG. 29 is an outline view of the speed control routine (Steps 120, 178). This speed control routine decides the control target value relative to the present movement speed in order to move the slide door 2 at a suitable movement speed determined for every these control regions E1 to E6, and controls the speed of moving the slide door 2. According to the embodiment, the speed control of the slide door 2 is attained by changing the duty cycle of square wave voltage impressed on the open-close drive motor 14, or adjusting the output torque of the open-close drive motor 14 owing to the pulse width modulation (PWM).

The PWM control(Step 331) includes a determination of the target value (Step 332), an adaptation calculation (Step 333), a feedback adjustment (Step 334). The adaptation calculation has in its lower level a difference calculation (Step 335) and the feedback adjustment has in its lower level an adjustment volume calculation (Step 336).

Figure 30:
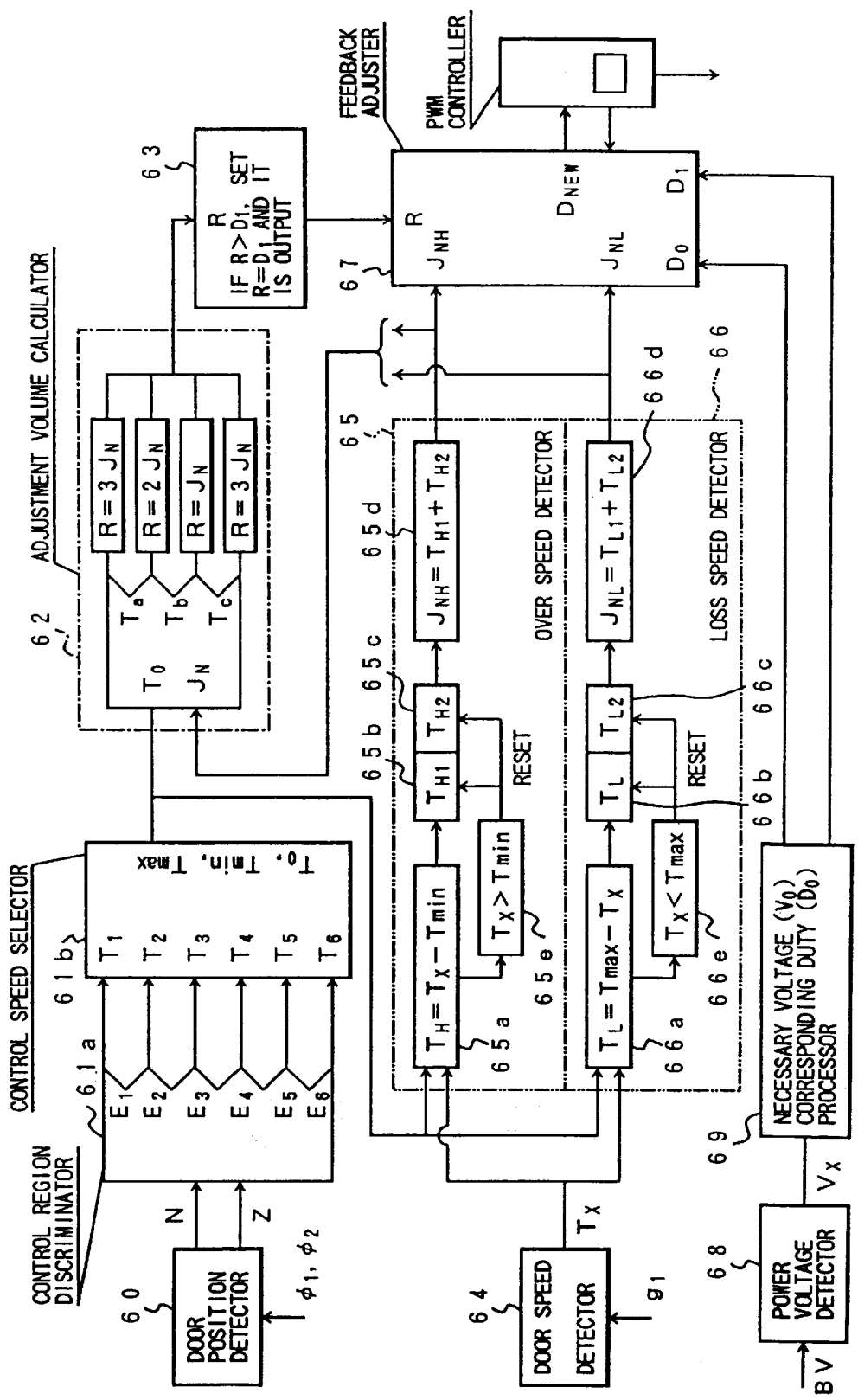
FIG. 30 is a block diagram showing functions concerning the speed control.

FIG. 30 is a block diagram showing various functions of the determination of the target value (Step 332), the adaptation calculation (Step 333), the difference calculation (Step 335), the adjustment volume calculation (Step 336). In the diagram, a door position detector 60 determines the position count value N and the movement direction Z using the pulse signals φ1, φ2 output from the rotary encoder 18.

A control region discriminator 61a determines the areas 1 to 7 in which the slide door 2 exists at that time using the position count value N and the movement direction Z. A memory table in FIG. 16 is referred according to the areas 1 to 7 and corresponding the control region E1 to E6 is discriminated. Thus a cycle count value T1 to T6 corresponding to the suitable movement speed of the slide door 2 necessary in each control region E1 to E6 is determined.

The control speed selector 61b determines a suitable speed cycle count value To (T1 to T6) corresponding to the suitable movement speed of the control region Ei (i=1 to 6) discriminated, the maximum speed cycle count value Tmin corresponding to the maximum movement speed in the control region discriminated and the minimum speed cycle count value Tmax corresponding to the minimum movement speed. The control region discriminator 61a and the control speed selector 61b attains the function of determining the target value (Step 332).

The suitable speed cycle count value To of the control region Ei determined by the control speed selector 61b is fed to the adjustment volume calculator 62 and is used in order to determine a feedback adjustment volume R. The detail explanation will be done. The feedback adjustment volume R determined by the adjustment volume calculator 62 is sent to a maximum adjustment volume limiter 63. The adjustment volume calculator 62 and the maximum adjustment volume limiter 63 attains the function of the adjustment volume calculation (Step 336).

The door movement speed detector 64, corresponding to the pulse count timer (Step 115A), counts the clock pulse C1 every generation period of the interruption pulse g1 in order to determine the count value at that time as a movement speed cycle count value Tx. A reciprocal number of the movement speed cycle count value Tx is a present movement speed of the slide door 2.

The movement speed cycle count value Tx is input into an over speed detector 65 and a less speed detector 66. The maximum speed cycle count value Tmin is input in the over speed detector 65 and the minimum speed cycle count value Tmax is input in the less speed detector 66. Function of the adaptation calculation (Step 333) is attained by the over speed detector 65 and the less speed detector 66.

The over speed detector 65 subtracts the maximum speed cycle count value Tmin from the cycle count value Tx expressing the present movement speed of the slide door 2 through the difference counter 65a, determining an over speed volume TH. The over speed volume TH is sent to the temporary store portions 65b, 65c of two-stage shift register and the like. the temporary store 65c at a front stage registers an over speed volume TH2 picked up in the previous pick-up time and the temporary store 65b at a rear stage register an over speed volume TH1 which is late by one time in row at the present time or the previous pick-up time. These two over speed volume TH1, TH2 are added in a correction volume processor 65d and the resultant is output as an over speed adaptation difference JNH.

Similarly, the less speed detector 66 subtracts the minimum speed cycle count value Tmax from a cycle count value Tx expressing the present movement speed by means of the difference calculator 66a, determining a less speed volume TL. The less speed volume is sent into temporary stores 66b, 66c of two-stage shift register and the like. The temporary store 66c at the front stage stores a less speed volume TL2 picked up in the previous pick up time and the temporary store 66b at the rear stage stores a less speed volume TL1 which is late by one time in row at the present time or the previous pick up time. These two less speed volumes TL1, TL2 are added in the correction volume processor 66d and the resultant is output as a less speed adaptation difference JNL. Function of the difference calculation (Step 335) is attained by the difference calculators 65a, 66b.

When the speed discriminator 65e of the over speed detector 65 judges that the present cycle count value Tx is larger than the cycle count value Tmin or discriminates that the present movement speed is lower than the maximum speed of the slide door 2, the stored contents of these temporary stores 65b, 65c are reset to zero. Similarly, when the speed discriminator 66e of the less speed detector 66 judges that the present cycle count value Tx is smaller than a cycle count value Tmax or discriminates that the present movement speed is higher than the lowest speed of the slide door 2, the stored contents of these temporary stores 65b, 65c are reset to zero.

In short, when the present movement speed of the slide door 2 is not too high or not too low, the stored contents of the temporary stores are made reset. Accordingly, it is necessary that the over speed situation or the less speed situation generates twice in a row to deliver two the over speed volumes TH1, TH2 or the less speed volumes TL1, TL2 to the correction volume processors 65d, (66d in order to prevent erroneous detection.

The over speed adaptation difference JNH and the less speed adaptation difference JNL are sent to a feedback adjustment portion 67 and an adjustment volume calculation 62. The adjustment volume calculator 62 handles both adaptation differences JNH, JNL together as an adaptation difference JN, selects a formula of the adjustment volume R using the suitable speed cycle count value To obtained by the control speed selector 61b as an identifier, determining the adjustment volume R. For example, when the cycle count value To is Ta, the adjustment value R is three times of the adaptation JN, or R=3JN. Similarly, when the cycle count value To is Tb, R=2JN. When the cycle count value To is Tc, R=JN. When the cycle count value To is not any of Ta, Tb, Tc, or R=3JN.

Sizes of values of Ta,Tb, Tc are optionally decided. Preferably, they are decided so as to correspond with the suitable movement speed fixed in the important regions and the dangerous regions shown in FIG. 16. With reference to the magnification coefficient for calculating the adjustment volume R, its necessary number of coefficient is set so as to make it suitable with feed-back control according to the curved portion and the straight portion of the movement or traveling trace of the slide door 2. The top limit value (D1) of the adjustment value R is limited by the maximum adjustment volume limitter 63. The adjustment value R is transferred to the duty value D described later and the duty value D is input into a feedback adjustment controller 67.

A power voltage detector 68 measures the voltage Vx of the battery 24. A duty processor 69 determines the duty cycle Do of the necessary voltage correspondence Vo when the voltage Vx is generated. The duty cycle (hereinafter it is called a duty) Do corresponding to the necessary voltage Vo means the duty Do for obtaining the output torque attained when the voltage wave shape of the duty 100%, that is DC voltage Vo is impressed and the same output torque attained when an optional voltage Vx higher than the DC voltage Vo is impressed, being expressed by the following equation.

$$Do[\%] = (Vo/Vx)*Dmax [\%]$$

wherein, the current value flowing through the motor is fixed. The duty 100% corresponds to the DC voltage wave shape of H level and is shown by the Dmax and the duty 0% corresponds to DC voltage wave shape of L level and is shown by Dmin.

In detail, the duty processor 69 detects a voltage change of the battery 24 as a measured voltage by means of the power of the power source voltage detector 68 and determines the duty Do corresponding to the necessary voltage Vo on the basis of the equation above using the necessary voltage Vo and the voltage Vx. Furthermore, the duty processor 69 determines the duty changed value when the necessary voltage Vo increases or decreases one volt which is called an 1 V equal to duty D1. Duty Do equal or corresponding to the necessary voltage Vo and the 1 volt equal to duty D1 are input in the feedback adjuster 67.

The duty processor 69 uses a primary formula which does not include the changed part of the current and it may previously make a memory map of the correction value D' of the duty D relative to the power source voltage change in consideration of the current change part and the motor load characteristic, and addresses the map by the power source voltage Vx.

Figure 31:
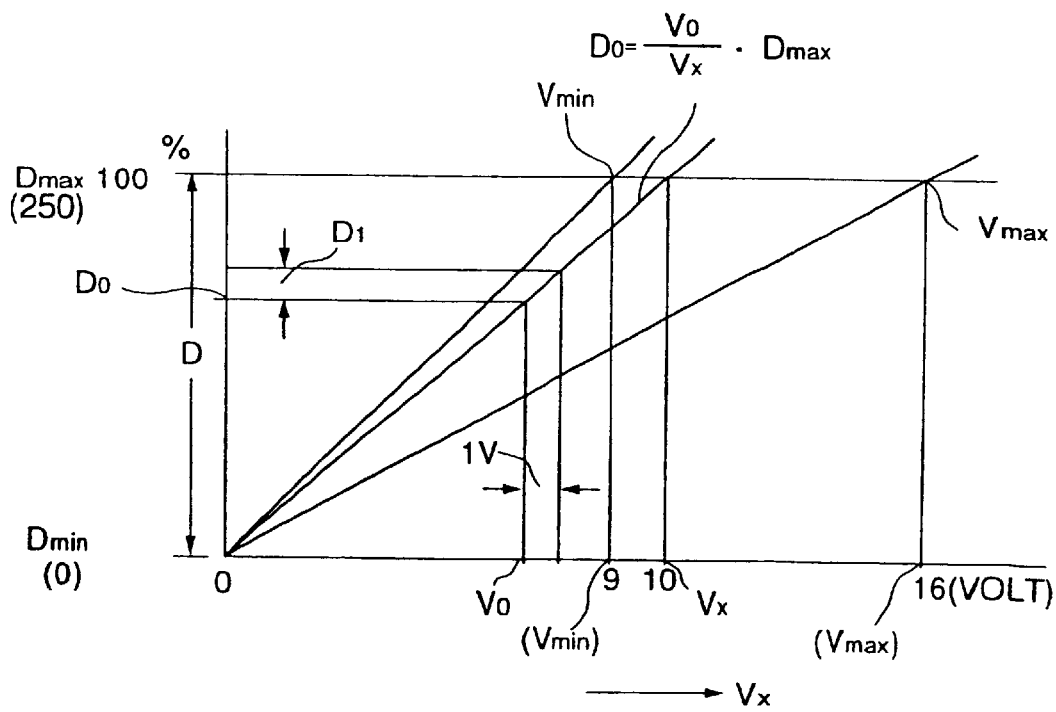
FIG. 31 is a graph showing a relation between the voltage change and the duty cycle when the current flowing through a motor is fixed.

FIG. 31 is a graph showing a relation between the voltage change and the duty D when the current flowing through the motor is fixed and the graph has an axis of abscissa of the voltage Vx and an axis of ordinate of the duty D. Vehiclular battery 24 has a maximum voltage Vmax of 16V and a minimum voltage Vmin of 9V, and the duty is determined so as to correspond with the voltage change between Vmax and Vmin.

PWM Control Routine

Figure 32:
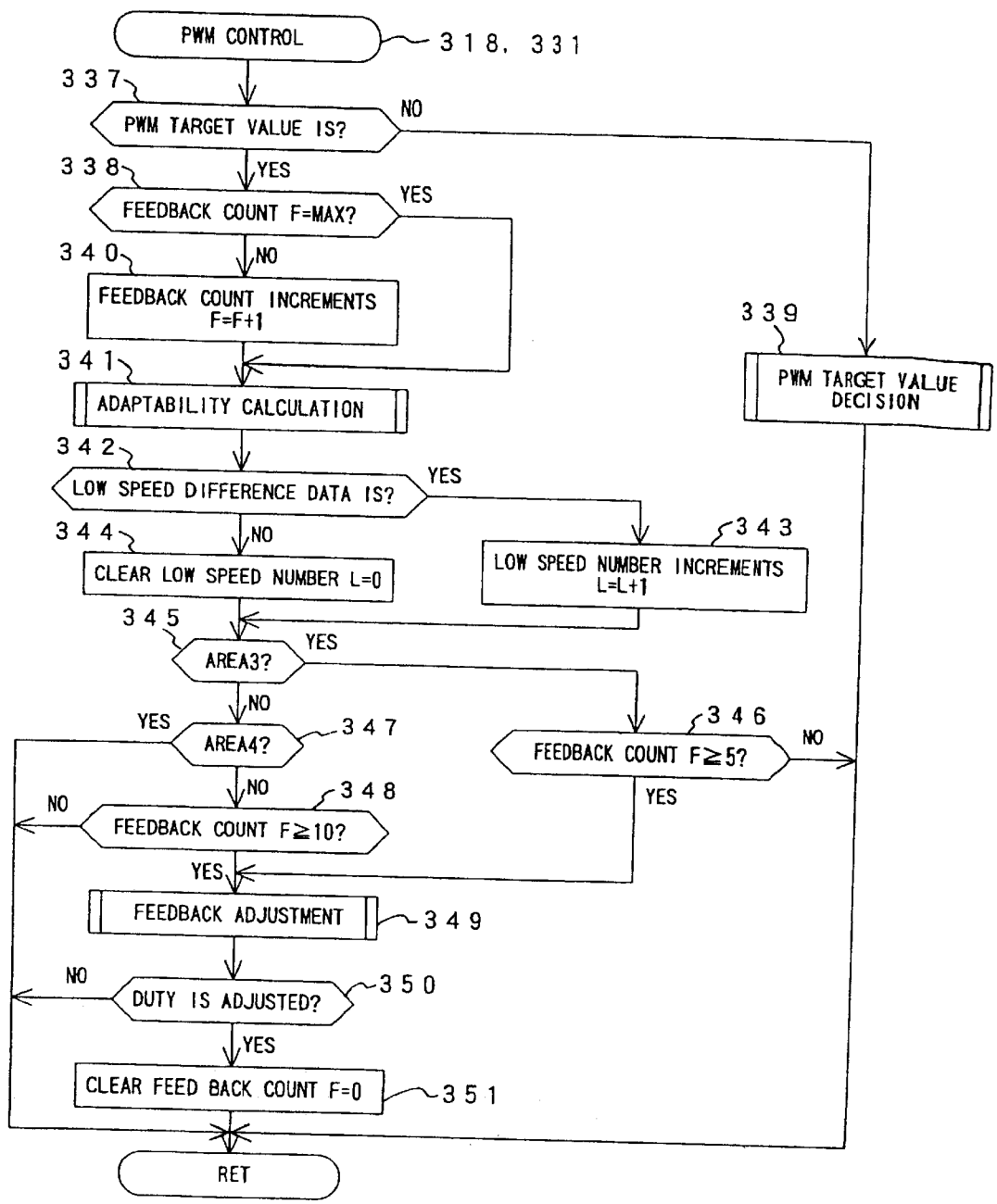
FIG. 32 is a flow chart showing in detail the PWM control routine.

FIG. 32 is a flow chart showing in detail the PWM control routine (Step 331). This routine adjusts a duty D of the drive voltage for the open-close drive motor 14 by means of the PWM control so as to make the movement speed of the slide door 2 agree with the target speed determined every area when the slide door 2 is being driven by the open-close motor 14, and adjusts the time F by which the feedback control is done separately for every area in consideration of delay of the mechanical portion.

The routine first judges that there is the PWM target value or not (Step 337) and determines the target value when it is not existed (Step 339), returning to the return step. The determination of the target value is carried out by the control region discriminator 61a and the control speed selector 61b.

When the target value is already determined, the routine checks whether the feedback count F is the maximum number or not (Step 338). When it is not the maximum, the count is increased. (Step 340). When it is the maximum, the step 340 is passed. The feedback count F functions as a timer and adapted to carry out the feedback control when the feedback count F reaches a predetermined value as described below. Maximum value MAX is, for example, more than 10.

Next, the over speed detector 65 and the lees speed detector 66 calculate an adaptation degree (Step 341) in order to detect or determine whether the low speed difference data or the less speed volume TL is occurred or not (Step 342). When there is the less speed volume TL, a low speed count L is incrementally counted (Step 343). When there is no the less speed value TL, the low speed count L is cleared (Step 344).

Next, when it is in area 3 (Step 345), the number of the feedback count F is examined whether it is more than 4 or not (Step 346). When it is not more than 4, it returns to the return step. When it is in area 4, it returns to the return step (Steps 345, 347). When it is not in areas 3 and 4, or in areas 1, 2, 5, 6, 7, the number of the feedback count F is checked whether it is more than 9 or not (Step 348) and it returns to the return step when the number is not more than 9.

When the number of the feedback count F in area 3 is more than 4 (Step 346) or the number is more than 9 in areas 1, 2, 5 to 7 (Step 348), this routine carries out the feedback adjustment described later (Step 349). When the duty has been adjusted as a result of such adjustment, the feedback count F is cleared (Step 351), returning to the return step. When the duty has not been adjusted, it returns to the return step as it is.

It is afraid that the resultantly speed of the slide door 2 decreases along curved route in such as the area 3, so that the adjustment interval of area 3 is made shorter than that of other areas and the feedback adjustment is done often. Consequently, when the loop cycle of the main routine is made 10 msec, the feedback adjustment is carried out every 50 msec in area 3 and every 100 msec in areas 1, 2, 5 to 7.

Feedback Adjustment Routine

Figure 33:
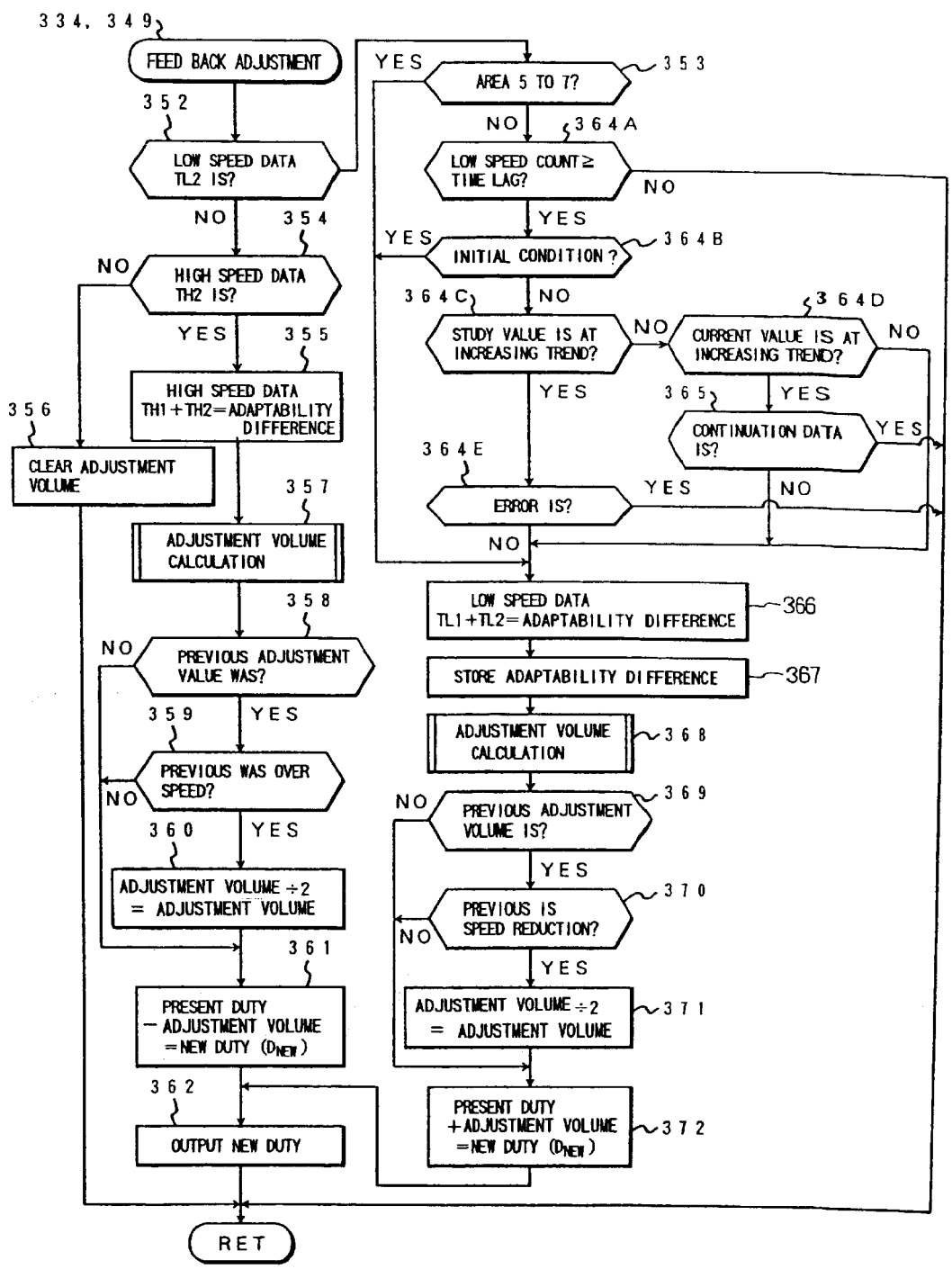
FIG. 33 is a flow chart showing in detail the feedback adjustment routine.

FIG. 33 shows a flow chart of the feedback adjustment routine (Steps 334, 349) in detail. This routine adjusts duty (DUTY) so as to attain the target speed of the slide door 2 when a plurality of the less speed value TL or a plurality of the over speed value TH are happened continuously.

This routine first examines whether the less speed volumes TL1, TL2 are existed or not existed in the temporary stores 66b, 66c of the less speed detector 66 (Step 352). When there is no volume, it is examined whether the over speed volumes TH1, TH2 are existed in the temporary stores 65b, 65c of the over speed detector 65 (Step 353). When the less speed volumes and the over speed volumes don't exist in these temporary stores, there is no need of carring out the feedback adjustment, so an adjustment value R is cleared (Step 356), returning to the return step.

When the over speed volumes TH1, TH2 exist in the temporary stores 65b, 65c, these two over speed volumes are added to determine the over speed adaptation difference JNH (Step 355), the adjustment volume calculator 62 and the maximum adjustment volume limitter 63 calculates the adjustment value R (Step 357). Next, it is examined that there are adjustment values in the previous routine or not (Step 358). When it is the speed increment (Step 359), the adjustment volume R of this time is set at a half value (Step 360). The reason of this setting is that, when the adjustment volume is large, a possibility of becoming it again a less speed is high because that the adjustment volume was added for it is less speed in the previous time and the adjustment value is subtracted for it is over speed in this time.

When there is no adjustment volume in the previous routine, it being no increment in speed in the previous time, and being set the adjustment volume R at a half value (Steps 358 to 360), respectively it is necessary to subtract the adjustment volume R (this is a duty, too) from the present duty D to determine a new D NEW (Step 361), to output this new duty D NEW (Step 362). returning to the return step. Thus, the open-close drive motor 14 is made decreased of the driving by means of square wave voltage provided with the new duty D NEW.

When the temporary stores 66b, 66c have the less speed volumes TL1, TL2 (Step 352), it is examined whether the present position of the slide door 2 is on its open direction (areas 5 to 7) or on its close direction (areas 1 to 4) (Step 353). There is a possibility of pinching something in the slide door 2 along its close direction, so it is not possible to simply increase the driving force by the feedback adjustment.

That is, when it is a close direction, this routine judges whether the low speed counter has counted a predetermined time-lag or not (Step 364A). When the predetermined time-lag has not elapsed, it returns to the return step. When the time-lag has elapsed, this routine judges whether it is the initial condition having no load study or not (Step 364B). When it is not the initial condition and tie study value is in the increasing trend (Step 364C), and additionally an error is found in a pinch judgement described below (Step 364E), there is a possibility of the pinch, so it returns to the return step.

When the study value is not under the increasing trend (Step 364C), the current value is under the increasing trend (Step 364D) and it continuing (Step 365), there is a possibility of the pinch, so it returns to the return step.

In other case of that ones above, or when there is no error (Step 364E), the current value being not under the increasing trend (Step 364D), or the increasing trend of the current value not continuing (Step 365), it is resumed that there is no possibility of the pinch and the feedback adjustment of the speed increase drive is carried out. It is of course that in case of the slide door 2 in its open direction (Step 353) or in the initial condition, the feedback adjustment of the speed increse drive is done.

According to the feedback adjustment of the speed increase drive, first two the less speed volumes TL1, TL2 are added to each other to determine the adaptation difference JNL and it is stored in a memory (Steps 366, 367), the adjustment volume R is calculated in the adjustment volume calculator 62 and the maximum adjustment volume limiter 63 (Step 368). Next, it examines whether there is the adjustment volume R or not in the previous routine (Step 369). When it is a speed decrease (Step 370), the adjustment value R of this time is set at a half value (Step 371). The reason of the steps above is that there is a high possibility of becoming again the over speed condition because it was the over speed and the adjustment volume has subtracted in the previous time, and it is the less speed and the adjustment volume has to be added, resulting in a large adjustment volume.

When there is no adjustment volume in the previous routine, it was not the speed reduction in the previous time, and the adjustment volume R is set at a half-value (Steps 369 to 371), respectively, the present duty D is added to the adjustment volume R (this is a duty, too) to determine a new D NEW (Step 372), the new duty D NEW is output (Step 362), returning to the return step. Thus, the open-close drive motor 14 is driven to increase the speed by a aquare wave voltage having this new duty D NEW.

Pinch Judgement Routine

Figure 34:
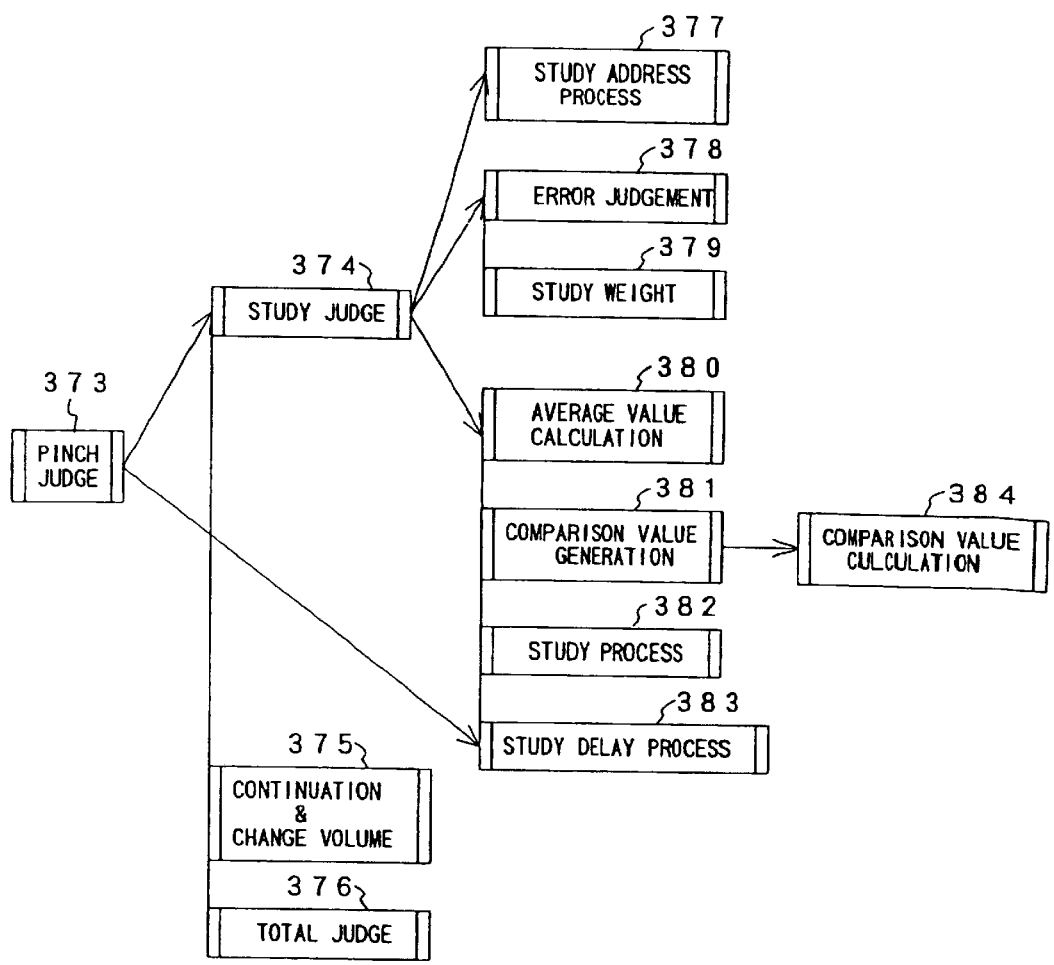
FIG. 34 is an outline view of the pinch judgement routine.

FIG. 34 shows an outline of the pinch judgement routine (Steps 118, 177). This routine detects a pinch of something in moving the slide door 2 in its open direction or in its close direction. According to the detection result, the slide door 2 while it is driven in its open and close operation is reversed in order to attain a safety of the slide door 2.

This pinch judgement routine includes routines of a study judgement described later (Step 374), a continuation & change volume (Step 375), an total judgement (Step 376). Lower levels of the study judgement (Step 374) have a study address process (Step 377), an error judgement (Step 378), a study weighting (Step 379), an average value calculation (Step 380), a comparison value generation (Step 381), a study process (Step 382), a study delay process (Step 383) and the like. The comparison value generation has at its lower level a routine of a comparison value calculation (Step 384).

Figure 35:
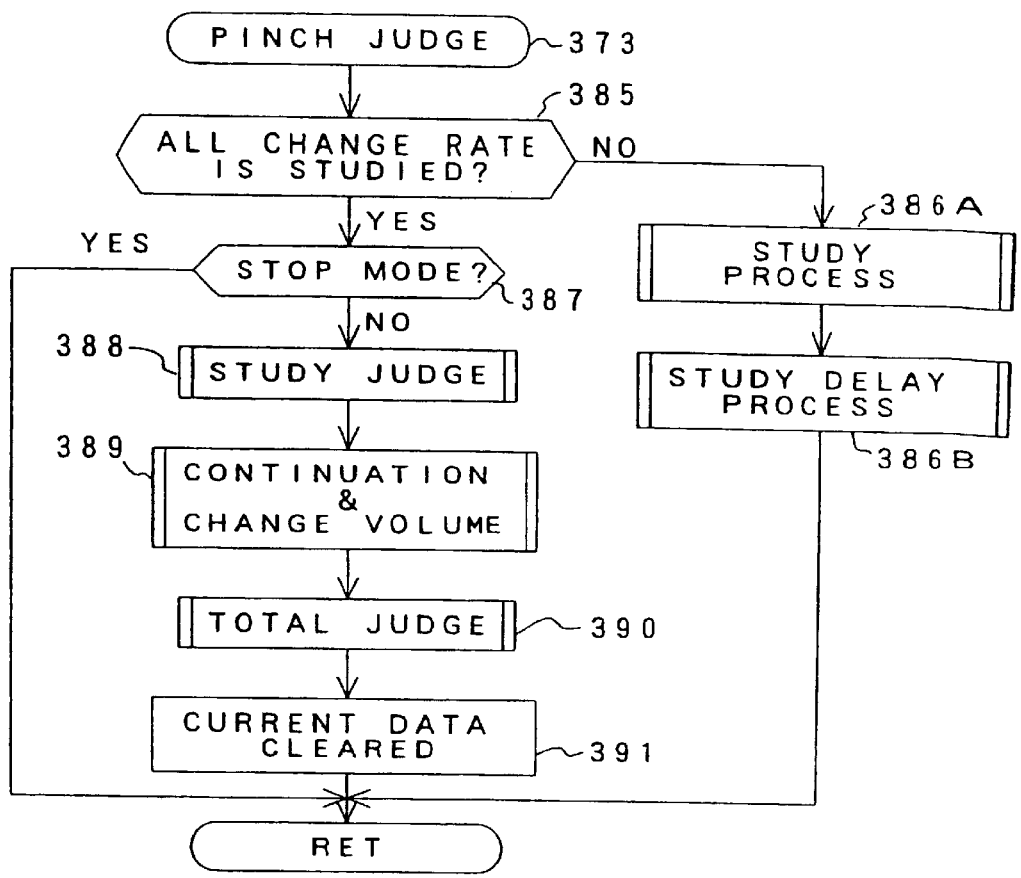
FIG. 35 is a flow chart showing in detail the pinch judgement routine.

FIG. 35 is a flow chart showing a pinch judgement routine (Step 373). Respective routines which will be described in detail first judge that the study of the change ratio of the motor load every sampling region has been finished or not (Step 385). When it is not finished, its study process and its study delay process are carried out (Steps 386A, 386B), returning to the return step.

When the study process has been finished, it is judged whether it is a stop mode or not (Step 387). When it is a stop mode, the slide door 2 has been stopped, so it returns to the return step. When it is not the stop mode, a study judgement is done (Step 388). Next, the continuous & change volume process for detecting the change volume and the rise continuous time of the motor current value is done (Step 389). In the next total judgement (Step 390), the judgement result obtained in the study judgement (Step 388), the change value and the rise continuous time of the motor current value obtained by the continuous & change volume process (Step 389) are used to judge whether the pinch is occurred or not. Next, the current data is cleared (Step 391), returning to the return step.

Function Block Diagram of the Pinch Judgement

Figure 36:
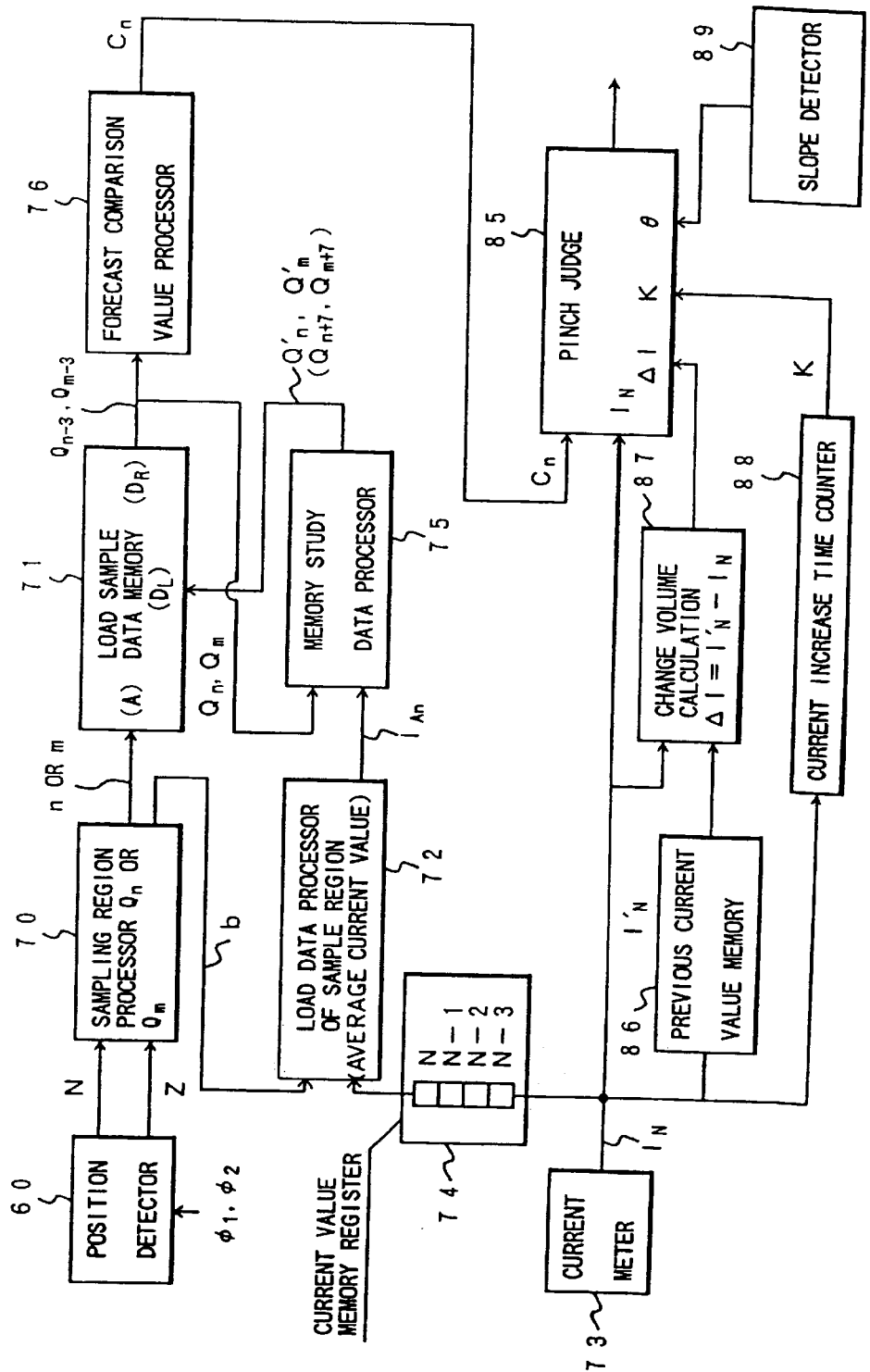
FIG. 36 is a block diagram showing functions concerning the pinch judgement.

FIG. 36 is a block diagram showing functions of the pinch judgement routine. As shown, a sampling region processor 70, a load data processor 72 and a memory study data processor 75 of the sampling region pick up a standard load resistance component (its change ratio is included) due to the open and close of the slide door 2 on the basis of the current value IN flowing through the open-close drive motor 14, and memorize a standard load resistance component in a load sample data memory 71 ao as to correspond with a sampling region Qn (or Qn, hereinafter it is used) peculiar to the open and close situation of the slide door 2 and its position.

Presumably that the load resistance component memorized in a single sampling region Qn is the current increase ratio $\Delta IAn$ between the front and rear sampling regions on the basis of the average current value IAn of the included current value IN of the number of resolution B in the sampling region Qn.

On the opening and closing of the ordinarily slide door 2, the standard load resistance component memorized every the same sampling region Qn and the present load resistance component are compared to each other in the pinch judgement portion 85 in order to detect whether there is the pinch condition or not. The load resistance component memorized in the load sample data memory 71 corresponding to the sampling region Qn is corrected on the basis of the load resistance component every the open and close handling of the slide door 2, and study is renewalled.

The pinch judgement portion 85 carries out a pinch judgement on the basis of the current value IN measured by the current measure 73, the current increase value $\Delta I$ determined by the change volume calculator 87 using the this time current value IN and the previous time current value I' N memorized in the previous time current value memory 86, an increase number value K which a current increase number counter 88 outputs, an inclination judgement data Q which is input from a slope detector 89. The detailed judgement operation will be explained in detail.

Sampling Region Processor 70

A sampling region processor 70 determines an address of sampling region Qn (or Qm) on the basis of a count value n (or m) calculated by thin out the pulse signal $\phi 1$ from the position count value N and the movement direction Z supplied from the door position detector 60 according to a resolution B fixed for the areas 1 to 7 (FIG. 16).

The count value n is determined by thinning out and count along its close direction of the slide door 2 according to the resolution B and the count value m is determined by thinning out along its open direction of the slide door 2 and counting. Each values shows the address number showing the position of the slide door 2. The address numbers n are arranged in order along its close direction of the slide door 2, so, when the slide door 2 moves along its close direction, the number decreases. Consequently, the address number one previous to the moving slide door 2 is expressed by n+1. On the cotrary, the address number m is arranged in order along its open direction of the slide door 2, so the address number one previous to that of the moving slide door 2 is expressed by m−1.

The relation between these address numbers n and m, and the resolution B is expressed by the following equations.

$$N/B = n+b$$

N/B=m+b (wherein, n&m is an integer portion of the quatient and b is a remainder of quatient)

The address numbers n and m are the addresses of the load sample data memory 71, the remainder b functions to shift the data of the current value memory register 74 having register of the number identical with that of the resolution B in the load data processor 72.

Load Sample Data Memory 71

The load sample data memory 71 outputs average current values IAn, IAm, constituting the memory data of these sample regions Qn, Qm appointed with the address numbers n, m from the sampling region processor 70, to the forecasting comparison value processor 76 and these average current values IAn, IAm to the memory study data processor 75.

Load Data Processor 72

The load data processor 72 determines the average values of the current value IN of the open-close drive motor 14 every these sampling region Qn, Qm, which the current value being memorized in the current value memory register 74 provided with steps of a number identical with that of the resolution B, and outputs these average values to the memory study data processor 75 as an average current value IAn. The current value memory register 74 memorizes the current value IN measured by the current measure 73 every a fixed interval (Step 103).

Figure 37:
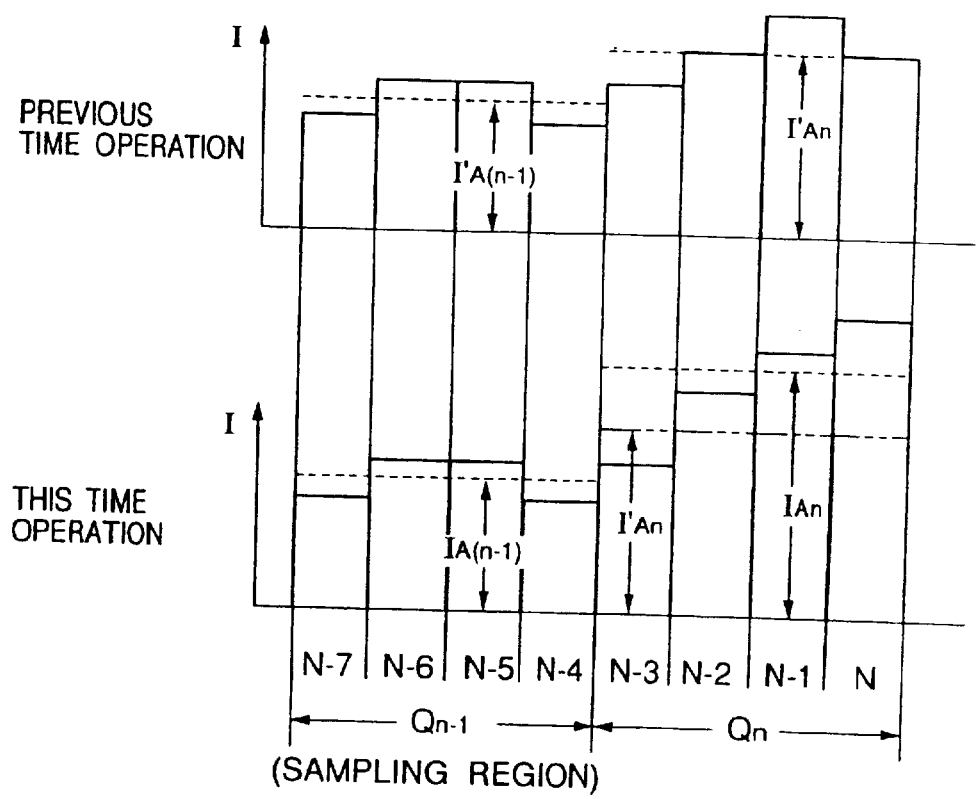
FIG. 37 is a graph showing the current values of marked sampling regions.

FIG. 37 shows the average current value I' An, I' A(n−1) previously memorized in the sampling regions Qn, Qn−1 in a condition no study effect is considered, and the present average current values IAn, IA(n−1) determined in this time. Presuming that the slide door 2 exists in a speed reduction control region E2 (resolution B is 4) of area 2 and it shows the current value IN corresponding to the position count value N every the pulse signal φ1 in the questioned sampling region Qn and the sampling region Qn−1 after the questioned sampling region Qn by one.

The current values IN to IN−3 in this time operation corresponding to the position count value N to N−3 in the sampling region Qn are stored in the current value memory register 74. The average current value IAn is obtained by adding the current values IN to IN−3 to each other and averaging them.

Memory Study Data Processor 75

Figure 38:
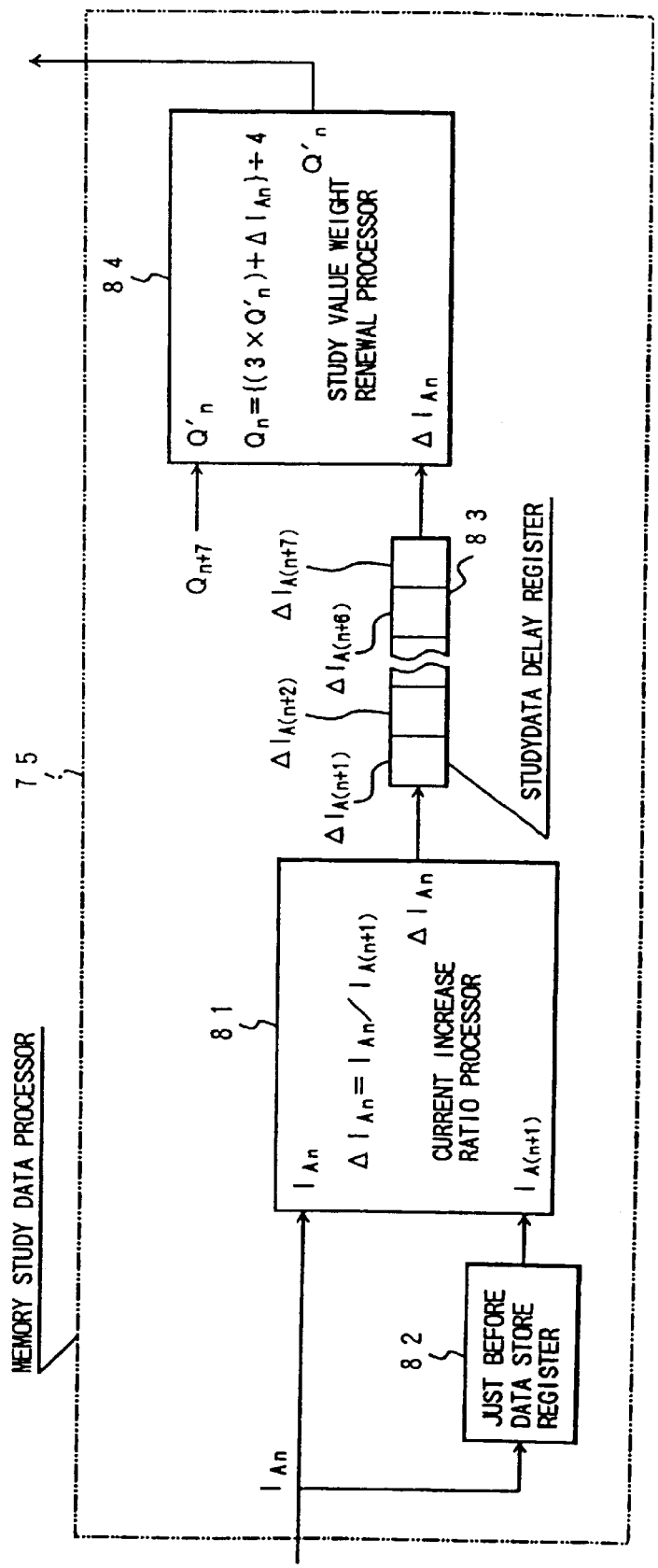
FIG. 38 is a block diagram of the memory study data processor.

This memory study data processor 75 consists of, as shown in FIG. 38, a current increment rate processor 81, a just before data store register 82, a study data delay register 83 and a study value weighting renewal processor 84.

The just before data store register 82 outputs the average current value IA(n+1), of the sampling region Qn+1 just prior to the presently questioned sampling region Qn in the sampling region Qn (n will diminish gradually) appeared successively along its close direction of the slide door 2 (in this embodiment, area 2 is presumed), to the current increment rate processor 81.

This current increment rate processor 81 compares the average current value IAn in the presently questioned sampling region Qn being sent from the load data processor 72 to the average current value IA(n+1) in the just before sampling region Qn+1 delayed in the just before store register 82 in order to determine the current change rate ΔIAn (=IAn/IA(n+1)) and send this cuurent change rate to the study data delay register 83.

The study data delay register 83 functions to a little delay a renewal time of the study result and has a number of steps which number can be selected optionally. According to the embodiment, this step number of the study data delay register 83 has seven steps and outputs the current increment rate ΔIA(n+7) in the before seven sampling region Qn+7 to the study value weight renewal processor 84.

The current increment rate ΔIA(n+7) concerning the present sampling region Qn+7 and the data Qn+7 read out of the load sample data memory 71 appointed by the address number n+7 identical with that of the increment rate ΔIA (n+7) are input in the study value weight renewal processor 84 with the same address with each other.

That is, the study value weight renewal processor 84 studys and renews the memory data, according to the following equation and concerning the same sampling region, of the current increment rate Qn+7 of the previous time door drive time previously memorized in the load sample data memory 71 in consideration of the newest current increment rate ΔIA(n+7) obtained in this time.

$$Q'n+7=(3/4)*Q'n+7+(1/4)*\Delta IA(n+7)$$

In general equation, $$Q'n=(3/4)*Q'n+(1/4)*\Delta IAn$$

A ratio of new and old data can be optionally changed.

The memory data (current increment rate) Q' n determined as mentioned above is sent to the load sample data memory 71 as a write-in data DL and an address number n is stored as an address in order to renew the study of the memory data.

Here, the data read-out from the load sample data memory 71, or the data memorized in the load sample data memory 71 are not expressed by an average current value I' An originally stored. The data is expressed by the address appointed sample region Qn and the processing or calculation uses the data of the average current value I' in memorized in a location appointed by the address number n of the sampling region Qn. The output data of the memory study data processor 75 has been expressed by a form of sampling region Qn.

Forecast Comparison Value Processor 76

Figure 39:
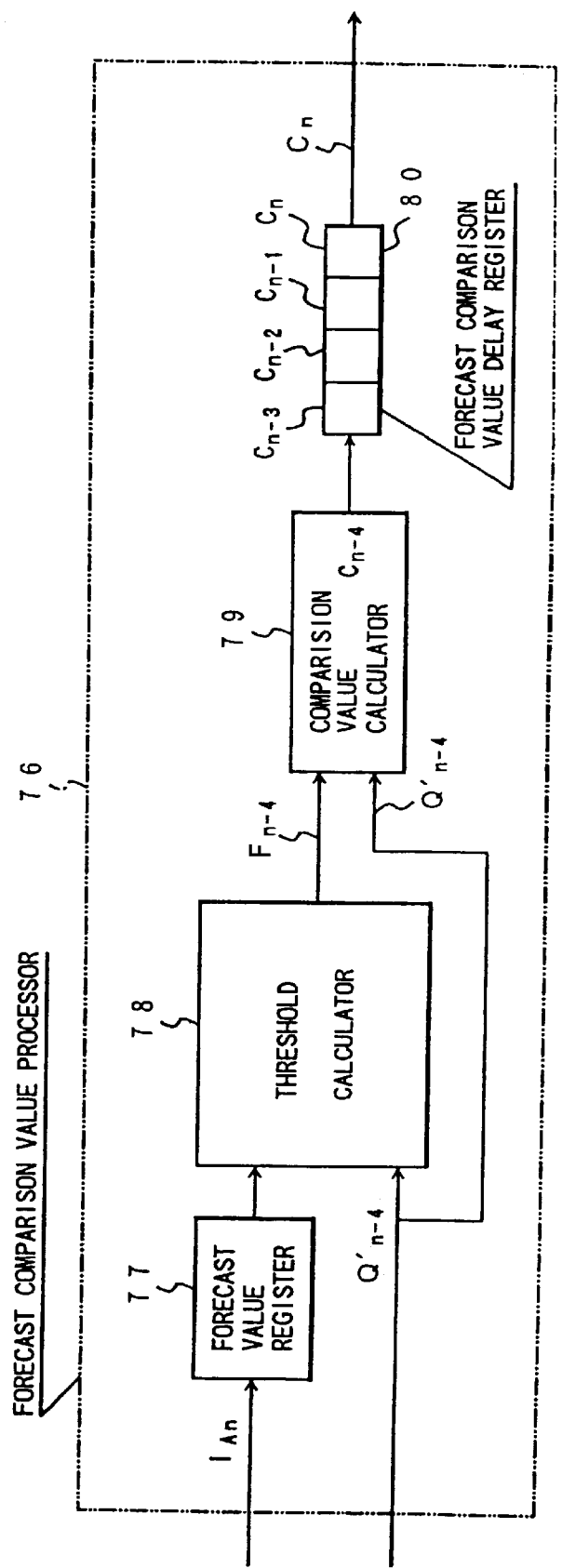
FIG. 39 is a block diagram of the forecast comparison value processor.

This forecast comparison value processor 76 consists, as shown in FIG. 39, of a forecast value register 77, a threshold value calculator 78, a comparison value calculator 79 and a forecast comparison value delay register 80. This forecast comparison value processor 76 outputs to the pinch judgement portion 85 these forecast comparison values Cn, Cm, which are necessary to find a pinch in the sampling region Qn−4 positioned 4 regions in advance, along the moving direction of the slide door 2, of the study value Q' n corresponding to the address number n in the present sampling region Qn output from the load sample data memory 71.

The forecast value register 77 stores the last average current value IAn arithmetically averaged of the respective current values measured in a sampling region from the time of measuring the first current value IN in the present sampling region Qn of the slide door 2 to the present current value in a loop interval of the main routine.

A memory data (current increment rate:Q' n−4') of the sampling region Qn−4 of the address number n−4, which is four after the address number n of the sampling region Qn having the last current value IN, are read out of the load sample data memory 71 and given to the threshold value culculator 78 and the comparison value calculator 79.

The threshold value calculator 78 uses the last average current value IAn in the control region and the memory data in the sampling region Q' n−4 of four latter address number n−4 to calculate a threshold value Fn−4 determining the discrimination allowable width by means of the following equation.

$$Fn-4=IAn*Q'n-1*Q'n-2*Q'n-3*Q'n-4*\alpha$$

In a general formula, $$Fn=IA(n+4)*Q'n+3*Q'n+2*Q'n+1*Q'n*\alpha$$

wherein α is a correction coefficient.

The comparison value calculator 79 determines a forecast comparison value Cn−4 to be compared with the average current value IA(n−4) of the sampling region Qn−4 appeared by means of the following equation.

$$Cn-4=IAn*Q'n-1*Q'n-2*Q'n-3*Q'n-4+Fn-4$$

In a general formula, $$Cn-4=IA(n+4)*Q'n+3*Q'n+2*Q'n+1*Q'n+Fn$$

The forecast comaprison value Cn−4 determined by the comparison value calculator 79 is made identical with that corresponding to an address number n of the sampling region Qn presently required by making the forecast comparison value pass through a four-stage forecast comaprison value delay register 80.

In this forecast comparison value processor 76 at the first comparison value generation period, the comparison value is entered into the fore stage of the forecast comaprison value delay register 80. This process is repeated four times and the comparison value before four is determined.

That is,

Forecast value before one: $C_{n-1} = A_n * Q'_{n-1}$

Forecast value before two: $C_{n-2} = C_{n-1} * Q'_{n-2}$

Forecast value before three: $C_{n-3} = C_{n-2} * Q'_{n-3}$

Forecast value before four: $C_{n-4} = C_{n-3} * Q'_{n-4}$

Initial Operation

In the initial condition of respective blocks of a pinch judgement shown in FIG. 36, these memorized contents of the load sample data memory 71 is made of a normal posture of the vehicle 1 oil a level ground of no slant of fore-back, and left-right directions. The slide door 2 of the vehicle 1 on the level ground opens and closes in order to determine the average current values IAn, IAm of a sample regions Qn, Qm in each area.

In this initial condition of the vehicle 1, these current change rate ΔIAn, ΔIAm is determined from the ratio of the present average current value to the just before current value by means of the memory study data processor 75. The current change rate ΔIAn, ΔIAm pass from a study data delay shift register 83 to the study value weight renewal processors 84, and are output as a write-in data DL of the load sample data memory 71. The address number at which the output data is memorized is appointed by the address numbers n, m of the sample region data Qn, Qm for which the average current values IAn, IAm are determined and obtained in the sampling region processor 10.

Here, the relation of respective routines of the pinch judgement in FIG. 34 with respective blocks of the pinch judgement shown in FIG. 36 will be explained. The average value calculation routine (Step 380) corresponds to the load data calculator 72 and the current value memory register 74. A comparison value generation routine (Step 381) and a comparison value calculation routine (Step 384) correspond to the forecast comparison value calculator 76. A study process routine (Step 382) and a study delay process routine (Step 383) correspond to the memory study data calculator 75. A continuation & change volume routine (Step 375) corresponds to a previous time current value memory 86, a change volume calculator 87 and a current increment number counter 88.

Study Judgement Routine

Figure 40:
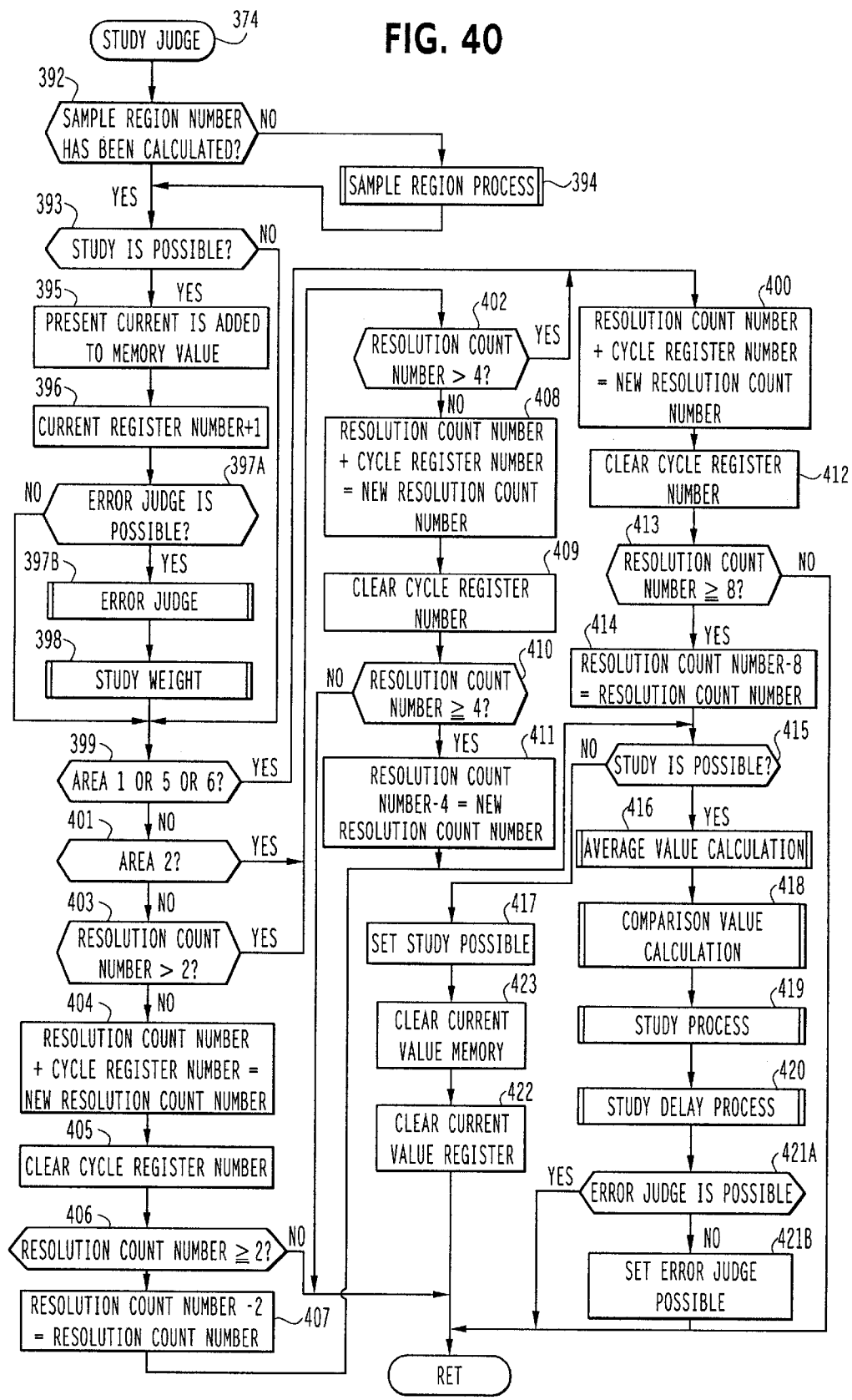
FIG. 40 is a flow chart showing in detail the study judgement routine.

FIG. 40 is a flow chart showing in detail a study judgement routine (Step 374). This study judgement routine adds every time current values and carries out an error judgement and a study weighting (pinch recognition). In addition, when the slide door 2 moves and the sampling regions are transfered to other sampling region, this routine carries out these calculations of the average current value in this transfered region and of the comparison values in this region, the study process and the study delay process.

A transference of the sampling regions are recognized when a pulse number of the travelled value of the slide door 2 is added to a remainder (remainder is obtained by dividing a position count value N by a resolution B) obtained by calculating the moving start sampling region and the resultant exceeds the number value 8, 4, 2 of the resolution B. It is cleared every time the pulse number is added. When the sampling region is transfered, the count value of the resolution B is subtracted and again the count starts. It is noted that an average current value is not obtained while it is starting due to it is at a mid point of the sampling region, such addition must be started at a time of the sampling region change over. When the sampling region next changes or transfers, it is possible to generate the average current value and the comparison value, so it is also possible to carry out an error judgement every time.

First, this routine judges whether the sampling region number has been calculated or not (Step 392). Because no calculation has been finished by the time of door move starting, it is calculated (Step 394). Next, this routine judges whether a study is possible or not (Step 393). At the first time, it is not possible to study. Next, this routine judges whether the position of the slide door 2 is in areas 1, 5 or 6.

When the slide door 2 exists in areas 1, 5 or 6, the cycle register number (moved pulse number) is added to a resolution count number (remainder of the sampling region calculation) in order to determine a new resolution count number (Step 400). Next, in order to count the moved pulse number, this routine clears the cycle register number (Step 412). When the resolution count number is less than 9 (Step 413), it returns to the return step.

After that, the cycle register number is similarly added. When it becomes more than 8 (the sampling region is transfered), eight is subtracted from the resolution count number (Step 414) in order to judge whether it is possible to study or not (Step 415). It is now not a study possibility, so this routine sets the study possibility (Step 417) and clears the current value memory and the current value register number (Step 421C, 422), returning to the return step.

It will be a study possiblity in the next time (Step 393), so the present current value is added to a memory value (Step 395), the current register value number is incremented and the addition number of the current value is counted (Step 396), and this routine judges whether it is possible or not to carry out the error judgement (Step 397A). When it is now not possible to carry out the error judgement, it jumps to the step 399. The processes of steps 400–415 are carried out. It is a study possible in this time (Step 415), so an average value calculation (Step 416), a comparison value calculation (Step 418), a study process (Step 419) and a study delay process (Step 420) are carried out, and an error judgement possibility is set (Steps 421A, 421B), returning to the return step.

It will be possible to carry out the error judgement from the next time (Step 397A), so the error judgement (Step 397B) described later and a study weghting (Step 398) are carried out. Additionally, an average value calculation (Step 416) to a study delay process (Step 420) are carried out every time of exceeding the sampling region.

When the position of the slide door 2 is changed from area 1 to area 2 (Steps 399, 401), this routine judges whether the resolution count number is more than 4 or not (Step 402). This is done because that, in the first time after the area has been changed, it is necessary to calculate an average value of the last sampling region of the area 1 before the first time. When the resolution count number is over 4, the process transfers to these steps after the step 400.

When the resolution count number is not over 4, a cycle register number is added to the resolution count number in order to determine a new resolution count number (Step 408), the cycle register number is cleared in order to count the moved pulse number (Step 409). Furthermore, when the resolution count number is less than 4 (Step 410), it returns to the return step. When the resolution count number becomes more than 3, 4 is subtracted from the resolution count number (Step 411) and it is transferred to the process after the step 415.

When the position of the slide door 2 is transferred from area 2 to area 3 (Steps 399, 401), this routine judges whether the resolution count number is over 2 or not (Step 403). This is done because that, in the first time after the areas are transferred, the average value and the like of the last sampling region of the area 2 before the first time must be calculated. When the resolution count number is over 2, the process is transferred to that after the step 402.

When the resolution count number is over 2, the cycle register number is added to the resolution count number to determine a new resolution count number (Step 404), the cycle register number is cleared in order to count the moved pulse number (Step 405). Furthermore, when the resolution count number is less than 2 (Step 406), returning to the return step. When it becomes more than 2, two is subtracted from the resolution count number (Step 407) and it is transferred to processes that after the step 415.

Error Judgement Routine

Figure 41:
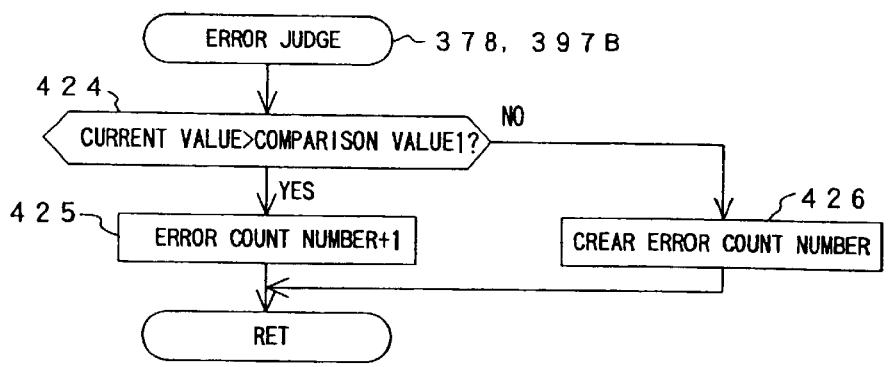
FIG. 41 is a flow chart showing in detail the error judgement routine.

FIG. 41 is a flow chart showing in detail an error judgement routine (Steps 378, 397). This routine compares the present current value IN to the forecast comparison value Cn and counts the count number having a large current value IN as an error count number.

First the routine compares the present current value IN and the forecast comparison value Cn (Step 424). When the current value IN is larger than the forecast comparison value Cn, the error count numbers are added (Step 425). When the both are identical with each other or the current value IN is smaller, the error count number is cleared (Step 426). This is done because only when the current values IN are larger in a row, it is presumed that there is a pinch.

Study Weight Routine

Figure 42:
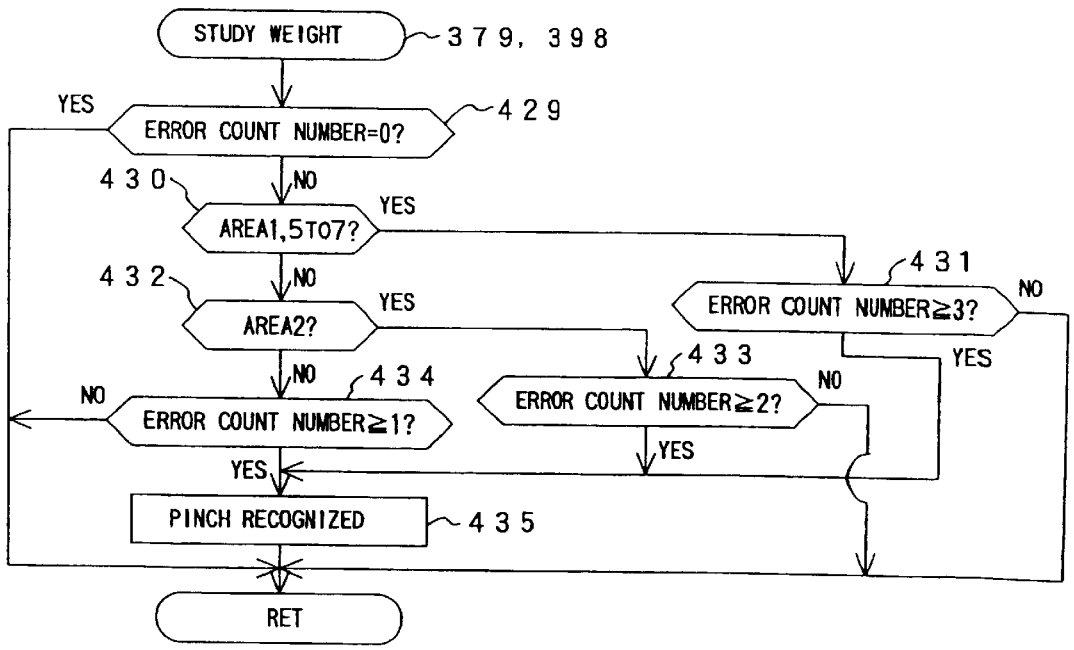
FIG. 42 is a flow chart showing in detail the study weighting routine.

FIG. 42 is a flow chart showing in detail a study weight routine (Steps,379, 398). This routine changes the weight for the error count number according to these areas 1–7 in order to The effectively carry out a pinch detection.

First this routine judges whether the error count number is zero or not (Step 429). When it is zero, it returns to the return step. When it is not zero, a weighting error count number for each area is carried out.

That is, concerning the areas 1, 5–7 (Step 430), this routine judges whether the error count number is 3 and more than 3 or not (Step 431). In area 2 (Step 432), it judges whether the error count number is 2 and more than 2 or not (Step 433). In area 3 and 4 (Step 434), it judges whether the error number is 1 and more than 1 or not (Step 435). As described above, comparing to the start area 1 along its close direction of the slide door 2 and the areas 5–7 along its open direction, areas 2–4 of dangerous region along a close direction have a stricter set value.

Then the current value of the present control region is not in its increment trend according to these judgements (Step 427), or the error count number is larger than the set value set every area and on its increment trend, this routine judges that it is abnormal and permits the pinch detection (Step 435). Then the error count number is smaller than the set value even if the current value of the present control region is on its increment trend and the error count number is smaller than the set value, it returns to the return step.

Continuation & Change Volume Routine

Figure 43:
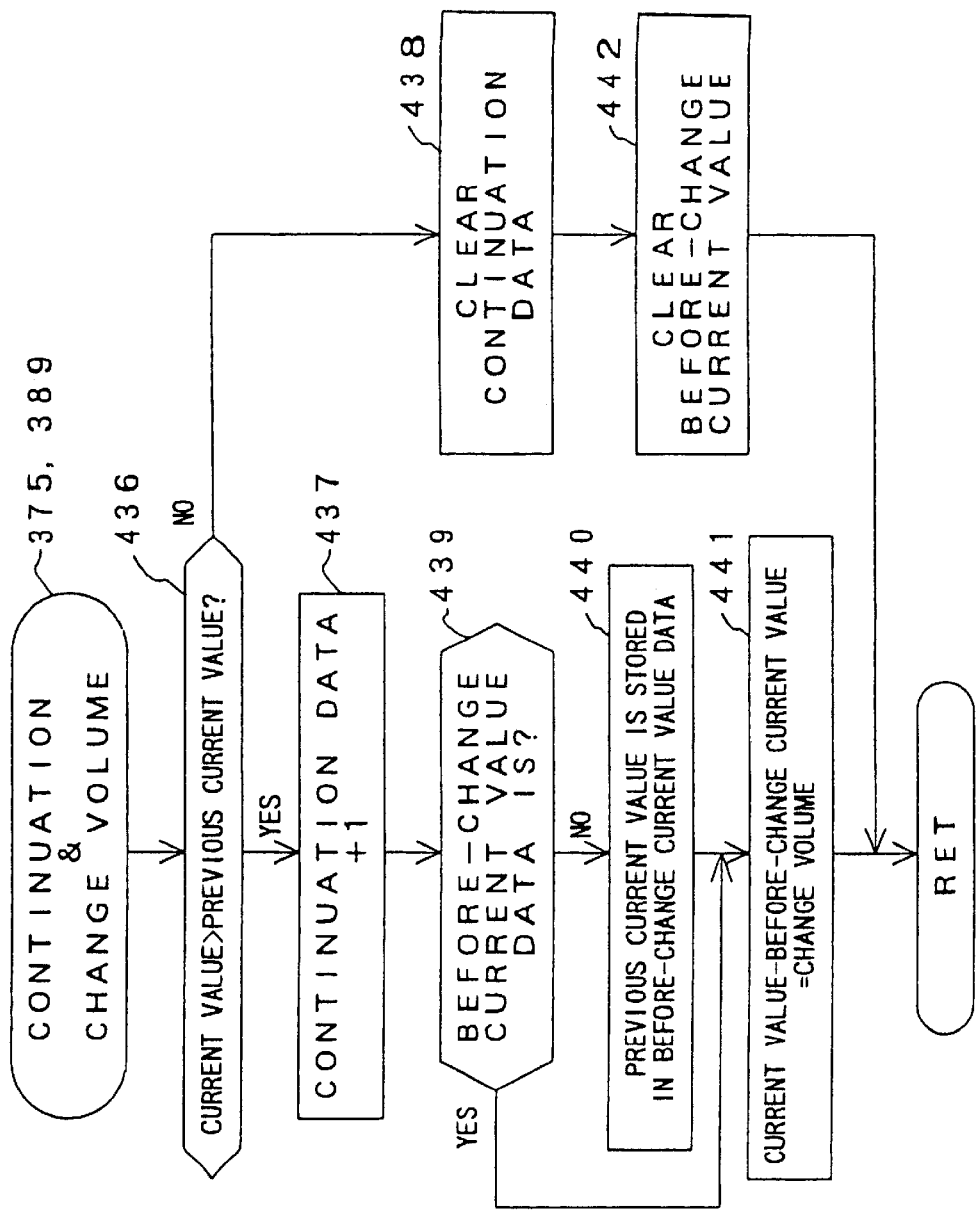
FIG. 43 is a flow chart depicting in detail the continuation & change volume routine.

FIG. 43 is a flow chart showing in detail a continuation & change volume routine (Steps 375, 389). This routine measures the change volume and the rising continuation time of the current value IN in order to effectively carry out the pinch detections.

First this routine judges whether the current value is on its increment trend or not (Step 436). Then it is on its increment trend, the counter for counting the continuation time adds (Step 437). then there is no data of the current value before any change (Step 439), the previous current value is stored as a before-change current value (Step 440) in order to subtract the before-change current value from the present current value IN, determining a change volume of the current value (Step 441) and returning to the return step. Then the current value is not on its increment trend (Step 436), the counter for counting the continuation time is cleared (Step 438) and the before-change current value is cleared (Step 442), returning to the return step.

Total Judgement Routine

Figure 44:
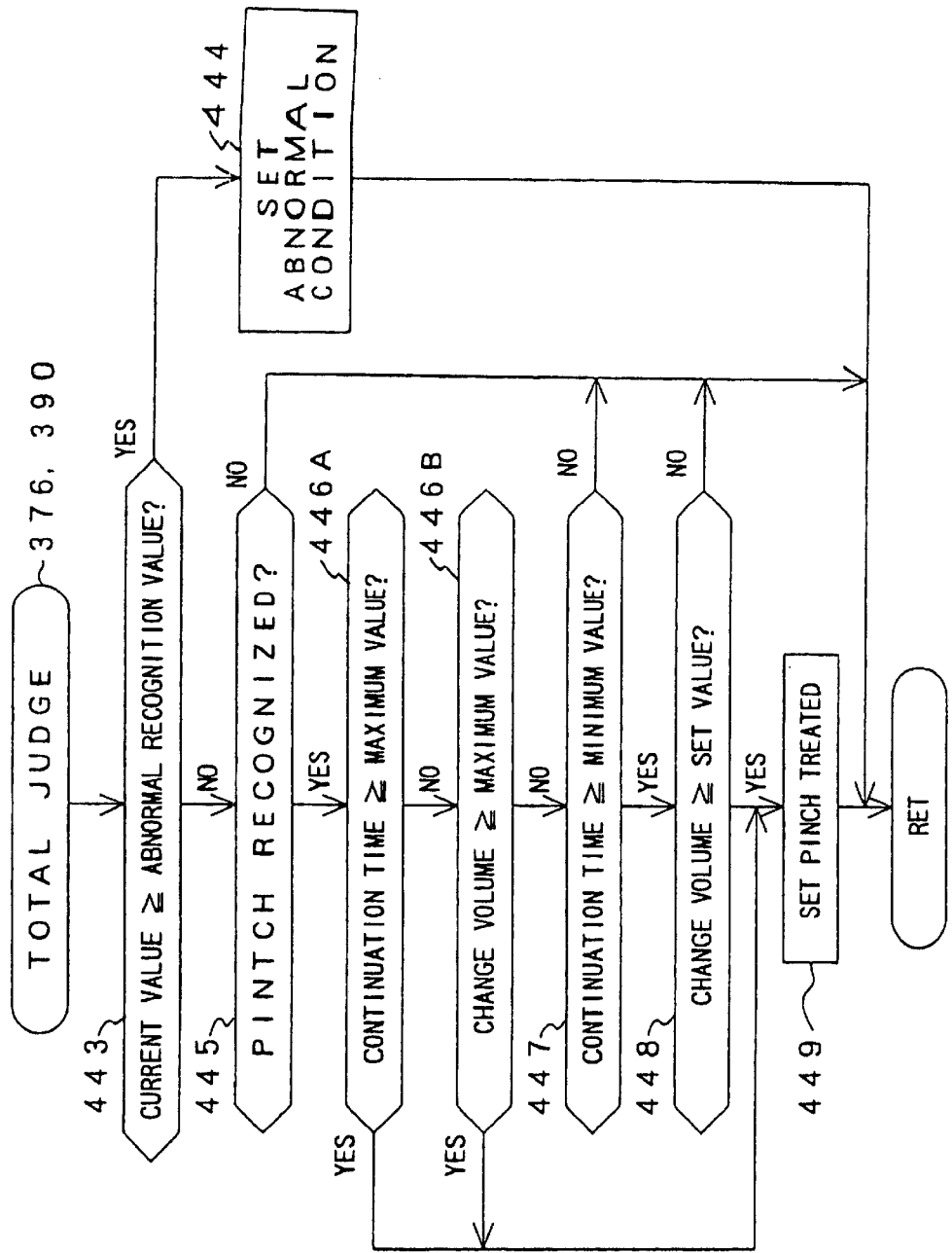
FIG. 44 is a flow chart depicting in detail the total judgement routine.

FIG. 44 is a flow chart showing in detail a total judgement routine (Steps 376, 390). This total judgement routine carries out a pinch judgement after the consideration of the study judgement, the change volume of the current value and the increment continuation time and the like.

First this routine judges whether the present current value is an abnormal recognition level and more than it or not (Step 443). When the present current value is the abnormal recognition level and more than it, the abnormal condition is set (Step 444), returning to the return step. When the present current value is not the abnormal recognition level and more than it (Step 443), this routine judges whether the study judgement permits a pinch detection or not (Step 445). When it is not permitted, this routine returns to the return step.

In case that a pinch detection is permitted (Step 445) and a continuation time for which time a current value increases is larger than a set maximum value (Step 446A), the change volume of the current value is more than the set maximum value (Step 446B), the continuation time is more than the set minimum value and the change volume is more than a set value (however, it is less than the maximum value)(Steps 447, 448), this routine judges in respective cases that there is a pinch and so a pinch treated condition is set (Step 449), returning to the return step. The abnormal condition is set (Step 444), or a pinch treated condition is set (Step 449). Consequently, for example when the slide door 2 is atuomatically closing, the automatic close operation routine Rakes the slide door 2 reversely open to the target value.

Slope Judgement Routine

Figure 45:
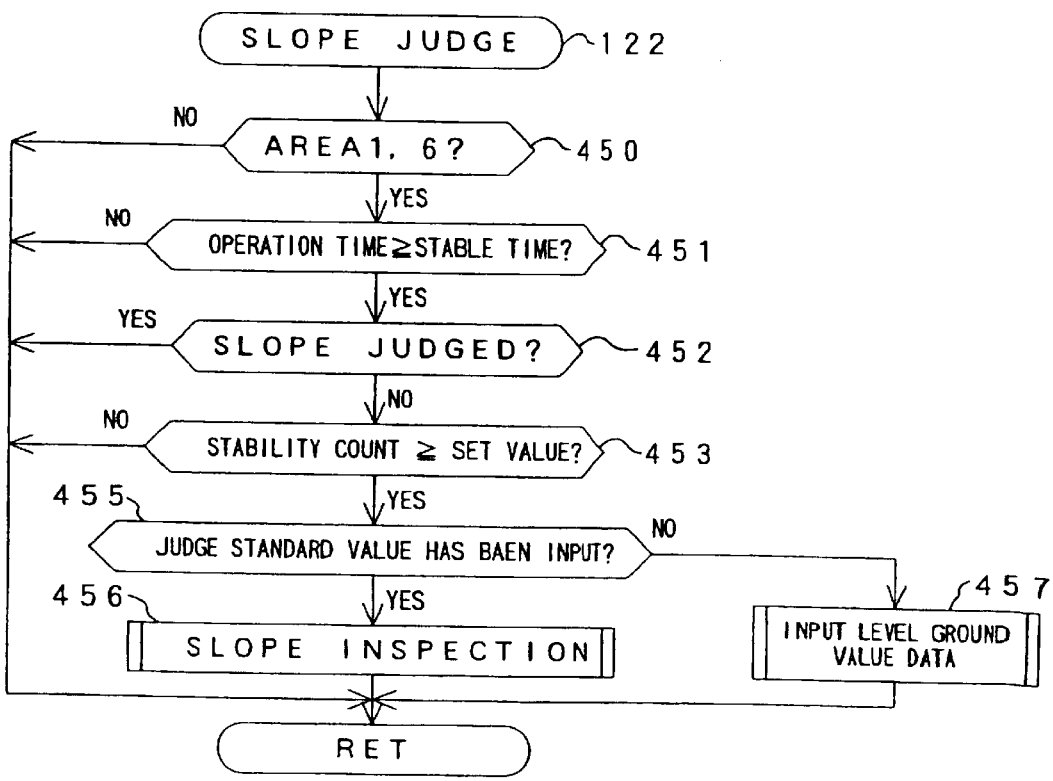
FIG. 45 is a flow chart showing in detail the slope judgement routine.

FIG. 45 is a flow chart showing in detail a slope judgement routine (Step 122). This routine functions to prepare the condition for the slope judgement. According to the routine, first this routine judges whether the position of the slide door 2 is in areas 1, 6 or not (Step 450). This is done because the slope judgement is carried out in areas 1, 6 of the ordinal control regions. Accordingly, when the position of the slide door 2 is in another area, it returns to the return step.

When the slide door 2 is in area 1 or 6, this routine judges whether the period necessary to stabilize the movement of the slide door 2 has been passed or not (Step 451). When it passes, whether the slope judgement has been carried out or not is judged (Step 451). When the operation time of the slide door 2 dose not reach a stable period or when the slope judgement is carried out, it returns to the return step.

When the slope judgement has not been carried out, this routine judges whether a stability count is judged whether it is more than a predetermined set value or not (Step 453). Here, the stability means a condition in which a differences between the maximum value and the minimum value of the cycle count value T of continuous plural numbers (for example, four) drops into a predetermined range. When the condition fails to become more than the predetermined set value, it returns to the return step.

When the stability count is more than the predetermined set value, this routine judges that the slide door 2 is stabilized on the level ground, so this routine judges whether the judgement standard value has been input or not (Step 445). While an initial period, it dose not input, so a level ground value data described later will be input (Step 457). When the input has been done already, a slope inspection described later is carried out (Step 456).

Level Ground Vlaue Data Input

Figure 46:
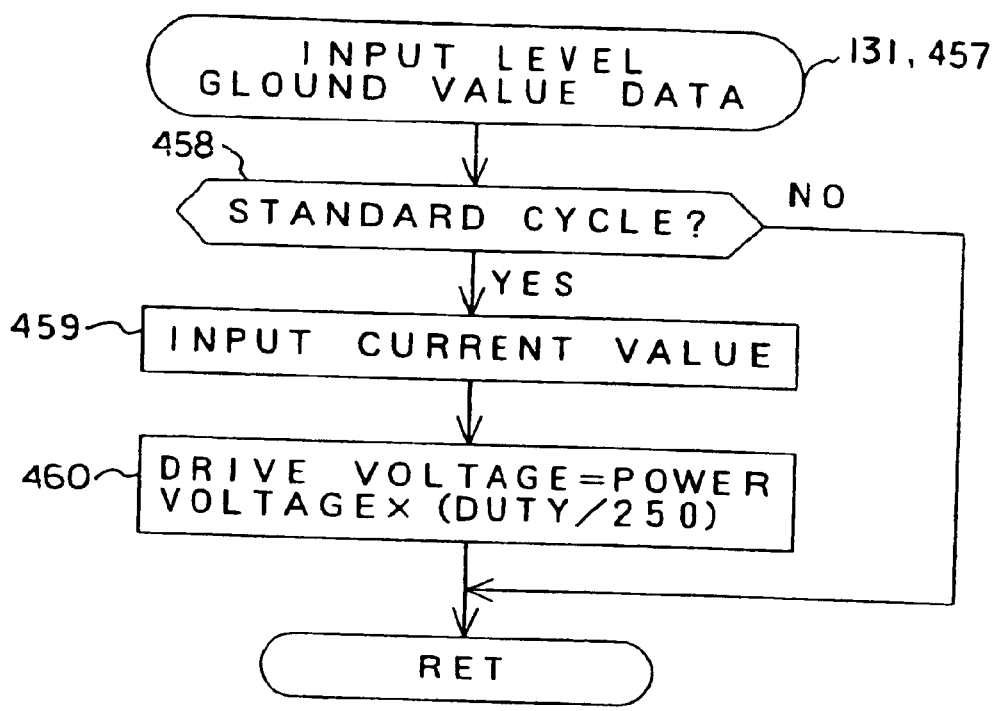
FIG. 46 is a flow chart showing in detail the level ground value data input routine.

FIG. 46 is a flow chart showing in detail a level ground value data input routine (Steps 121, 457). This routine inputs the standard value (level ground standard value) used for the slope judgement and judges whether the cycle count value T in area 1, 6 of the slide door 2 exists in the standard cycle range or not, or whether the movement speed of the slide door 2 drops in a prdetermined range with reference to the set speed T1 (FIG. 16) or not (Step 458). Then the movement speed does not drop in the predetermined range, it returns to the return step.

When the slide door 2 is controlled with the target speed (Step 458), the present current value is stored as a level ground current value (Step 459), and also a drive voltage at that time is stored as the level ground drive voltage (Step 460). The drive voltage is determined by the follwing equation, $$\text{Drive voltage} = \text{power source voltage} * (\text{Duty}/250)$$

Wherein (Duty/250) means as a described above a duty cycle.

Slope Inspection Routine

Figure 47:
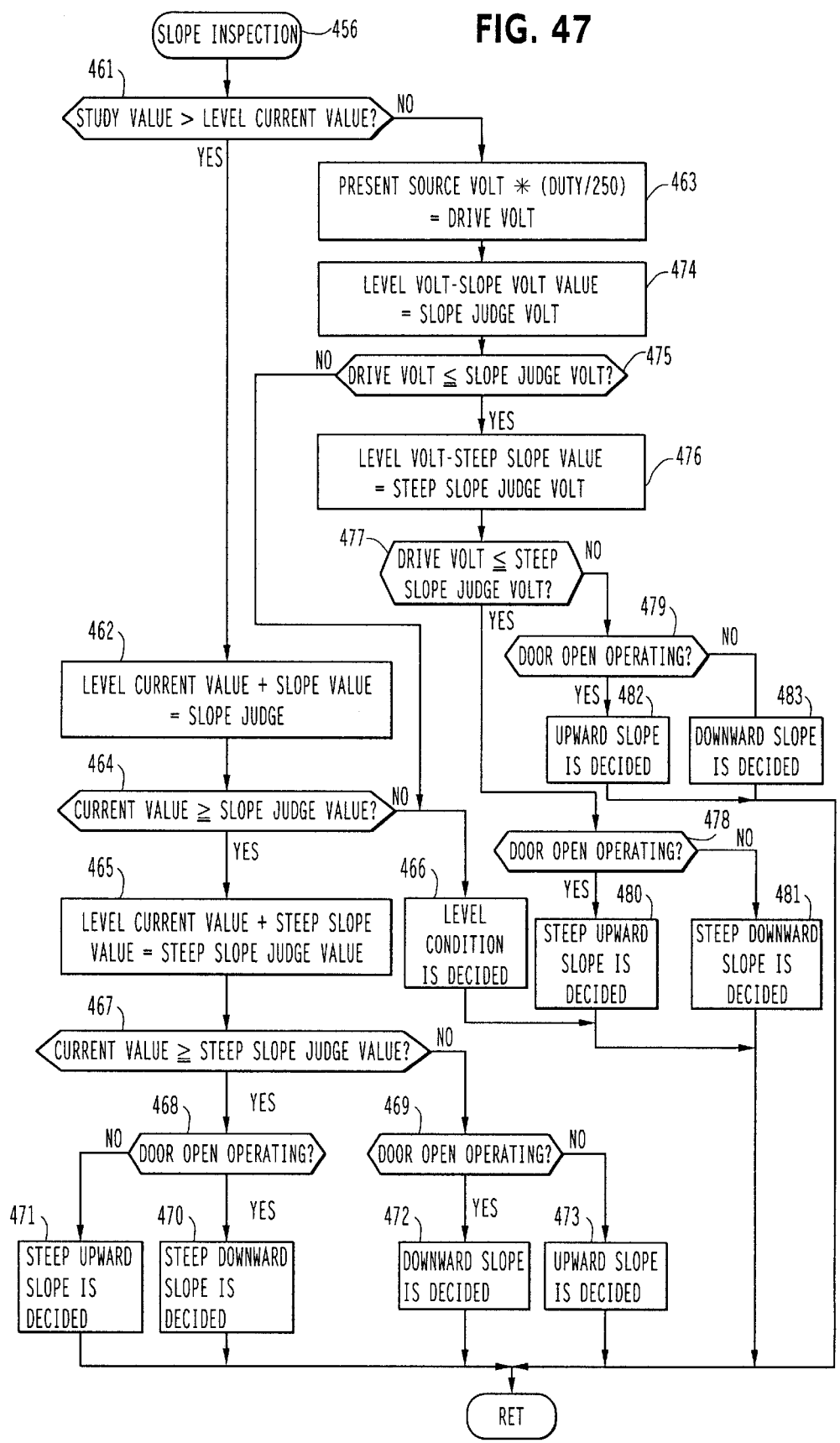
FIG. 47 is a flow chart showing in detail the slope inspection routine.

FIG. 47 is a flow chart showing in detail a slope inspection routine (Step 456). This slope inspection routine judges whether the vehicle 1 is standing on the level ground or the slope by using the previously set level ground standard value (level ground current value and level ground drive voltage).

First, when the present current value is larger than a level ground current value (Step 461), the slope current value of the judgement margin is added to the level ground current value, obtaining a slope judgement value (Step 462). Then, when the present current value is larger than the slope judgement value (Step 464), a steep slope value (larger than a slope value) of the judgement margin is added to the level ground current value, obtaining a steep slope judgement value (Step 465).

When the present current value is larger than the steep slope judgement value (Step 467) and the movement direction of the slide door 2 is along its open direction (Step 468), this routine judges that it is a downward slope (Step 470). When this routine judges that the movement direction is along its close direction, judging that it is an upward slope (Step 473).

When the vehicle 1 stands or parks on the downward slope and the movement direction of the slide door 2 is along its open direction, or when the vehicle 1 stands or parks on the upward slope and the movement direction of the slide door 2 is along its close one, it is necessary to move the slide door against its weight, making a motor load large in comparison with a gradient of slope. Accordingly, it is possible to judge the slope gradient by comparing the present current value with the level ground current value. When the present current value is less than the slope judgement value (Step 464), this routine judges that it is the level ground.

When the present current value is less than the level ground current value (Step 461), the present drive voltage is determined (Step 463), a slope voltage value of the judgement margin is subtracted from the level ground drive voltage previously determined, and a slope judgement voltage of the subtraction result is obtained (Step 474). When the present drive voltage is less than the slope judgement voltage (Step 475), a steep slope voltage value (larger than a slope value) of the judgement margin is subtracted from the level ground value, obtaining a steep slope judgement voltage (Step 476).

When the present drive voltage is less than the steep slope judgement voltage (Step 477) and the movement direction of the slide door 2 is its open one (Step 478), a steep upward slope is determined (Step 480). When the movement direction is its close direction, a steep downward slope is determined (Step 481). Also, in case that the present drive value is larger than the steep slope judgement voltage (Step 477), and the movement direction of the slide door 2 is its open direction (Step 479), a upward slope is determined (Step 482). When the movement direction is its close direction, a downward slope is determined (Step 483).

The reason of the steps above will be described. When the vehicle 1 stands on an upward slope and the movement direction of the slide door 2 is its open direction, or when it stands on a downward slope and the movement direction of the slide door 2 is its close direction, the slide door will move toward the target direction due to its weight. In such situation, the slide door 2 dangerously moves at high speed along its open direction or along its close direction, so the DUTY control downs the drive voltage decreasing its moving speed. As a result, it is possible to carry out a slope judgement by comparing the present drive voltage with a level ground drive voltage. When the present drive voltage is larger than the slope judgement voltage (Step 475), a level ground is determined (Step 466).

The calculation of the drive voltage (Step 463) is done as follows. When the DUTY value is not 100% due to the PWN control, the drive voltage is determined as follows.

$$\text{DUTY value}/250(100\%) = \text{Drive Percentage}$$

$$\text{Battery voltage} * \text{Drive Percentage} = \text{Drive voltage}$$

In case that the DUTY value equals 100%, the following equation is obtained.

$$\text{Battery voltage} = \text{Drive voltage}$$

According to the embodiment of the invention, the DUTY value of 100% is 250.

Then the vehicle 1 stands on a downward slope or a steep downward slope and the slide door 2 is fully opened in this slope judgement, the power of the electro-magnetic clutch 16 in the motor drive appratus 10 is turned off and the open-close drive motor 14 cuts off the drive pulley 15, resulting in a weight of the slide door 2 slides it along its close direction.

Door Check Control

Figure 48:
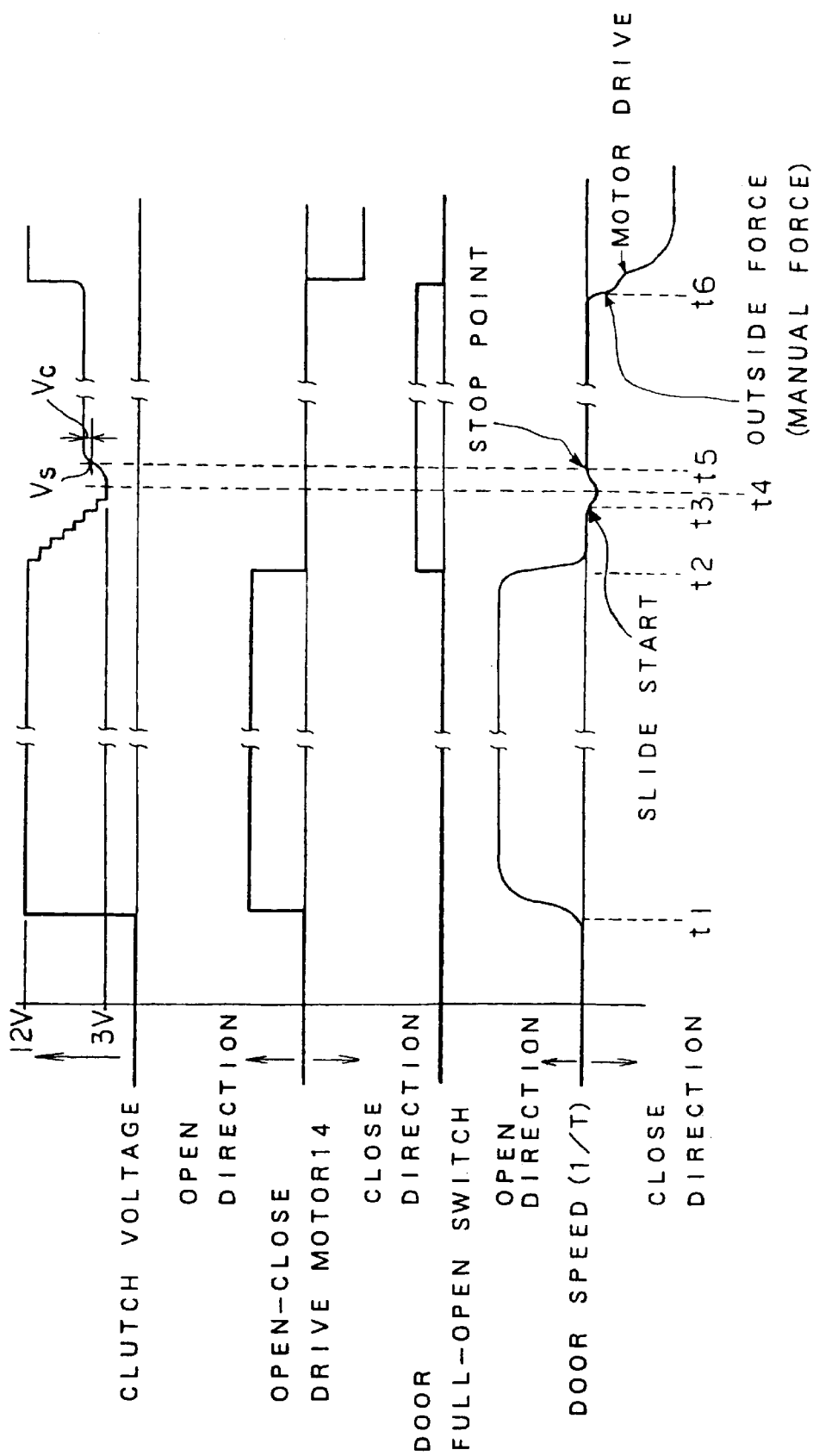
FIG. 48 is a time chart showing an embodiment of the door check control carried out when the vehicle is parked on a downward slope.

FIG. 48 is a time chart of a door check control adapted to safely carry out a door check even though the vehicle 1 stands in such situations. When the open-close drive motor 14 starts its rotation for moving the slide door 2 along its open direction at a time t1 and a clutch voltage rises from 0V to 12V as shown in FIG. 48, a transfer holding force of the electromagnetic clutch 16 rises and the slide door 2 is driven along its open direction. As a result, the sliding speed (1/T) of the slide door 2 gradually rises. When it reaches a predetermined speed, after that the speed is kept.

When a door full-open switch is turned ON at the time t2 and a situation of the full-open door is detected, the open-close drive motor 14 stops and the clutch voltage gradually decreases at each stages. In case that the vehicle 1 stands on a downward slope and the slide door 2 is apt to slide by its weight along its close direction, the clutch voltage decreases and the transfer holding force between the input and the output of the electromagnetic clutch 16 weakens wherein the transfer holding force is less than the force to start to slide the slide door 2, so that the slide door 2 starts to slide along its close direction at a time t3.

After the start of sliding the slide door 2 is detected by the cycle count value T and the clutch voltage reaches a gradually decreased bottom value (about 3V) at a time t4, the clutch voltage is made increased gradually. While a gradual increase of the clutch voltage, existence or not of movement of the slide door 2 is detected by the cycle count value T. When a stop of the moving slide door 2 along its close direction at a time t5 is detected, a voltage value Vs+Vc of a then voltage value Vs and a holding power generation voltage value Vc is impressed as a clutch voltage and the voltage is kept.

Then, when a manual force stronger than the holding force due to the clutch voltage is effected toward its close direction of the slide door 2 at a time t6, the manual start routine described above starts the open-close drive motor 14, an automatic drive mode is attained, resulting in Roving the slide door 2 due to the motor drive force along its close direction.

FIG. 49 is a time chart of a door check control according to another embodiment of the invention. When, similar to the control of FIG. 48, the slide door 2 starts to slide along its close direction at a time t3 and a clutch voltage reaches a gradual decrease bottom value (about 3V) at a time t4, the clutch voltage is once increased and then decreased to a level a little higher than the clutch voltage Va at the time t3 of a slide detected instance. As a result, after the slide door 2 again starts to slide along its close direction at a time t5, the clutch voltage again increases at a time t6 at which the clutch voltage reaches the previous slide detection voltage Va and the same voltage adjustment is again repeated.

As a result of this adjustments (in this example, two times), when, even the clutch voltage is decreased to the last slide detection voltage Vb obtained at the time t5, a slide generation of the slide door 2 is not detected after twice adjustments mentioned above, a voltage Vb+Vc which is identical with or a little larger than the last slide detection voltage Vb at a time t7 is impressed as the clutch voltage and the voltage is kept as it is.

After that, when a manual outer force stronger than the holding force of the clutch voltage is applied along its close direction of the slide door 2 at a time t8, the manual start routine starts its rotation of the open-close drive motor 14 making the automatic drive mode and the door moves along its close direction due to the motor drive.

Comparing these two door check controls to each other, the control shown in FIG. 48 has a merit of short control time and another control shown in FIG. 49 is able to firmly adjust the voltage.

By the way, in order to make the clutch ON, it is necessary to impress a voltage (magnetic force) complementing a gap between these clutch paltes. Because that, when the clutch is made OFF, the clutch plates stick to each other and they are held in such condition, a voltage lower than that necessary to turn the clutch ON is sufficient to hold the clutch plates together concerning plate gaps and residual magnetic portion.

Consequently, when the control shown in FIG. 48 is done and a slide detection voltage is clutch-off voltage, which holding voltage is equal to the clutch-on voltage and the α voltage. The holding voltage is larger than a necessary voltage. However, the control shown in FIG. 49 makes it possible to hold the clutch by means of a voltage between the clutch-on voltage and the clutch-off voltage.

The time charts shown in FIGS. 48 and 49 explain how to detect the movement of the slide door 2 on the basis of the cycle counter value T. However, the movement of the slide door 2 may be detected by detecting a change of the position count value N. When the vehicle 1 stands on the level ground, the voltage value Vc generating a previously determined necessary holding force is impressed. A check control of such flat or level posture of the vehicle uses an impress of holding force temporary held condition not only in a case in which not necessary the slide door 2 is full-open, but also in another case in which the slide door 2 opens half. This fact shows that this invention can be applied not only to the slide door of vehicle, but also to the open-shut stracture generally and to the entrance doors of buildings and houses.

INDUSTRIAL USABILITY

As described above, the temporary holding device of the invention for an automatic driven open-close structure temporarily holds the open-close structuer, such as the entrance doors and vehicular slide doors adapted to automatically open and close them by predetermined force, consequently is suitable to carry out an automatic open-close control safely and stably, which control starts with the start of movement of the structure.

What is claimed is:

1. A system for temporarily holding an automatically driven closure, the system comprising:

an open-close structure supported movably on a guide mechanism, an electric clutch for intermittently connecting the guide mechanism to an open-close structure holding mechanism, a clutch drive adjusting a transfer keeping force of the electric clutch, and a control means for controlling the clutch drive so that the clutch drive sets the transfer keeping force of the electric clutch at a level smaller than that in moving the open-close structure, in order to suitably stop and hold the open-close structure at a predetermined open degree, wherein the level is that in which a manual operation can make the open-close structure move.

2. The system for temporarily holding an automatically driven closure described in claim 1, wherein an open-close structure holding mechanism consists of an open-close structure drive moving the open-close structure along its open-close direction.

3. A system for temporarily holding an automatically driven closure, the system comprising:

an open-close structure supported movably on a guide mechanism, an electric clutch for intermittently connecting the guide mechanism to an open-close structure holding mechanism, an open-close structure movement detector discerning at movement of the open-close structure, a clutch drive adjusting a transfer keeping force of the electric clutch, and a control means for controlling the clutch drive so that the clutch drive gradually decreases the transfer keeping force of the electric clutch when the open-close structure stops at a predetermined open degree, gradually increases the transfer keeping force in order to stop the movement of sliding the open-close structure when the open-close structure movement detector discerns the movement of sliding the open-close structure, and adjusts the transfer keeping force of the electric clutch to a level a little larger than that in stopping the open-close structure by gradually decreasing the transfer keeping force, wherein the level is that in which a manual operation can make the open-close structure slide.

4. The system for temporarily holding an automatically driven closure described in claim 3, wherein an open-close structure holding mechanism consists of an open-close structure drive moving the open-close structure along its open-close direction.

5. A system for temporarily holding an automatically driven closure, the system comprising:

an open-close structure supported movably on a guide mechanism, an electric clutch intermittently connecting the guide mechanism to an open-close structure holding mechanism, an open-close structure movement detector discerning a movement of the open-close structure, a clutch drive for adjusting a transfer keeping force of the electric clutch, and a control means for controlling the clutch drive so that the clutch drive gradually decreases the transfer keeping force of the electric clutch when the open-close structure stops at a predetermined open degree, once increases the transfer keeping force when the open-close structure movement detector discerns the movement of sliding the open-close structure, gradually decreases again the transfer keeping force to a level when the open-close structure movement detector discerns the movement of sliding the open-close structure and adjusts, when the open-close structure movement detector does not discern the movement of sliding the open-close structure, the transfer keeping force of the electric clutch at a level similar to that or a little larger than that in which the open-close structure movement detector discerned the movement of sliding the open-close structure the last time.

6. The system for temporarily holding an automatically driven closure described in claim 5, wherein an open-close structure holding mechanism consists of an open-close structure drive moving the open-close structure along its open-close direction.

\* \* \* \* \*